(12) United States Patent
Chandran et al.

(10) Patent No.: US 10,286,431 B1
(45) Date of Patent: May 14, 2019

(54) THREE-STAGE ENERGY-INTEGRATED PRODUCT GAS GENERATION METHOD

(71) Applicant: ThermoChem Recovery International, Inc., Baltimore, MD (US)

(72) Inventors: Ravi Chandran, Ellicott City, MD (US); Daniel A. Burciaga, Manchester, MD (US); Daniel Michael Leo, Baltimore, MD (US); Shawn Robert Freitas, Corvallis, OR (US); Dave G. Newport, Cumberland, ME (US); Justin Kevin Miller, Durham, NC (US); Kaitlin Emily Harrington, Hillsborough, NC (US); Brian Christopher Attwood, Cary, NC (US)

(73) Assignee: ThermoChem Recovery International, Inc., Baltimore, MD (US)

( * ) Notice: Subject to any disclaimer, the term of this patent is extended or adjusted under 35 U.S.C. 154(b) by 0 days.

(21) Appl. No.: 16/086,365

(22) PCT Filed: Mar. 25, 2016

(86) PCT No.: PCT/US2016/024248
§ 371 (c)(1),
(2) Date: Sep. 19, 2018

(87) PCT Pub. No.: WO2017/164888
PCT Pub. Date: Sep. 28, 2017

(51) Int. Cl.
*B09B 3/00* (2006.01)
*C10J 3/50* (2006.01)
(Continued)

(52) U.S. Cl.
CPC ............ *B09B 3/0091* (2013.01); *C10J 3/503* (2013.01); *C10J 3/54* (2013.01); *C10J 3/66* (2013.01);
(Continued)

(58) Field of Classification Search
CPC combination set(s) only.
See application file for complete search history.

(56) References Cited

U.S. PATENT DOCUMENTS 2,603,608 A 7/1952 Lewis et al.
2,619,124 A 11/1952 Bertin et al.
(Continued)

FOREIGN PATENT DOCUMENTS

CA 975643 10/1975
CA 2820091 A1 2/2010
(Continued)

OTHER PUBLICATIONS

Examiner's Report dated Nov. 2, 2018, issued in counterpart Canadian application (No. 3,018,980).
(Continued)

*Primary Examiner* — Kaity V Chandler
(74) *Attorney, Agent, or Firm* — Womble Bond Dickinson (US) LLP

(57) ABSTRACT

A multi-stage product gas generation system converts a carbonaceous material, such as municipal solid waste, into a product gas which may subsequently be converted into a liquid fuel or other material. One or more reactors containing bed material may be used to conduct reactions to effect the conversions. Unreacted inert feedstock contaminants present in the carbonaceous material may be separated from bed material using a portion of the product gas. A heat transfer medium collecting heat from a reaction in one stage may be applied as a reactant input in another, earlier stage.

73 Claims, 28 Drawing Sheets

(51) Int. Cl.
*C10J 3/54* (2006.01)
*C10J 3/66* (2006.01)
*C10J 3/72* (2006.01)

(52) U.S. Cl.
CPC ............ *C10J 3/721* (2013.01); *C10J 2200/15* (2013.01); *C10J 2300/094* (2013.01); *C10J 2300/0959* (2013.01); *C10J 2300/1223* (2013.01)

(56) References Cited

U.S. PATENT DOCUMENTS

| | | | |
|---|---|---|---|
| 2,642,895 A | 6/1953 | Bertin et al. | |
| 2,670,011 A | 2/1954 | Bertin et al. | |
| 2,680,065 A * | 6/1954 | Atwell | C10J 3/10 |
| | | | 48/202 |
| 2,727,535 A | 12/1955 | Linderoth | |
| 2,795,931 A | 6/1957 | Foll | |
| 2,812,635 A | 11/1957 | Foll et al. | |
| 2,825,203 A | 3/1958 | Bertin et al. | |
| 2,903,416 A | 9/1959 | Metrailer | |
| 2,912,821 A | 11/1959 | Horak | |
| 2,929,774 A | 3/1960 | Smith | |
| 3,039,955 A | 6/1962 | Honnold, Jr. | |
| 3,355,249 A * | 11/1967 | Squires | C01B 3/16 |
| | | | 122/4 R |
| 3,375,175 A * | 3/1968 | Eddinger | C10B 49/10 |
| | | | 201/29 |
| 3,674,409 A | 7/1972 | Desty et al. | |
| 3,687,646 A * | 8/1972 | Teichmann | C01B 3/36 |
| | | | 110/220 |
| 3,840,354 A | 10/1974 | Donath | |
| 3,844,733 A | 10/1974 | Donath | |
| 3,853,498 A | 12/1974 | Bailie | |
| 3,894,562 A | 7/1975 | Moseley, Jr. et al. | |
| 3,910,494 A | 10/1975 | Melton, Jr. | |
| 3,927,996 A | 12/1975 | Knudsen et al. | |
| 3,954,380 A | 5/1976 | Valaev et al. | |
| 3,957,458 A | 5/1976 | Squires | |
| 3,966,633 A * | 6/1976 | Friedman | C01B 3/22 |
| | | | 252/373 |
| 3,966,634 A * | 6/1976 | Sacks | C01B 3/22 |
| | | | 252/373 |
| 3,976,592 A | 8/1976 | Lacey et al. | |
| 4,052,172 A | 10/1977 | Shirakawa et al. | |
| 4,061,562 A | 12/1977 | McKinney et al. | |
| 4,069,024 A | 1/1978 | Fernandes | |
| 4,078,973 A | 3/1978 | Choi et al. | |
| 4,080,149 A | 3/1978 | Wolfe | |
| 4,097,361 A | 6/1978 | Ashworth | |
| 4,105,545 A | 8/1978 | Muller et al. | |
| 4,157,245 A * | 6/1979 | Mitchell | C10B 49/22 |
| | | | 134/25.5 |
| 4,161,393 A * | 7/1979 | Rudolph | C01B 3/16 |
| | | | 252/373 |
| 4,199,327 A * | 4/1980 | Hempill | C10J 3/06 |
| | | | 252/373 |
| 4,219,402 A | 8/1980 | DeGeorge | |
| 4,279,710 A | 7/1981 | Coughlin | |
| 4,300,916 A | 11/1981 | Frewer et al. | |
| 4,347,064 A | 8/1982 | Reh et al. | |
| 4,356,151 A | 10/1982 | Woebcke et al. | |
| 4,400,181 A | 8/1983 | Snell et al. | |
| 4,484,885 A | 11/1984 | Machii et al. | |
| 4,519,810 A | 5/1985 | Haas | |
| 4,522,685 A | 6/1985 | Feldmann | |
| 4,532,024 A | 7/1985 | Haschke et al. | |
| 4,556,402 A * | 12/1985 | Rudolph | C10J 3/02 |
| | | | 48/197 R |
| 4,569,310 A | 2/1986 | Davis | |
| 4,569,682 A * | 2/1986 | Baker, Jr. | B01D 51/04 |
| | | | 208/127 |
| 4,639,208 A | 1/1987 | Inui et al. | |
| 4,688,521 A | 8/1987 | Korenberg | |
| 4,697,358 A | 10/1987 | Kitchen | |
| 4,699,632 A * | 10/1987 | Babu | C10J 3/463 |
| | | | 252/373 |
| 4,857,084 A | 8/1989 | Robbins et al. | |
| 4,909,914 A | 3/1990 | Chiba et al. | |
| 4,959,009 A | 9/1990 | Hemsath | |
| 5,059,404 A | 10/1991 | Mansour et al. | |
| 5,064,444 A | 11/1991 | Kubiak et al. | |
| 5,125,965 A | 6/1992 | Sebenik | |
| 5,133,297 A | 7/1992 | Mansour | |
| 5,134,944 A * | 8/1992 | Keller | B09B 3/00 |
| | | | 110/229 |
| 5,156,099 A | 10/1992 | Ohshita et al. | |
| 5,168,835 A | 12/1992 | Last | |
| 5,197,399 A | 3/1993 | Mansour | |
| 5,205,728 A | 4/1993 | Mansour | |
| 5,211,704 A | 5/1993 | Mansour | |
| 5,255,634 A | 10/1993 | Mansour | |
| 5,306,481 A | 4/1994 | Mansour et al. | |
| 5,353,721 A | 10/1994 | Mansour et al. | |
| 5,366,371 A | 11/1994 | Mansour et al. | |
| 5,439,491 A | 8/1995 | Kubiak et al. | |
| 5,473,885 A | 12/1995 | Hunter, Jr. et al. | |
| 5,536,488 A | 7/1996 | Mansour et al. | |
| 5,624,470 A | 4/1997 | Tanca | |
| 5,635,147 A | 6/1997 | Herbert et al. | |
| 5,637,192 A | 6/1997 | Mansour et al. | |
| 5,638,609 A | 6/1997 | Chandran et al. | |
| 5,667,560 A | 9/1997 | Dunne | |
| 5,696,203 A | 12/1997 | Hummel et al. | |
| 5,700,310 A | 12/1997 | Bowman et al. | |
| 5,752,994 A | 5/1998 | Monacelli et al. | |
| 5,800,153 A | 9/1998 | DeRoche | |
| 5,842,289 A | 12/1998 | Chandran et al. | |
| 5,853,548 A | 12/1998 | Piskorz et al. | |
| 5,861,046 A | 1/1999 | Andersson | |
| 5,937,635 A | 8/1999 | Winfree et al. | |
| 6,084,147 A * | 7/2000 | Mason | G21F 9/02 |
| | | | 110/346 |
| 6,114,399 A | 9/2000 | Roberts et al. | |
| 6,133,499 A | 10/2000 | Horizoe et al. | |
| 6,149,765 A | 11/2000 | Mansour et al. | |
| 6,216,446 B1 | 4/2001 | Stram | |
| 6,248,297 B1 | 6/2001 | Stine et al. | |
| 6,248,796 B1 | 6/2001 | Jackson et al. | |
| 6,446,428 B1 | 9/2002 | Kaemming et al. | |
| 6,494,034 B2 | 12/2002 | Kaemming et al. | |
| 6,495,610 B1 | 12/2002 | Brown | |
| 6,548,197 B1 | 4/2003 | Chandran et al. | |
| 6,584,765 B1 | 7/2003 | Tew et al. | |
| 6,662,550 B2 | 12/2003 | Eidelman et al. | |
| 6,667,022 B2 | 12/2003 | Cole | |
| 6,680,137 B2 | 1/2004 | Paisley | |
| 6,753,353 B2 | 6/2004 | Jackson et al. | |
| 6,758,032 B2 | 7/2004 | Hunter et al. | |
| 6,793,174 B2 | 9/2004 | Ouellette et al. | |
| 6,824,383 B2 | 11/2004 | Cain | |
| 6,863,878 B2 | 3/2005 | Klepper | |
| 6,883,543 B2 | 4/2005 | Tew et al. | |
| 6,923,004 B2 | 8/2005 | Chandran et al. | |
| 6,931,833 B2 | 8/2005 | Lupkes | |
| 6,938,588 B2 | 9/2005 | Jacobsen et al. | |
| 6,997,118 B2 | 2/2006 | Chandran et al. | |
| 7,047,724 B2 | 5/2006 | Nordeen et al. | |
| 7,214,720 B2 | 5/2007 | Bayle et al. | |
| 7,220,390 B2 | 5/2007 | Tonkovich et al. | |
| 7,309,378 B2 | 12/2007 | Bancon et al. | |
| 7,434,401 B2 | 10/2008 | Hayashi | |
| 7,526,912 B2 | 5/2009 | Tangirala et al. | |
| 7,531,014 B2 | 5/2009 | Chandran | |
| 7,569,086 B2 | 8/2009 | Chandran | |
| 7,572,362 B2 | 8/2009 | Freel et al. | |
| 7,601,303 B1 | 10/2009 | Karer et al. | |
| 7,637,096 B2 | 12/2009 | Razzell et al. | |
| 7,735,311 B2 | 6/2010 | Eidelman et al. | |
| 7,739,867 B2 | 6/2010 | Kenyon et al. | |
| 7,758,334 B2 | 7/2010 | Shimo et al. | |
| 7,775,460 B2 | 8/2010 | Berg et al. | |
| 7,784,265 B2 | 8/2010 | Rasheed et al. | |

(56) References Cited

U.S. PATENT DOCUMENTS

| | | |
|---|---|---|
| 7,828,546 B2 | 11/2010 | Wiedenhoefer et al. |
| 7,836,682 B2 | 11/2010 | Rasheed et al. |
| 7,841,167 B2 | 11/2010 | Rasheed et al. |
| 7,842,110 B2 | 11/2010 | Mansour et al. |
| 7,857,995 B2 | 12/2010 | Johnson et al. |
| 7,879,919 B2 | 2/2011 | Ernst et al. |
| 7,882,926 B2 | 2/2011 | Fullerton |
| 7,886,866 B2 | 2/2011 | Fullerton |
| 7,905,990 B2 | 3/2011 | Freel |
| 7,914,280 B2 | 3/2011 | Schlote et al. |
| 7,950,219 B2 | 5/2011 | Tangirala et al. |
| 7,964,004 B2 | 6/2011 | Koch et al. |
| 7,980,056 B2 | 7/2011 | Rasheed et al. |
| 8,007,688 B2 | 8/2011 | Dahlin et al. |
| 8,082,724 B2 | 12/2011 | Hirata et al. |
| 8,083,494 B2 | 12/2011 | Laforest et al. |
| 8,084,656 B2 | 12/2011 | Feldmann |
| 8,136,624 B2 | 3/2012 | Fullerton |
| 8,137,655 B2 | 3/2012 | Chornet et al. |
| 8,168,686 B2 | 5/2012 | Blevins et al. |
| 8,205,433 B2 | 6/2012 | Boespflug et al. |
| 8,302,377 B2 | 11/2012 | Rasheed et al. |
| 8,312,706 B2 | 11/2012 | Laforest et al. |
| 8,356,467 B2 | 1/2013 | Sprouse et al. |
| 8,381,527 B2 | 2/2013 | LaForest et al. |
| 8,539,752 B2 | 9/2013 | Brumberg et al. |
| 8,580,152 B2 | 11/2013 | Sutradhar et al. |
| 8,585,789 B2 | 11/2013 | Sutradhar et al. |
| 8,707,674 B2 | 4/2014 | Moscinski et al. |
| 8,721,299 B2 | 5/2014 | Koch et al. |
| 8,726,800 B2 | 5/2014 | Murray et al. |
| 8,813,474 B2 | 8/2014 | Daniau et al. |
| 8,889,746 B2 | 11/2014 | Kresnyak |
| 8,894,885 B2 | 11/2014 | Bell et al. |
| 8,899,010 B2 | 12/2014 | Kenyon et al. |
| 8,955,303 B2 | 2/2015 | Brzek et al. |
| 8,968,433 B2 | 3/2015 | Chandran |
| 9,011,561 B2 * | 4/2015 | Chandran .............. B01J 8/0055 48/61 |
| 9,080,513 B2 | 7/2015 | Ziminsky et al. |
| 9,084,978 B2 | 7/2015 | Peters |
| 9,140,456 B2 | 9/2015 | Kenyon et al. |
| 9,217,569 B2 | 12/2015 | Prade |
| 9,227,790 B2 | 1/2016 | Perez |
| 9,268,048 B2 | 2/2016 | Fullerton |
| 9,279,503 B2 | 3/2016 | DiSalvo et al. |
| 9,359,973 B2 | 6/2016 | Farshchian et al. |
| 9,512,997 B2 | 12/2016 | Zettner |
| 9,738,579 B2 | 8/2017 | Lucas et al. |
| 2002/0066396 A1 * | 6/2002 | Torii ...................... F23C 6/045 110/346 |
| 2002/0142172 A1 | 10/2002 | Brinker et al. |
| 2003/0143126 A1 | 7/2003 | Samson |
| 2004/0045272 A1 * | 3/2004 | Miyoshi .................. C10J 3/463 60/39.12 |
| 2004/0182000 A1 | 9/2004 | Mansour et al. |
| 2005/0050759 A1 | 3/2005 | Chandran et al. |
| 2006/0117952 A1 | 6/2006 | Bancon et al. |
| 2006/0130444 A1 | 6/2006 | Smith et al. |
| 2006/0131235 A1 | 6/2006 | Offeman et al. |
| 2006/0246388 A1 | 11/2006 | Feese et al. |
| 2006/0251821 A1 | 11/2006 | Eidelman |
| 2007/0137435 A1 | 6/2007 | Orth et al. |
| 2008/0023338 A1 | 1/2008 | Stoots et al. |
| 2008/0169449 A1 | 7/2008 | Mundschau |
| 2008/0196308 A1 | 8/2008 | Hutton et al. |
| 2008/0222956 A1 | 9/2008 | Tsangaris et al. |
| 2008/0244976 A1 | 10/2008 | Paisley |
| 2008/0260629 A1 | 10/2008 | Morin et al. |
| 2008/0264254 A1 | 10/2008 | Song et al. |
| 2008/0282892 A1 | 11/2008 | Deckman et al. |
| 2008/0308769 A1 | 12/2008 | Marty et al. |
| 2009/0000194 A1 * | 1/2009 | Fan .......................... C01B 3/16 48/199 R |
| 2009/0056537 A1 | 3/2009 | Neumann |
| 2009/0084035 A1 | 4/2009 | Wei |
| 2009/0084036 A1 | 4/2009 | Neumann |
| 2009/0084666 A1 | 4/2009 | Agrawal et al. |
| 2009/0139203 A1 | 6/2009 | Rasheed et al. |
| 2009/0151250 A1 | 6/2009 | Agrawal |
| 2009/0183431 A1 | 7/2009 | Smit et al. |
| 2009/0191104 A1 | 7/2009 | Murakami et al. |
| 2009/0217584 A1 | 9/2009 | Raman et al. |
| 2009/0229464 A1 | 9/2009 | Robertson |
| 2009/0232729 A1 | 9/2009 | Genkin et al. |
| 2009/0246120 A1 * | 10/2009 | Raman ...................... C01B 3/12 423/652 |
| 2009/0320446 A1 | 12/2009 | Gutmark et al. |
| 2009/0324458 A1 * | 12/2009 | Robinson .................. C10J 3/00 422/187 |
| 2010/0011955 A1 | 1/2010 | Hufton et al. |
| 2010/0011956 A1 | 1/2010 | Neumann et al. |
| 2010/0018115 A1 | 1/2010 | Wallace et al. |
| 2010/0024300 A1 | 2/2010 | Chornet et al. |
| 2010/0040510 A1 | 2/2010 | Randhava et al. |
| 2010/0050516 A1 * | 3/2010 | Murakami ............... C10J 3/482 48/113 |
| 2010/0051875 A1 | 3/2010 | Chornet et al. |
| 2010/0096594 A1 | 4/2010 | Dahlin et al. |
| 2010/0129691 A1 * | 5/2010 | Dooher ..................... C01B 3/34 429/425 |
| 2010/0158792 A1 | 6/2010 | Drnevich et al. |
| 2010/0162625 A1 | 7/2010 | Mills |
| 2010/0181539 A1 | 7/2010 | Apanel et al. |
| 2010/0196227 A1 | 8/2010 | Venderbosch et al. |
| 2010/0243961 A1 | 9/2010 | Hilton et al. |
| 2010/0270505 A1 | 10/2010 | Gallaspy et al. |
| 2010/0273899 A1 | 10/2010 | Winter |
| 2010/0307335 A1 | 12/2010 | Hayward |
| 2011/0031103 A1 | 2/2011 | Deckman et al. |
| 2011/0036014 A1 | 2/2011 | Tsangaris et al. |
| 2011/0047961 A1 | 3/2011 | Kenyon et al. |
| 2011/0047962 A1 | 3/2011 | Kenyon et al. |
| 2011/0095233 A1 | 4/2011 | Hildebrandt et al. |
| 2011/0107945 A1 * | 5/2011 | Suda ....................... F23C 10/10 110/233 |
| 2011/0116986 A1 | 5/2011 | Balint et al. |
| 2011/0127469 A1 | 6/2011 | Chaubey et al. |
| 2011/0139603 A1 | 6/2011 | Booth |
| 2011/0146152 A1 | 6/2011 | Vimalchand et al. |
| 2011/0146285 A1 | 6/2011 | Glaser et al. |
| 2011/0218254 A1 | 9/2011 | Chakravarti |
| 2011/0229382 A1 * | 9/2011 | Frydman .................... C10J 3/86 422/621 |
| 2011/0248218 A1 | 10/2011 | Sutradhar et al. |
| 2011/0250661 A1 | 10/2011 | Sutradhar et al. |
| 2011/0297885 A1 | 12/2011 | Boerrigter et al. |
| 2012/0000175 A1 * | 1/2012 | Wormser ................. C10J 3/463 60/39.12 |
| 2012/0061618 A1 | 3/2012 | Santoianni et al. |
| 2012/0131901 A1 | 5/2012 | Westervelt et al. |
| 2012/0204814 A1 | 8/2012 | Zhang et al. |
| 2012/0213647 A1 | 8/2012 | Koch et al. |
| 2013/0012605 A1 * | 1/2013 | Zhou ......................... C10J 3/30 518/702 |
| 2013/0019785 A1 * | 1/2013 | Saxena ..................... B01D 53/62 110/345 |
| 2013/0042595 A1 | 2/2013 | Rasheed et al. |
| 2013/0109765 A1 * | 5/2013 | Jiang ...................... C10G 49/007 518/702 |
| 2013/0133305 A1 * | 5/2013 | DePuy ....................... C10J 3/86 60/39.12 |
| 2013/0153826 A1 * | 6/2013 | Paquet ....................... C01B 3/02 252/373 |
| 2013/0161563 A1 * | 6/2013 | Jiang ......................... C01B 3/50 252/373 |
| 2013/0306913 A1 | 11/2013 | Li et al. |
| 2014/0158940 A1 * | 6/2014 | Navaee-Ardeh .......... C01B 3/36 252/373 |
| 2014/0224706 A1 * | 8/2014 | Do ............................ C01B 3/48 208/107 |
| 2015/0080626 A1 * | 3/2015 | Boon ........................ C10K 3/04 585/242 |

(56) References Cited

U.S. PATENT DOCUMENTS

| | | |
|---|---|---|
| 2015/0093664 A1 | 4/2015 | Berlowitz et al. |
| 2015/0203392 A1* | 7/2015 | Seiki .................... F01K 23/068 60/39.12 |
| 2015/0376510 A1 | 12/2015 | Lucas et al. |
| 2016/0001304 A1 | 1/2016 | Pavel et al. |
| 2017/0058222 A1 | 3/2017 | Lucas et al. |
| 2017/0082067 A1 | 3/2017 | Maqbool |

FOREIGN PATENT DOCUMENTS

| | | |
|---|---|---|
| CN | 2319410 | 5/1999 |
| EP | 2275513 | 1/2011 |
| GB | 1395953 A | 5/1975 |
| WO | WO 93/23709 | 11/1993 |
| WO | WO 00/69994 | 11/2000 |
| WO | WO 03/013714 A1 | 2/2003 |
| WO | WO 2006/071109 | 7/2006 |
| WO | WO 2006/100572 | 9/2006 |
| WO | WO 2007/117590 A2 | 10/2007 |
| WO | WO 2010/096626 A1 | 8/2010 |

OTHER PUBLICATIONS

International Preliminary Report on Patentability dated Sep. 25, 2018, issued in counterpart PCT application (No. PCT/US2016/024248).

Hall et al., "Installation and Operation of Sorbathene Solvent Vapor Recovery Units to Recover and Recycle Volatile Organic Compounds at Operating Sites Within the Dow Chemical Company," Proceedings from the Sixteenth National Industrial Energy Technology Converence, Houston, TX (Apr. 13-14, 1994).

International Search Report dated Jun. 27, 2016, issued in counterpart PCT application (No. PCT/US2016/024248).

Written Opinion of the International Searching Authority dated Jun. 27, 2016, issued in counterpart PCT application (No. PCT/US2016/024248).

* cited by examiner

PRODUCT GAS GENERATION (3A & 3B & 3C)

PRODUCT GAS GENERATION (3A & 3B & 3C)

PRODUCT GAS GENERATION (3A & 3B & 3C)

PRODUCT GAS GENERATION (3A & 3B & 3C)

CV-3B
3B, SECOND STAGE PRODUCT GAS GENERATION
CROSS-SECTIONAL VIEW (XBZ-C) FROM SPLASH-ZONE (ZONE 3) ELEVATION

FIGURE 20

Classification Valve States for Automated Controller Operation

| STATE # | STATE 1 | STATE 2 | STATE 3 | STATE 4 | STATE 5 |
|---|---|---|---|---|---|
| DESCRIPTION | PREPARATION | TRANSFER | CLASSIFICATION | VENT | DRAIN |
| mixture transfer valve (V9,V9A,V9AA,V9B) | CLOSED | OPEN | CLOSED | CLOSED | CLOSED |
| classification gas transfer valve (V10,V10A,V10AA,V10B) | CLOSED | CLOSED | OPEN | CLOSED | CLOSED |
| bed material riser recycle transfer valve (V11,V11A,V11AA,V11B) | CLOSED | CLOSED | OPEN | CLOSED | CLOSED |
| depressurization vent valve (V12,V12A,V12AA,V12B) | CLOSED | CLOSED | CLOSED | OPEN | CLOSED |
| inert feedstock contaminant drain valve (V13,V13A,V13AA,V13B) | CLOSED | CLOSED | CLOSED | CLOSED | OPEN |

CLASSIFIER GAS DISTRIBUTOR VALVE CROSS-SECTIONAL VIEW (X500) ELEVATION
GAS DISTRIBUTION VALVE (V91) CLOSED POSITION

CLASSIFIER GAS DISTRIBUTOR VALVE CROSS-SECTIONAL VIEW (X500) ELEVATION
GAS DISTRIBUTION VALVE (V91) OPEN POSITION

FIGURE 22
Classification Valve States for Automated Controller Operation

| STATE # | STATE 1 | STATE 2 | STATE 3 | STATE 4 | STATE 5 |
|---|---|---|---|---|---|
| DESCRIPTION | PREPARATION | TRANSFER | CLASSIFICATION | VENT | DRAIN |
| mixture transfer valve (V9,V9A,V9AA,V9B) | CLOSED | OPEN | CLOSED | CLOSED | CLOSED |
| classification gas transfer valve (V10,V10A,V10AA,V10B) | CLOSED | CLOSED | OPEN | CLOSED | CLOSED |
| classification gas transfer valve (V10,V10A,V10AA,V10B) | CLOSED | CLOSED | OPEN | CLOSED | CLOSED |
| bed material riser recycle transfer valve (V11,V11A,V11AA,V11B) | CLOSED | CLOSED | OPEN | CLOSED | CLOSED |
| depressurization vent valve (V12,V12A,V12AA,V12B) | CLOSED | CLOSED | CLOSED | OPEN | CLOSED |
| inert feedstock contaminant drain valve (V13,V13A,V13AA,V13B) | CLOSED | CLOSED | CLOSED | CLOSED | OPEN |
| gas distributor valve (V91) | CLOSED | CLOSED | CLOSED | CLOSED | OPEN |

REFINERY SUPERSTRUCTURE (RSS)

REFINERY SUPERSTRUCTURE (RSS)

THREE-STAGE ENERGY-INTEGRATED PRODUCT GAS GENERATION METHOD

RELATED APPLICATIONS

This is a 35 U.S.C. 371 U.S. National Phase of International Application No. PCT/US2016/024248 filed 25 Mar. 2016 and published in English as WO 2017/164888A1 on 28 Sep. 2017. The contents of the aforementioned application are incorporated by reference in their entirety.

TECHNICAL FIELD

The present disclosure relates to the field of thermochemical conversion of carbonaceous materials.

BACKGROUND

The world reliance on petroleum and natural gas has reached an era where the supply and demand have become critical. These circumstances make the need for innovative energy and environmental technologies essential to mediate climate change, reduce greenhouse gas emissions, reduce air and water pollution, promote economic development, expand energy supply options, increase energy security, decrease U.S. dependence on imported oil, and strengthen rural economies. It is now essential that energy conversion systems and processes be introduced and commercialized that can employ alternative sources of energy in an environmentally benign manner at economic costs, and can transform abundant carbonaceous material resources into clean, affordable, and domestically-produced renewable fuels and high-value products.

New technology is needed in order to exploit alternative sources of energy and feedstock for sustainable economic development in an energy efficient manner while maintaining a clean and unpolluted environment. The needed technologies must be sufficiently flexible, thermally efficient, energy integrated, environmentally clean and cost effective to enable the use of abundant carbonaceous materials for the production of clean and cost effective energy. Further, decreasing world reserves and diminishing availability of crude oil have created considerable incentive for the development and use of alternative fuels. In recent years, the ever increasing value of fossil hydrocarbon liquids and gases has directed research, development, deployment, and commercialization to the possibilities of employing carbonaceous materials for fuel purposes. In particular, attention has been focused on thermochemical conversion of carbonaceous materials.

Reaction vessels containing a fluidized bed of bed material are well suited to effectuate thermochemical processes to convert carbonaceous materials into product gases. A fluidized bed is formed when a quantity of a particulate bed material is placed under appropriate conditions in a reactor vessel to cause a bed material to behave as a fluid. This is usually achieved by the introduction of pressurized steam, carbon dioxide, oxygen-containing gas, and/or any other gases, or vapors, to flow through the particulate bed material. This results in the bed material then having many properties and characteristics of normal fluids.

Converting a carbonaceous material, such as municipal solid waste (MSW), into a product gas by the use of a fluidized bed reactor poses an exceptionally difficult challenge. This is inherently due to the inert contaminants that are present within the MSW. MSW, commonly known as trash or garbage in the United States is a waste type comprised of everyday items that are discarded by the public. Inert contaminants cannot be converted into product gas, however other portions of a MSW carbonaceous material can be converted into product gas. Instead, the MSW inert contaminants build-up and accumulate within the quantity of bed material contained within the reactor thus inhibiting and undermining the ability of the reactor to effectuate appropriate fluidization of bed material for any thermochemical process to take place at all. In applying the classification of gas/solid systems according to Geldart (D. Geldart, Powder Techn. 7, 285-293, 1973), if a fluidized bed contains mostly easily fluidized Geldart Group B bed material, fluidization will diminish if Geldart Group D solids (inert contaminants) accumulate within the fluidized bed. Geldart Group D solids may be the inert feedstock contaminants that are introduced with the MSW. Or the Geldart Group D solids may be generated through agglomeration of Geldart Group A or Geldart Group B solids. Nonetheless, a fluidized bed of a mean bed particle characteristic of Geldart Group B solids may become defluidized by buildup or accumulation of comparatively larger, coarser and/or heavier Geldart Group D solids that are introduced to the fluidized bed from an external source, such as with MSW. Defluidization may also be caused by predictable agglomeration or growth of one or more types of Geldart solids groups fusing or binding or growing together to form larger Geldart solids groups.

Defluidization may be caused by unpredictable and unavoidable buildup of larger Geldart particles, in comparison to the mean bed particle characteristic, introduced to the fluidized bed. The accumulation of Geldart Group D solids in a fluidized bed having a mean bed particle characteristic of Geldart Group B solids often results in defluidized or stagnant zones in the fluidized bed and in turn demanding an increase in fluidization velocity to maintain fluidization quality.

Often times when a carbonaceous material feedstock possessing silicon, potassium, chloride, sodium and/or alkali earth metals within the ash, the softening or melting temperatures of these compounds may be less than the operating temperature of the thermochemical reaction environment. And as a result, the growth and accumulation of agglomerates within the fluidized bed transitions from proper fluidization to possible economically detrimental defluidization leading to unscheduled process termination and shut down.

Various different methods of agglomeration have been described in scientific literature. Specifically, Pietsch, W. *Size Enlargement by Agglomeration* (New York: John Wiley & Sons, 1991) puts forth various different binding methods of agglomeration. Perhaps the most significant types of binding mechanisms relevant to fluidized bed agglomeration in applications for generation of product gas from carbonaceous materials possessing elevated silicon, potassium, chloride, sodium and/or alkali earth metals within the ash are solid bridges such as mineral bridges, sinter bridges, chemical reaction, partial melting, hardening binders, crystallization or deposition of suspended colloidal particles. Further, agglomeration may be compounded by the presence of any of the aforesaid binding mechanisms together with interlocking of two or more fluidized bed particulates together thus eventually increasing the mean particle size of the bed leading to defluidization.

Removal of accumulation of agglomerates, or removal of accumulation of larger size Geldart type solids, in comparison to the fluidized bed mean bed Geldart particle group, and introduced to the fluidized bed from an external source, in many applications is impossible to do in-situ. In many instances, buildup of larger Geldart solid classifications within a fluidized reaction environment of lesser sized Geldart solids, say accumulation of Geldart D solids in a fluidized bed environment of Geldart type B solids, requires process interruption and periodic termination of operation for cleaning.

Fluidized beds typically usually have a mean bed particle characteristic of Geldart Group B solids, generally with no overlap of Geldart Group A or Geldart Group D solids. It is therefore desirable to be able to remove Geldart Group D solids which may accumulate within the fluidized bed of Geldart Group B solids to maintain continuous operation of the fluidized bed. Further, some fluidized bed systems have a mean bed particle characteristic of Geldart Group A solids, generally with no overlap of Geldart Group B or Geldart Group D solids. It is also therefore desirable to be able to remove any Geldart Group B or Geldart Group D solids which may accumulate within the fluidized bed of mostly Geldart Group A solids to maintain continuous operation of the fluidized bed. Therefore, a need exists for a new fluidized bed process that is better suited to operate on a continuous and uninterrupted basis by accommodating size and density classification of smaller type Geldart solids for recycle back to the fluidized bed while removing solids of comparatively larger Geldart type from the system.

SUMMARY

Herein disclosed are innovative and advanced systems and methods related to the thermochemical conversion of carbonaceous materials into product gas, renewable fuels, energy products such as electricity and chemicals, the systems comprising: a three-stage energy integrated product gas generation system and at least one system selected from feedstock preparation system, feedstock delivery system, particulate classification system, primary gas clean-up system, compression system, secondary gas clean-up system, synthesis system, upgrading system and power generation system.

More specifically, the present disclosure provides for thermally integrated thermochemical reaction systems and processes for the conversion of carbonaceous materials into product gas. More specifically, the present disclosure relates to thermally integrated successive endothermic and downstream exothermic thermochemical reactions and processes for the thermochemical conversion of carbonaceous material feedstock into product gas. Still more specifically, the present disclosure relates to a first reactor being in fluid communication with a heat exchanger in thermal contact with a downstream reactor operating in an exothermic mode to provide reactant for the endothermic reaction taking place within the first reactor. Still more specifically, the disclosed systems and methods are suitable for the production of product gas for use in a refinery superstructure for converting carbonaceous materials into renewable fuels and other useful chemical compounds, including gasoline, diesel, jet fuel, ethanol, alcohols, and power.

This disclosure further relates to methods for employing an energy integrated three-stage thermochemical product gas generation system designed to efficiently convert carbonaceous materials into a wide spectrum of resources and added-value products including clean energy and chemical products. Some embodiments place emphasis on advancements in the art of thermochemical reaction systems that employ endothermic and downstream exothermic reaction environments to share energy and generate a product gas. It is, therefore, an object of the present disclosure to utilize systems and methods for a first reactor being in fluid communication with a heat exchanger in thermal contact with a second reactor operating in an exothermic mode to provide reactant for an endothermic reaction taking place within the first reactor. It is, therefore, an object of the present disclosure to utilize systems and methods for a first reactor being in fluid communication with a heat exchanger in thermal contact with a downstream primary gas clean-up system. A primary gas clean-up heat exchanger is configured to remove heat from at least a portion of the product gas generated in the first reactor or second reactor and to provide a heat transfer medium for use in the second reactor heat exchanger in thermal contact with a second reactor operating in an exothermic mode to in turn provide reactant for an endothermic reaction taking place within the first reactor.

It is further an embodiment of the present disclosure to provide a three-stage product gas generation system configured to produce a product gas from a carbonaceous material, the system comprising a first reactor, a second reactor, and a third reactor, a heat exchanger in thermal contact with the second reactor, and a heat exchanger in thermal contact with the third reactor.

The first reactor has a first interior, a first reactor carbonaceous material input, a first reactor reactant input, and a first reactor product gas output. The second reactor has a second interior, and a char input in fluid communication with the first reactor product gas output. The second reactor also has an oxygen-containing gas input, a second reactor product gas output, and a second reactor heat exchanger in thermal contact with its interior. The third reactor has a third interior, and a combined product gas input in fluid communication with both the first reactor product gas output and the second reactor product gas output. The third reactor also has an oxygen-containing gas input, a third reactor product gas output, and a third reactor heat exchanger in thermal contact with its interior. A portion of the heat transfer medium used in the third reactor heat exchanger is used as the heat transfer medium in the second reactor heat exchanger. A portion of the heated second reactor heat transfer medium is used as a reactant in the first reactor and second reactor. A portion of the third reactor heat transfer medium is used as the reactant in the second reactor. And a portion of the third reactor heat transfer medium is used as the reactant in the first reactor.

It an object of the present disclosure to utilize systems and methods to convert carbonaceous materials into product gas using a three-stage energy integrated product gas generation system including a first reactor, a first solids separation device, a second reactor, a second reactor heat exchanger, a third reactor, and a third reactor heat exchanger. The second reactor heat exchanger is configured to transfer heat from the second reactor to a second reactor heat transfer medium for use as a reactant in the first reactor or the second reactor. The third reactor heat exchanger is configured to transfer heat from the third reactor to a third reactor heat transfer medium. A portion of the third reactor heat transfer medium is sent to the inlet of the second reactor heat exchanger to be used as a second reactor heat transfer medium. In embodiments, a first reactor is configured to receive particulate heat transfer material present in the interior of the downstream reactor.

In embodiments, the first reactor is configured to receive steam as a reactant so as to operate in an endothermic mode. In embodiments, the first reactor is configured to receive carbon dioxide as a reactant so as to operate in an endothermic mode. In embodiments, the first reactor is configured to receive an oxygen-containing gas so as to operate in an exothermic mode. In embodiments, the first reactor is configured to receive steam and an oxygen-containing gas so as to operate in an endothermic and exothermic mode. In embodiments, the first reactor is configured to receive steam, oxygen-containing gas, and carbon dioxide so as to operate in an endothermic and exothermic mode.

In embodiments, the first reactor is equipped with a heat exchanger in thermal contact with the first interior of the first reactor to effectuate an endothermic reaction. In embodiments, an auxiliary heat exchanger is configured to transfer heat from a combustion stream to an auxiliary heat exchanger heat transfer medium for use as a reactant in the first reactor. In embodiments, an auxiliary heat exchanger heat transfer medium outlet conduit is in fluid communication with the second reactor heat transfer medium inlet, to thereby supply the auxiliary heat exchanger heat transfer medium to the second reactor heat exchanger. In embodiments, the inlet of the second reactor heat exchanger is in fluid communication with the outlet of the third reactor heat exchanger. In embodiments, a steam turbine may be positioned between the outlet of the third reactor heat exchanger and the inlet of the second reactor heat exchanger.

In embodiments, at least a portion of the heat transfer medium of the second reactor heat exchanger may be introduced into any combination of bed material zones found in either the first reactor or in the second rector. In this regard, the first and second reactors can each be considered to have a dense bend zone formed in the lower portion of the bed region, a feed zone formed in a middle portion of the bed region, and a splash zone formed in the upper portion of the bed region, immediately below the freeboard region of the reactor. It is understood that within the bed material, the dense bed zone is located below both the feed and splash zones, the splash zone is located above both the dense bed zone and the feed zone, and the feed zone is located between the dense bed zone and the splash zone. It is further understood that for present purposes, the boundary between the dense bed zone and the feed zone is the lowest point at which carbonaceous material such as MSW, char, or any other feedstock, is introduced into a reactor.

In embodiments, a first reactor is equipped with a dense bed zone, feed zone, and splash zone, along with the first reactor carbonaceous material input valves, sensors, and controllers. In embodiments, multiple carbonaceous material inputs and multiple feed zone steam/oxygen inputs are positioned in the first reactor feed zone along with multiple splash zone steam/oxygen inputs positioned in the splash zone. In embodiments, various geometric first reactor feed zone cross-sectional views are elaborated upon such as circular or cross sectional views. In embodiments, only two of the six first reactor carbonaceous material inputs are configured to inject carbonaceous material into vertically extending quadrants. In embodiments, at least two carbonaceous material inputs are introduced to the interior of the first reactor at different planes at different vertical heights about the first reactor.

In embodiments, a second reactor is equipped with a dense bed zone, feed zone, and splash zone, along with a first solids separation device, second solids separation device, solids flow regulator, riser, dipleg, and valves, sensors, and controllers. In embodiments, a second reactor feed zone cross-section includes: one first solids separation device; four second reactor first char inputs; and four feed zone steam/oxygen inputs; wherein the combined reactor product gas conduit is configured to blend the first reactor product gas with the second reactor product gas. In embodiments, the first reactor product gas is not combined with the second reactor product gas. In embodiments, a second reactor feed zone cross-section includes: two first solids separation devices; two solids flow regulators; four second reactor first char inputs; four feed zone steam/oxygen inputs; and, where the combined reactor product gas conduit is configured to blend the first reactor product gas with the second reactor product gas.

In embodiments, particulate heat transfer material may be transferred from the interior of the second reactor to the interior of the first reactor. In embodiments, the separated char may be reacted with steam in the second reactor to produce a second reactor product gas. In embodiments, at least a portion of the heat transfer medium may be used as the reactant in the second reactor. In embodiments, the carbonaceous material may also be reacted with an oxygen-containing gas to produce a first reactor product gas containing char. In embodiments, a fuel source may be combusted in a first reactor heat exchanger to form a combustion stream, said combustion stream indirectly heating the particulate heat transfer material in the first reactor. In embodiments, the second reactor operated at a pressure greater than the first reactor. In embodiments, the reaction between the carbonaceous material and steam in the first reactor is promoted by use of a particulate heat transfer material.

In embodiments, this disclosure relates to a three-stage energy-integrated product gas generation system configured to produce a product gas from a carbonaceous material, the system comprising: a first reactor having a first interior and comprising: a first reactor carbonaceous material input to the first interior; a first reactor reactant input to the first interior, and a first reactor product gas output; a second reactor having a second interior and comprising: a second reactor char input to the second interior, in fluid communication with the first reactor product gas output; a second reactor oxygen-containing gas input to the second interior; a second reactor product gas output; and a second reactor heat exchanger in thermal contact with the second interior, the second reactor heat exchanger comprising a second reactor heat transfer medium inlet and a second reactor heat transfer medium outlet, the second reactor heat transfer medium outlet being in fluid communication with the first reactor reactant input; and, a third reactor having a third interior and comprising: one or more product gas inputs to the third interior, in fluid communication with the first and second product gas outputs; a third reactor oxygen-containing gas input to the third interior; a third reactor product gas output; and a third reactor heat exchanger in thermal contact with the third interior, the third reactor heat exchanger comprising a third reactor heat transfer medium inlet and a third reactor heat transfer medium outlet, the third heat transfer medium outlet being in fluid communication with the second reactor heat transfer medium inlet;

wherein: the third reactor heat exchanger is configured to receive a heat transfer medium at a third reactor inlet temperature via the third reactor heat transfer medium inlet; and a first portion of the heat transfer medium passes through the third reactor heat exchanger and then the second reactor heat exchanger before being introduced, into the first interior via the first reactor reactant input, as a reactant at a first reactor reactant temperature, the first reactor reactant temperature being higher than the third reactor inlet temperature.

In embodiments, a second reactor reactant input to the second interior; wherein: the second reactor reactant input is in fluid communication with the second reactor heat transfer medium outlet and is configured to introduce at least a portion of said heat transfer medium into the second interior as a reactant of the second reactor. In embodiments, a first reactor oxygen-containing gas input is made available to the first interior and is configured to receive a first reactor oxygen-containing gas.

In embodiments, the three-stage energy-integrated product gas generation system includes a first solids separation device having: a first separation input in fluid communication with the first reactor product gas output; a first separation char output in fluid communication with the second reactor char input; and, a first separation gas output. In embodiments, the three-stage energy-integrated product gas generation system includes a second solids separation device having: a second separation input in fluid communication with the second reactor product gas output; a second separation solids output in fluid communication with a solids transfer conduit; and, a second separation gas output. In embodiments, the three-stage energy-integrated product gas generation system includes a combined reactor product gas conduit in fluid communication with both the first separation gas output and the second separation gas output and configured to combine product gas created by both the first reactor and the second reactor.

In embodiments, the first interior comprises: a first reactor dense bed zone; a first reactor feed zone located above the first reactor dense bed zone; and, a first reactor splash zone located above the first reactor feed zone. In embodiments, the first reactor dense bed zone reactant input is configured to receive a first reactor dense bed zone reactant into the first reactor dense bed zone; the first reactor feed zone reactant input is configured to receive a first reactor feed zone reactant into the first reactor feed zone; and the first reactor splash zone reactant input is configured to receive a first reactor splash zone reactant into the first reactor splash zone. In embodiments, the three-stage energy-integrated product gas generation system includes at least three first reactor feed zone reactant inputs; and, at least three first reactor splash zone reactant inputs.

In embodiments, the first reactor includes a first reactor dense bed zone oxygen-containing gas input configured to receive a first reactor oxygen-containing gas into the first reactor dense bed zone; a first reactor feed zone oxygen-containing gas input configured to receive a first reactor feed zone oxygen-containing gas into the first reactor feed zone; and a first reactor splash zone oxygen-containing gas input configured to receive a first reactor splash zone oxygen-containing gas into the first reactor splash zone. In embodiments, the first rector includes at least three first reactor feed zone oxygen-containing gas inputs; and, at least three first reactor splash zone oxygen-containing gas inputs.

In embodiments, the second interior comprises: a second reactor dense bed zone; a second reactor feed zone located above the second reactor dense bed zone; and, a second reactor splash zone located above the second reactor feed zone.

In embodiments, the second reactor dense bed zone reactant input configured to receive a second reactor dense bed zone reactant into the second reactor dense-bed zone; the second reactor feed zone reactant input configured to receive a second reactor feed zone reactant into the second reactor feed zone; and, the second reactor splash zone reactant input configured to receive a second reactor splash zone reactant into the second reactor splash zone. In embodiments, the second reactor includes at least three second reactor feed zone reactant inputs; and at least three second reactor splash zone reactant inputs.

In embodiments, the second reactor includes a second reactor dense bed zone oxygen-containing gas input configured to receive a second reactor oxygen-containing gas into the second reactor dense bed zone; a second reactor feed zone oxygen-containing gas input configured to receive a second reactor feed zone oxygen-containing gas into the second reactor feed zone; and a second reactor splash zone oxygen-containing gas input configured to receive a second reactor splash zone oxygen-containing gas into the second reactor splash zone. In embodiments, the three-stage energy-integrated product gas generation system includes at least three second reactor feed zone oxygen-containing gas inputs; and, at least three second reactor splash zone oxygen-containing gas inputs.

In embodiments, a second reactor solids output; and a first reactor solids input are in fluid communication and the first reactor solids input is configured to receive, into the first interior, second reactor particulate heat transfer material present in the second interior.

In embodiments, the first reactor includes a first reactor first heat exchanger in thermal contact with the first interior, the first reactor first heat exchanger comprising: a first reactor first heat exchanger fuel inlet configured to receive a first reactor first heat exchanger fuel at a first inlet temperature; and a first reactor first heat exchanger combustion stream outlet configured to output a first reactor first heat exchanger combustion stream, at a first outlet temperature.

In embodiments, an auxiliary heat exchanger is external to the first reactor and in thermal contact with the first reactor first heat exchanger combustion stream exiting the first reactor first heat exchanger combustion stream outlet; wherein the auxiliary heat exchanger is configured to transfer heat from the first reactor first heat exchanger combustion stream to an auxiliary heat exchanger heat transfer medium which exits the auxiliary heat exchanger via auxiliary heat exchanger heat transfer medium outlet conduit. In embodiments, the auxiliary heat exchanger heat transfer medium outlet conduit is in fluid communication with the second reactor heat transfer medium inlet, to thereby supply the auxiliary heat exchanger heat transfer medium to the second reactor heat exchanger. In embodiments, a portion of the third reactor heat transfer medium is transferred from the outlet of the third reactor heat exchanger to the inlet of the auxiliary heat exchanger for use as the auxiliary heat exchanger heat transfer medium. In embodiments, a steam turbine with an integrated generator is configured to accept the superheated heat transfer medium discharged from the auxiliary heat exchanger to produce power.

In embodiments, the first reactor includes at least two first reactor heat exchangers positioned in the first interior and vertically spaced apart from one another along a height dimension of the first interior; wherein: alternate first reactor heat exchangers along said height dimension are arranged cross-wise to one another such that, in a top view of the first interior, the four first reactor heat exchangers define four open vertically extending quadrants. In embodiments, the first reactor includes six first reactor carbonaceous material inputs to the first interior; wherein: only two of the six first reactor carbonaceous material inputs are configured to inject carbonaceous material into the vertically extending quadrants.

In embodiments, the three-stage energy-integrated product gas generation system includes at least two first reactors in fluid communication one common third reactor, each first reactor configured to produce a source of first reactor product gas. In embodiments, the three-stage energy-integrated product gas generation system includes at least two second reactors in fluid communication with one common third reactor; each second reactor configured to produce a source of second reactor product gas which is supplied to the common third reactor.

In embodiments, the third reactor further comprises an annulus-type burner at a top portion thereof; the annulus-type burner has annular port configured to receive an oxygen-containing gas, and a central port configured to receive a hydrocarbon stream; and the annulus-type burner further comprises a nozzle through which a combustion stream is output into a reaction zone of the third reactor (300).

In embodiments, the disclosure relates to a method for producing a H2, CO, and CO2 from a carbonaceous material using a first reactor, a second reactor, and a third reactor, the method comprising:
(a) reacting carbonaceous material with a steam reactant in the first reactor and producing a first reactor product gas containing char;
(b) introducing at least a portion of the char generated in step (a) into the second reactor;
(c) reacting the char of step (b) with an oxygen-containing gas in the second reactor and producing a second reactor product gas;
(d) transferring the first reactor product gas generated in step (a) and the second reactor product gas generated in step (c) to the third reactor, to form a combined product gas;
(e) reacting the combined product gas with an oxygen-containing gas in the third reactor to generate a third reactor product gas and heat;
(f) transferring heat generated in step (e) to a heat transfer medium contained within a third reactor heat exchanger in thermal contact with the interior of the third reactor;
(g) transferring at least some of the heat transfer medium which has passed through the third reactor heat exchanger, to a second reactor heat exchanger in thermal contact with the interior of the second reactor;
(h) introducing a first portion of the heat transfer medium which has passed through the second reactor heat exchanger, into the first reactor as the steam reactant of step (a).

In embodiments, a second portion of the heat transfer medium which has passed through the second reactor heat exchanger may be transferred into the second reactor as a reactant. In embodiments, an oxygen-containing gas may be transferred to the first reactor, said oxygen-containing gas reacting with the carbonaceous material and the steam. In embodiments, char from the first reactor product gas is separated prior to being transferred to the second reactor prior to step (b). In embodiments, the first reactor product gas of step (a) further comprises H2, CO, CO2, semi-volatile organic compounds (SVOC) and volatile organic compounds (VOC).

In embodiments, the char in the first reactor product gas has a carbon content of about 10% carbon to about 90% carbon on a weight basis. In embodiments, the char in the first reactor product gas has an ash content range from about 90% ash to about 10% ash on a weight basis. In embodiments, the second reactor product gas of step (c) further comprises solids. In embodiments, the solids contained within second reactor product gas comprises about 0% to about 90% carbon on a weight basis. In embodiments, the solids contained within second reactor product gas comprises about 5% to about 30% carbon on a weight basis. In embodiments, the solids contained within second reactor product gas comprises about 10% to about 100% ash on a weight basis. In embodiments, the solids contained within second reactor product gas comprises about 70% to about 95% ash on a weight basis. In embodiments, the carbon conversion rate in the first reactor is in the range from about 50% to about 99%. In embodiments, the carbon conversion rate in the first reactor is in the range from about 75% to about 95%. In embodiments, the second reactor converts into said second reactor product gas, 50% to 99% of the carbon contained within char transferred from the first reactor to the second reactor.

In embodiments, the first reactor product gas generated in step (a) and the second reactor product gas generated in step (c) are combined, prior to being transferred into the third reactor. In embodiments, in step (e): the combined product gas includes SVOC, VOC and char from the first reactor product gas, and said SVOC, VOC and char reacts with said oxygen-containing gas to generate said third reactor product gas and heat. In embodiments, in step (e), the third reactor product gas comprises H2, CO, and CO2. In embodiments, in step (e), the oxygen-containing gas is superstoichiometric. In embodiments, superstoichiometric oxygen-containing gas is combusted with a first hydrocarbon stream to produce a first portion of the CO2 in the third reactor product gas. In embodiments, first hydrocarbon stream is natural gas. In embodiments, the superstoichiometric oxygen-containing gas is combusted with a second hydrocarbon stream to produce a second portion of the CO2 in the third reactor product gas. In embodiments, the second hydrocarbon stream comprises naphtha transferred from a downstream Upgrading System. In embodiments, the superstoichiometric oxygen-containing gas is combusted with a third hydrocarbon stream to produce a third portion of the CO2 in the third reactor product gas. In embodiments, the third hydrocarbon stream is an off-gas transferred from a downstream Upgrading System.

In embodiments, a hydrocarbon stream and an oxygen-containing gas stream are combined and combusted together in an annulus type burner connected to the third reactor and expelling a combustion stream into the third reactor, the combustion stream including uncombusted oxygen-containing gas; wherein all the oxygen-containing gas used in the reaction of step (e) with the combined product gas comprises uncombusted oxygen-containing gas from the combustion stream. In embodiments, the burner accepts a hydrocarbon stream and oxygen-containing gas stream through concentric ports, wherein the oxygen-containing gas is injected into an annular port, and the hydrocarbon stream is injected to the central port. In embodiments, a combustion stream exits the nozzle of the burner within the range of 200 feet per minute (ft/m) to the speed of sound. In embodiments, a combustion stream exits the nozzle of the burner within the range of about 50 feet per second (ft/s) to about 300 feet per second (ft/s). In embodiments, the burner operates as a Helmholtz pulse combustion resonator and the combustion stream exits the nozzle of the burner at an average flow velocity greater than 300 ft/s and the sound intensity in the burner is within the range of about 110 dB to about 190 dB. In embodiments, a portion of the combustion stream exits the burner to contact a portion of the combined product gas. In embodiments, the combustion stream reacts with a the combined product gas at an average reaction time ranging from about 0.0001 seconds to about 5.0 seconds. In embodiments, the heat transfer medium is superheated when it is in the second reactor heat exchanger. In embodiments, the superheated heat transfer medium is transferred into the second reactor to help generate the second reactor product gas.

In embodiments, (i) the first reactor product gas (122) has a first H2 to CO ratio; (ii) the second reactor product gas (222) has a second H2 to CO ratio; (iii) the third reactor product gas (322) has a third H2 to CO ratio; (iv) the first H2 to CO ratio is greater than the second H2 to CO ratio; and (v) the second H2 to CO ratio is greater than the third H2 to CO ratio. In embodiments, (i) the first reactor product gas (122) has a first CO to CO2 ratio; (ii) the second reactor product gas (222) has a second CO to CO2 ratio; (iii) the third reactor product gas (322) has a third CO to CO2 ratio; (iv) the third CO to CO2 ratio is greater than the second CO to CO2 ratio; and (v) the second CO to CO2 ratio is greater than the first CO to CO2 ratio.

In embodiments, a fuel source is combusted in a first reactor heat exchanger to form a combustion stream, said combustion stream indirectly heating particulate heat transfer material present in the first reactor. In embodiments, the heat transfer medium which has passed through the third reactor heat exchanger is superheated with heat from the combustion stream. In embodiments, the superheated heat transfer medium is introduced to a steam turbine having an integrated generator to produce power.

In embodiments, the first reactor operates at a first pressure; the second reactor operates at a second pressure which is lower than the first pressure; and, the third reactor operates at a third pressure which is lower than the second pressure.

In embodiments, a particulate heat transfer material is provided in the first reactor to promote the reaction between the carbonaceous material and steam. In embodiments, the particulate heat transfer material is transferred from the second reactor to the first reactor.

In embodiments, the first reactor includes particulate heat transfer material comprised of Geldart Group A solids; and the Geldart Group A solids comprise one or more from the group consisting of inert material, catalyst, sorbent, and engineered particles. In embodiments, the engineered particles comprise one or more from the group consisting of alumina, zirconia, sand, olivine sand, limestone, dolomite, catalytic materials, microballoons, and microspheres.

In embodiments, the second reactor includes particulate heat transfer material (105) is comprised of Geldart Group B solids; the Geldart Group B solids comprise one or more from the group consisting of inert material, catalyst, sorbent, and engineered particles. In embodiments, the engineered particles comprise one or more from the group consisting of alumina, zirconia, sand, olivine sand, limestone, dolomite, catalytic materials, microballoons, microspheres, and combinations thereof.

In embodiments, the first reactor includes particulate heat transfer material (105) is comprised of both Geldart Group A and B solids; and the Geldart Group A and B solids together comprise one or more from the group consisting of inert material, catalyst, sorbent, and engineered particles. In embodiments, the engineered particles comprise one or more from the group consisting of alumina, zirconia, sand, olivine sand, limestone, dolomite, catalytic materials, microballoons, and microspheres.

In embodiments, the first reactor at a temperature between 320° C. and 569.99° C. to endothermically react the carbonaceous material in the presence of steam to produce the first reactor product gas. In embodiments, the first reactor at a temperature between 570° C. and 900° C. to endothermically react the carbonaceous material in the presence of steam to produce the first reactor product gas. In embodiments, the second reactor at a temperature between 500° C. and 1,400° C. to exothermically react the char in the presence of an oxygen-containing gas to produce the second reactor product gas. In embodiments, the third reactor at a temperature between 1,100° C. and 1,600° C. to exothermically react a portion of the first reactor product gas in the presence of an oxygen-containing gas to produce the third reactor product gas.

In embodiments, the disclosure is related to a method for converting carbonaceous material into at least one liquid fuel, the method comprising:

(i) combining the carbonaceous material and carbon dioxide in a feedstock delivery system;
(ii) producing a third reactor product gas in accordance with the method of claim 28;
(iii) compressing at least a portion of the third reactor product gas to thereby form a compressed product gas;
(iv) removing carbon dioxide from the compressed product gas, and supplying a first portion of the removed carbon dioxide to the feedstock delivery system for combining with the carbonaceous material in step (i);
(v) reacting the compressed product gas with a catalyst after removing carbon dioxide; and
(vi) synthesizing at least one liquid fuel from the compressed product gas, after reacting the compressed product gas with a catalyst.

In embodiments, the liquid fuel comprises Fischer-Tropsch Products which may be upgraded into chemical compounds selected from the group consisting of diesel, jet fuel, and naphtha and combinations thereof. In embodiments, a portion of the naphtha is transferred to the third reactor.

In embodiments, the first reactor has a steam to carbonaceous material weight ratio in the range of about 0.125:1 to about 3:1. In embodiments, the first reactor has a carbon dioxide to carbonaceous material weight ratio in the range of about 0:1 to about 1:1. In embodiments, the first reactor has an oxygen-containing gas to carbonaceous material weight ratio in the range of about 0:1 to about 0.5:1. In embodiments, the second reactor has a steam to char-carbon weight ratio in the range of about 0:1 to about 2.5:1. In embodiments, the second reactor has an oxygen-containing gas to char-carbon weight ratio in the range of about 0:1 to about 2:1. In embodiments, the second reactor has a carbon dioxide to char-carbon weight ratio in the range of about 0:1 to about 2.5:1. In embodiments, the first reactor and second reactor operate at a superficial fluidization velocity range between 0.5 ft/s to about 25.0 ft/s. In embodiments, the first reactor operates at a superficial fluidization velocity range between 0.6 ft/s to about 1.2 ft/s. In embodiments, the first reactor operates at a superficial fluidization velocity range between 0.8 ft/s to about 1 ft/s. In embodiments, the second reactor operates at a superficial fluidization velocity range between 0.2 ft/s to about 0.8 ft/s. In embodiments, the second reactor operates at a superficial fluidization velocity range between 0.3 ft/s to about 0.5 ft/s.

In embodiments, at least two first reactors are in fluid communication with one common third reactor, each first reactor producing first reactor product gas. In embodiments, the first reactor is fed about 500 tons carbonaceous material, per day. In embodiments, at least two second reactors are in fluid communication with one common third reactor, each second reactor producing second reactor product gas. In embodiments, at least one of the second reactors is equipped with a particulate classification chamber; and configured to remove agglomerates or inert feedstock contaminants via the particulate classification chamber.

This disclosure further relates to the generation of product gas from carbonaceous materials using a continuous, uninterrupted, and reliable fluidized bed thermochemical reactor and particulate classification system. More specifically, the present disclosure further relates to a continuously operating product gas generation system integrated with a particulate classification vessel for cleaning bed material by separating via size and density classification smaller group Geldart solids for recycle back to the first reactor and allowing for the removal of comparatively larger Geldart solids from the system via a classifier vessel. The content of the disclosure is particularly applicable to the production of product gas from municipal solid waste (MSW) or refuse derived fuel (RDF) due to the improved cooperation between the first reactor and classifier to accommodate continuous, uninterrupted, and reliable product gas generation notwithstanding the unpredictable variations in carbonaceous material feedstock characterization. This disclosure further relates to systems and methods to mediate the unavoidable introduction of inert contaminants contained within carbonaceous material that would otherwise tend to accumulate within the fluidized bed resulting in defluidization and unplanned shutdown and maintenance. In embodiments, a fluidized bed having a mean bed particle characteristic including Geldart Group B solids may accept a solid MSW carbonaceous material having inert feedstock contaminants of Geldart Group D that are incapable of being thermochemically converted into product gas and instead unavoidably accumulate at unpredictable levels within the dense fluid bed causing defluidization and ultimately requiring process termination or shut-down.

In embodiments, the disclosure relates to a method for converting municipal solid waste (MSW) into at least one liquid fuel, the MSW containing Geldart Group D inert feedstock contaminants, the method comprising:
(a) combining the MSW and carbon dioxide in a feedstock delivery system;
(b) introducing, into a first interior of a first reactor containing bed material, steam and the combined MSW and carbon dioxide from the feedstock delivery system;
(c) reacting, in the first reactor, the MSW with steam and carbon dioxide, in an endothermic thermochemical reaction to generate a first reactor product gas containing char and leaving unreacted Geldart Group D inert feedstock contaminants in the bed material;
(d) cleaning the bed material with carbon dioxide to remove said unreacted Geldart Group D inert feedstock contaminants;
(e) introducing, into a second reactor containing a second particulate heat transfer material, an oxygen-containing gas and a portion of the char;
(f) reacting, in the second reactor, the char with the oxygen-containing gas, in an exothermic thermochemical reaction to generate a second reactor product gas;
(g) introducing, into a third reactor, an oxygen-containing gas and the first reactor product gas generated in step (c) and the second reactor product gas generated in step (f);
(h) reacting, in the third reactor, the product gas with the oxygen-containing gas, in an exothermic thermochemical reaction to generate a third reactor product gas;
(i) compressing the first and/or second reactor product gas to thereby form a compressed product gas;
(j) removing carbon dioxide from the compressed product gas, and supplying a first portion of the removed carbon dioxide to the feedstock delivery system for combining with the MSW in step (a); and supplying a second portion of the removed carbon dioxide to clean the bed material in step (d);
(k) reacting the compressed product gas with a catalyst after removing carbon dioxide; and
(l) synthesizing at least one liquid fuel from the compressed product gas, after reacting the compressed product gas with a catalyst;

wherein:
the Geldart Group D inert feedstock contaminants comprise whole units and/or fragments of one or more from the group consisting of allen wrenches, ball bearings, batteries, bolts, bottle caps, broaches, bushings, buttons, cable, cement, chains, clips, coins, computer hard drive shreds, door hinges, door knobs, drill bits, drill bushings, drywall anchors, electrical components, electrical plugs, eye bolts, fabric snaps, fasteners, fish hooks, flash drives, fuses, gears, glass, gravel, grommets, hose clamps, hose fittings, jewelry, key chains, key stock, lathe blades, light bulb bases, magnets, metal audio-visual components, metal brackets, metal shards, metal surgical supplies, mirror shreds, nails, needles, nuts, pins, pipe fittings, pushpins, razor blades, reamers, retaining rings, rivets, rocks, rods, router bits, saw blades, screws, sockets, springs, sprockets, staples, studs, syringes, USB connectors, washers, wire, wire connectors, and zippers.

In embodiments, the disclosure is related to a municipal solid waste (MSW) energy recovery system for converting MSW containing inert feedstock contaminants, into a product gas, the system comprising:
(a) a first reactor comprising: a first reactor interior suitable for accommodating a bed material and endothermically reacting MSW in the presence of steam to produce product gas; a first reactor carbonaceous material input for introducing MSW into the first reactor interior; a first reactor reactant input for introducing steam into the first interior; a first reactor product gas output through which product gas is removed; a classified recycled bed material input in fluid communication with an upper portion of the first reactor interior; a particulate output connected to a lower portion of the first reactor interior, and through which a mixture of bed material and unreacted inert feedstock contaminants selectively exits the first reactor interior; and,
(b) at least one particulate classification vessel in fluid communication with the first reactor interior, the vessel comprising: (i) a mixture input connected to the particulate output, for receiving said mixture from the first reactor interior; (ii) a classifier gas input connected to a source of classifier gas, for receiving classifier gas to promote separation of said bed material from said unreacted inert feedstock contaminants within said vessel; (iii) a bed material output connected to the classified recycled bed material input of the first reactor interior via a classifier riser conduit, for returning bed material separated from said mixture to the first reactor interior; and (iv) a contaminant output for removing unreacted inert feedstock contaminants which have been separated from said mixture, within the vessel;
wherein: a mixture transfer valve is positioned between the particulate output and the mixture input, to selectively control transfer of said mixture from the first reactor to the vessel; a gas distributor valve is positioned to separate the classifier interior into a classifier zone and a gas distribution zone; a classification gas transfer valve is positioned between the source of classifier gas and the classifier gas input, to selectively provide said classifier gas to the vessel; a bed material riser recycle transfer valve is positioned between the bed material output and the classified recycled bed material input, to selectively return bed material separated from said mixture, to the first reactor interior; and an inert feedstock contaminant drain valve configured to selectively remove unreacted inert feedstock contaminants which have been separated from said mixture.

In embodiments, the gas distributor valve has perforations so as to permit the valve to be in the closed position and still allow (a) classifier gas to pass up through the valve, and (b) inert feedstock contaminants and bed material to not pass down through the valve. In embodiments, the perforations of the gas distributor valve range from about 10 to about 100 microns. In embodiments, the classifier vessel further comprises a classifier depressurization gas output; and a depressurization vent valve connected to the classifier depressurization gas output to selectively vent the vessel. In embodiments, the classifier gas is carbon dioxide. In embodiments, the product gas comprises carbon dioxide; and a first portion of the carbon dioxide in the product gas is introduced into the vessel as the classifier gas.

In embodiments, a master controller configured to operate the system in any one of a plurality of states, including: a first state in which the mixture transfer valve, gas distributor valve, classification gas transfer valve, bed material riser recycle transfer valve, and inert feedstock contaminant drain valve are closed; a second state in which the mixture transfer valve is open and the remainder of said valves are closed, to allow said mixture to enter the vessel; a third state in which the classification gas transfer valve and the bed material riser recycle transfer valve are open and the remainder of said valves are closed, to promote separation of said bed material from said mixture and recycling of separated bed material back into the first reactor; a fourth state in which the depressurization vent valve is open and the remainder of said valves are closed, to allow the vessel to vent; and a fifth state in which the gas distributor valve and inert feedstock contaminant drain valve are open and the remainder of said valves are closed, to remove unreacted inert feedstock contaminants from the vessel.

BRIEF DESCRIPTION OF THE DRAWINGS

Reference will now be made in detail to various embodiments of the disclosure. Each embodiment is provided by way of explanation of the disclosure, not limitation of the disclosure. It will be apparent to those skilled in the art that modifications and variations can be made in the disclosure without departing from the teaching and scope thereof, for instance, features illustrated or described as part of one embodiment to yield a still further embodiment derived from the teaching of the disclosure. Thus, it is intended that the disclosure or content of the claims cover such derivative modifications and variations to come within the scope of the disclosure or claimed embodiments described herein and their equivalents.

Additional objects and advantages of the disclosure will be set forth in part in the description which follows, and in part will be obvious from the description, or may be learned by practice of the claims. The objects and advantages of the disclosure will be attained by means of the instrumentalities and combinations and variations particularly pointed out in the appended claims.

Figure 1:
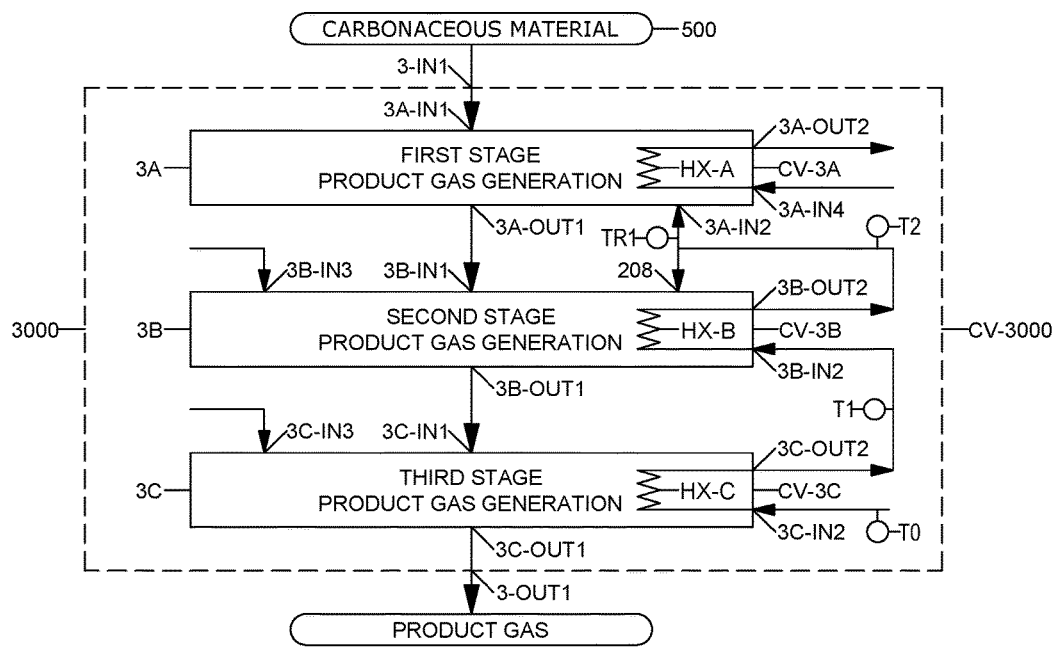

The accompanying figures show schematic process flowcharts of preferred embodiments and variations thereof. A full and enabling disclosure of the content of the accompanying claims, including the best mode thereof to one of ordinary skill in the art, is set forth more particularly in the remainder of the specification, including reference to the accompanying figures showing how the preferred embodiments and other non-limiting variations of other embodiments described herein may be carried out in practice, in which:

FIG. 1 shows a simplistic block flow control volume diagram of one embodiment of an three-stage energy integrated product gas generation system (1001) used as a Product Gas Generation System (3000).

Figure 2:
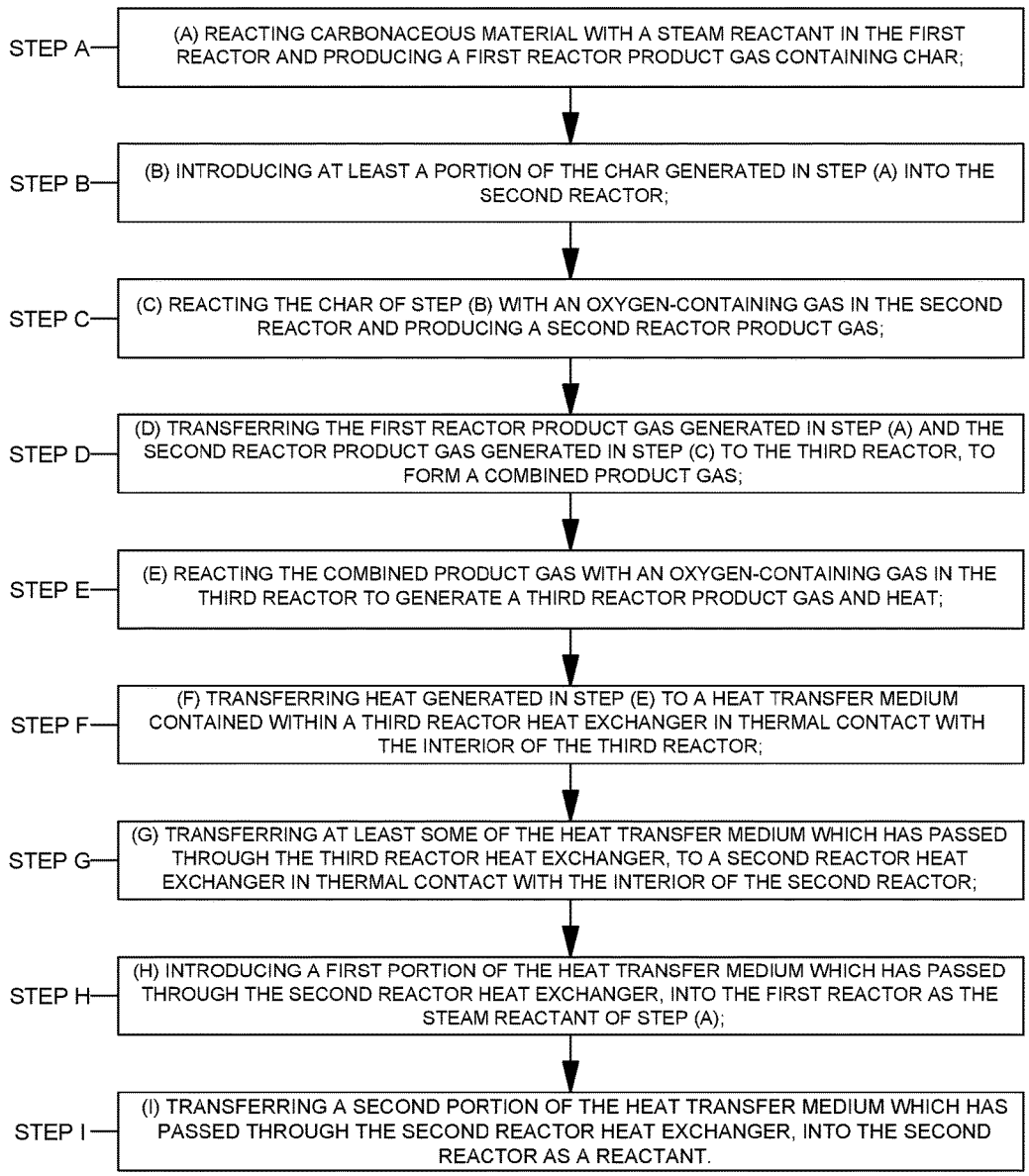

FIG. 2 shows an embodiment of a three-stage energy integrated product gas generation method.

Figure 3:
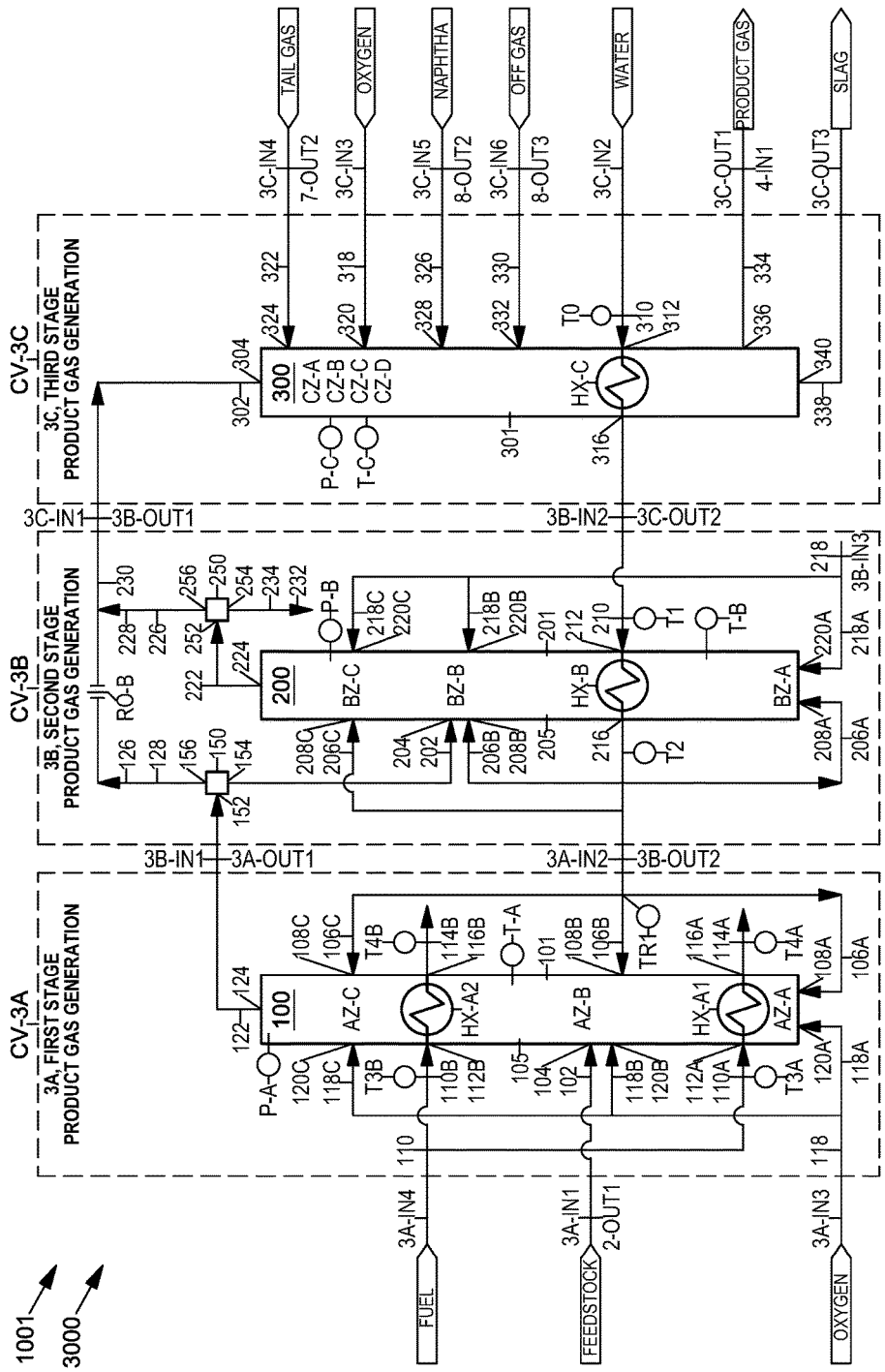
Figure 4:
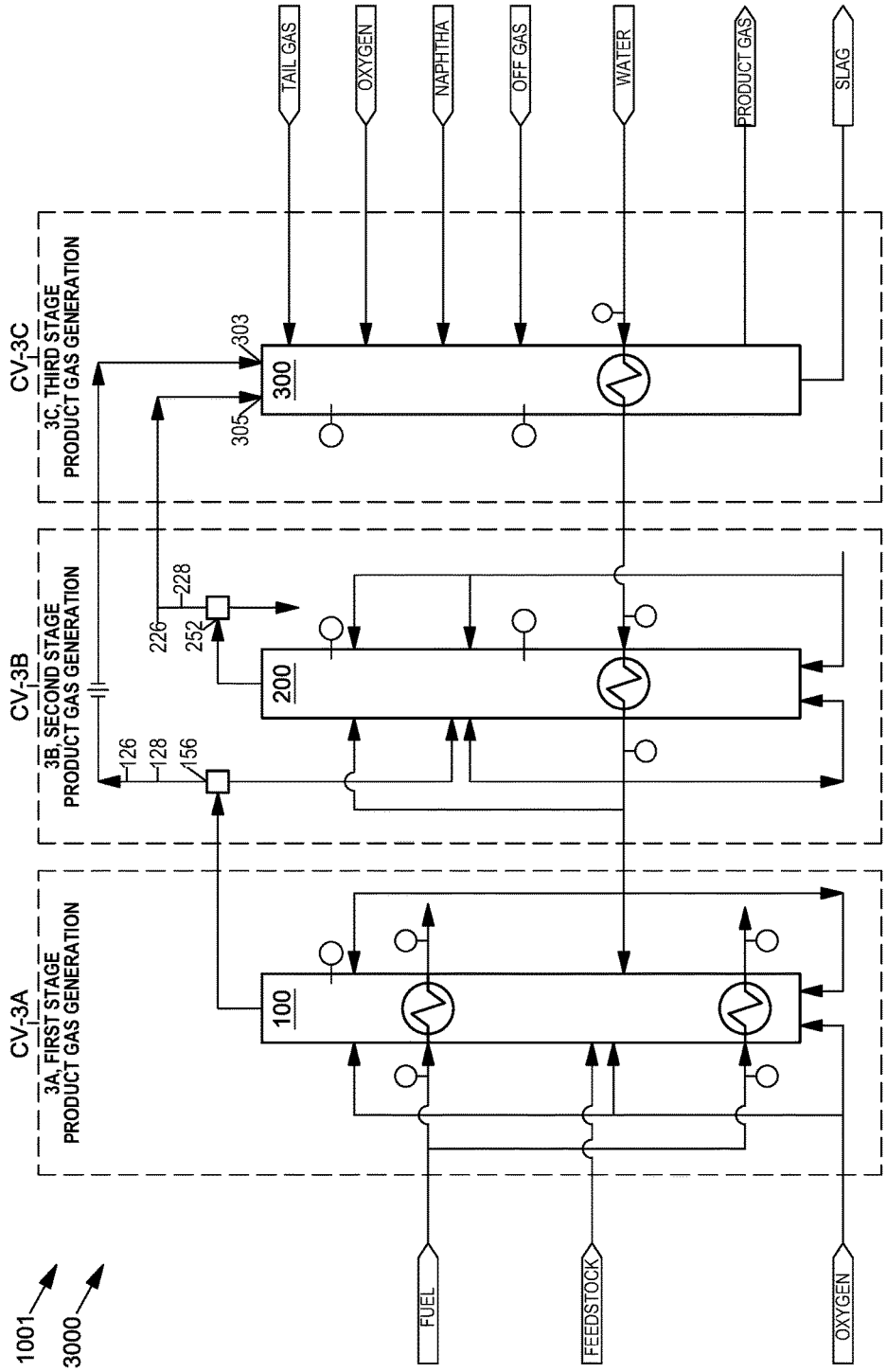

FIG. 3 shows a simplistic block flow control volume diagram of one embodiment of an three-stage energy integrated product gas generation system (1001) used as a Product Gas Generation System (3000);

FIG. 4 elaborates upon the non-limiting embodiment of FIG. 3 however shows the third reactor (300) having both a first reactor product gas input (303) and a second reactor product gas input (305) as opposed to only one combined product gas input (304).

Figure 5:
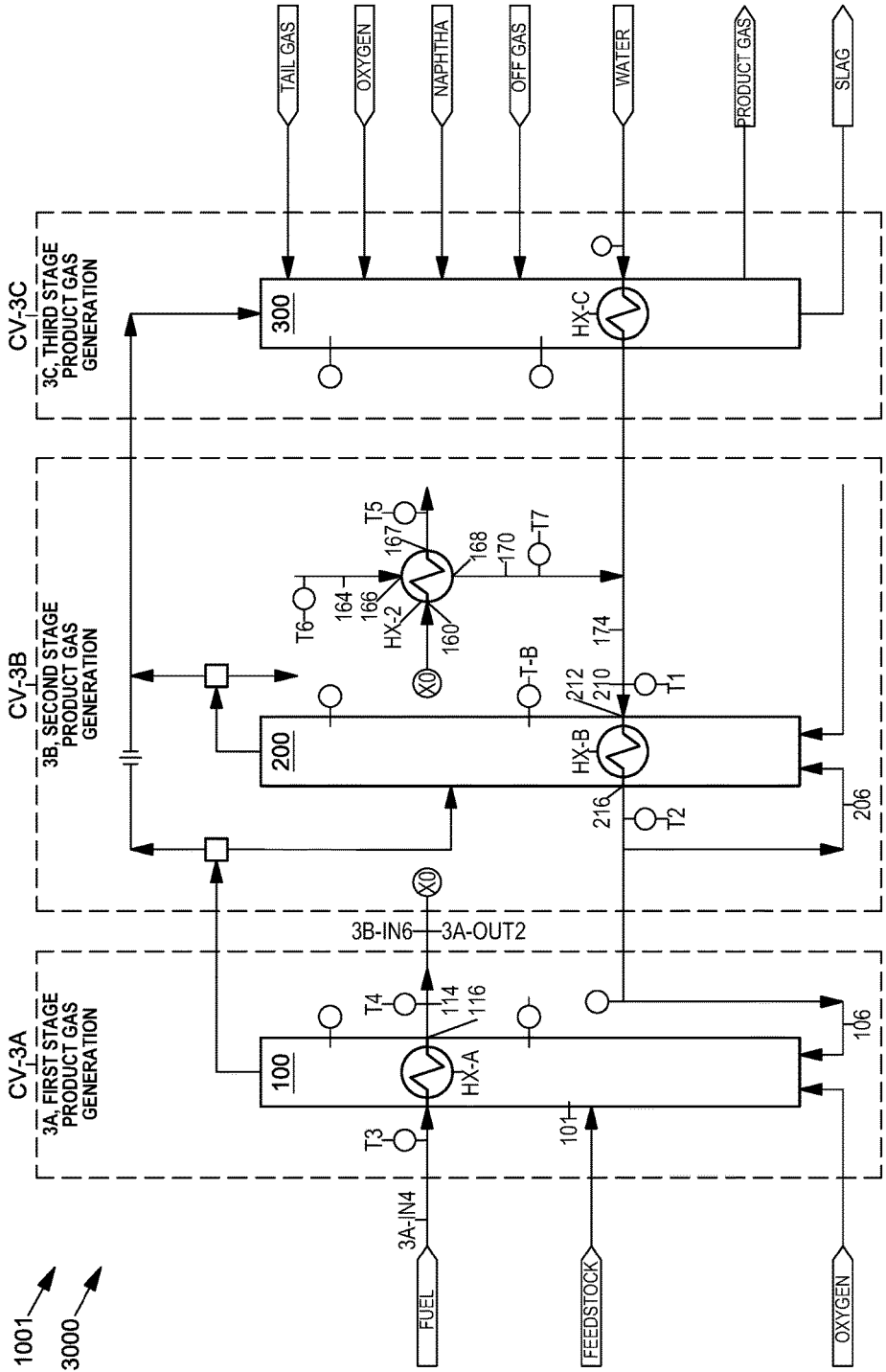

FIG. 5 elaborates upon the non-limiting embodiment of FIG. 3 further including an auxiliary heat exchanger (HX-2) configured to transfer heat from a combustion stream (114) to an auxiliary heat exchanger heat transfer medium (164) that is fluid communication with the heat transfer medium inlet (212) of the second reactor heat exchanger (HX-B) via a heat transfer medium outlet conduit (170).

Figure 6:
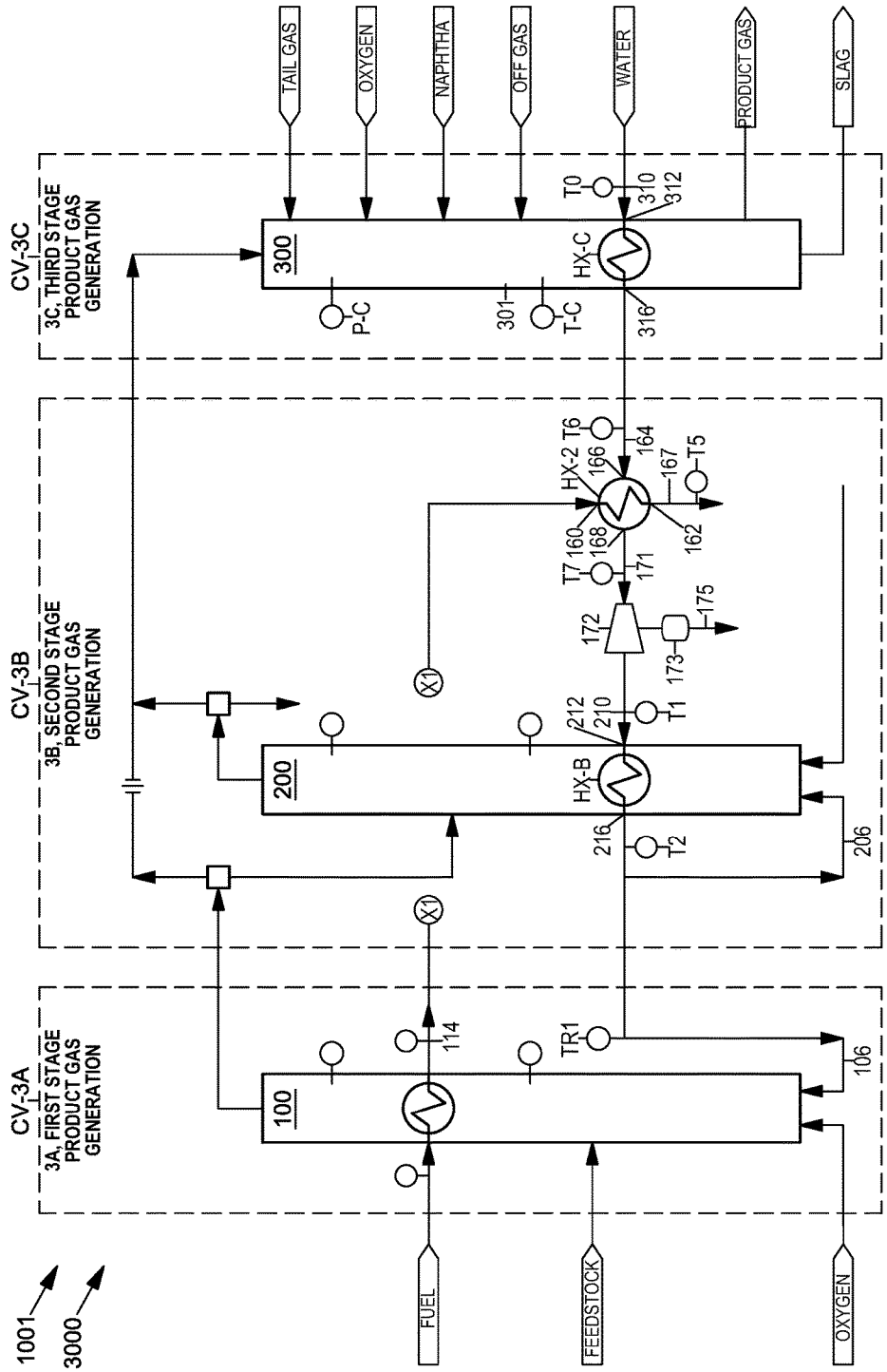

FIG. 6 elaborates upon the non-limiting embodiment of FIG. 5 where a portion of the third reactor heat transfer medium (310) is transferred from the outlet (316) of the third reactor heat exchanger (HX-C) to the inlet (166) of the auxiliary heat exchanger (HX-2) for use as the auxiliary heat exchanger heat transfer medium (164).

Figure 7:
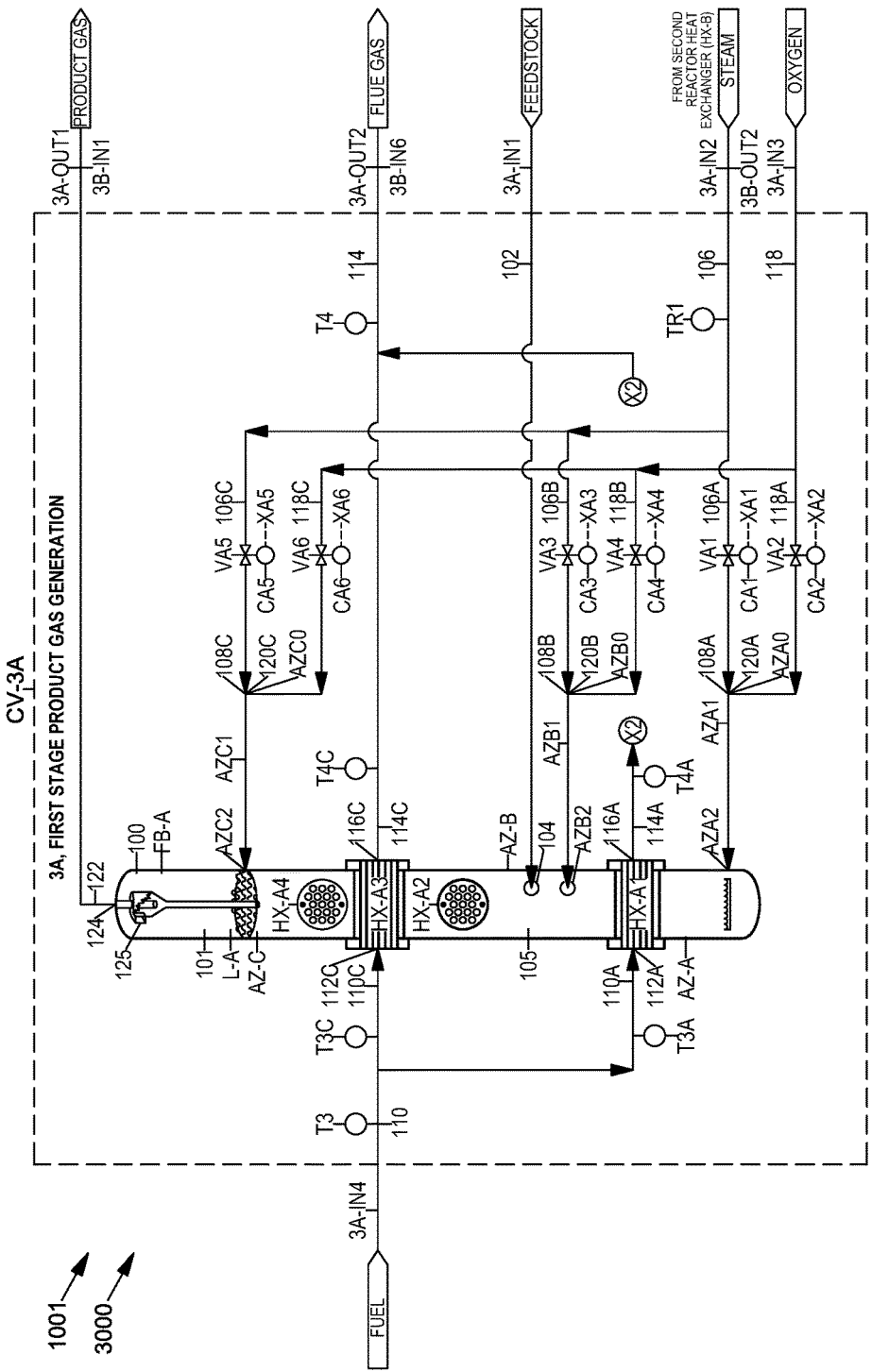

FIG. 7 is a detailed view of FIG. 3 showing a non-limiting embodiment of a First Stage Product Gas Generation Control Volume (CV-3A) and First Stage Product Gas Generation System (3A) of a three-stage energy-integrated product gas generation system (1001) including a first reactor (100) equipped with a dense bed zone (AZ-A), feed zone (AZ-B), and splash zone (AZ-C), along with the first reactor carbonaceous material input (104), valves, sensors, and controllers.

Figure 8:
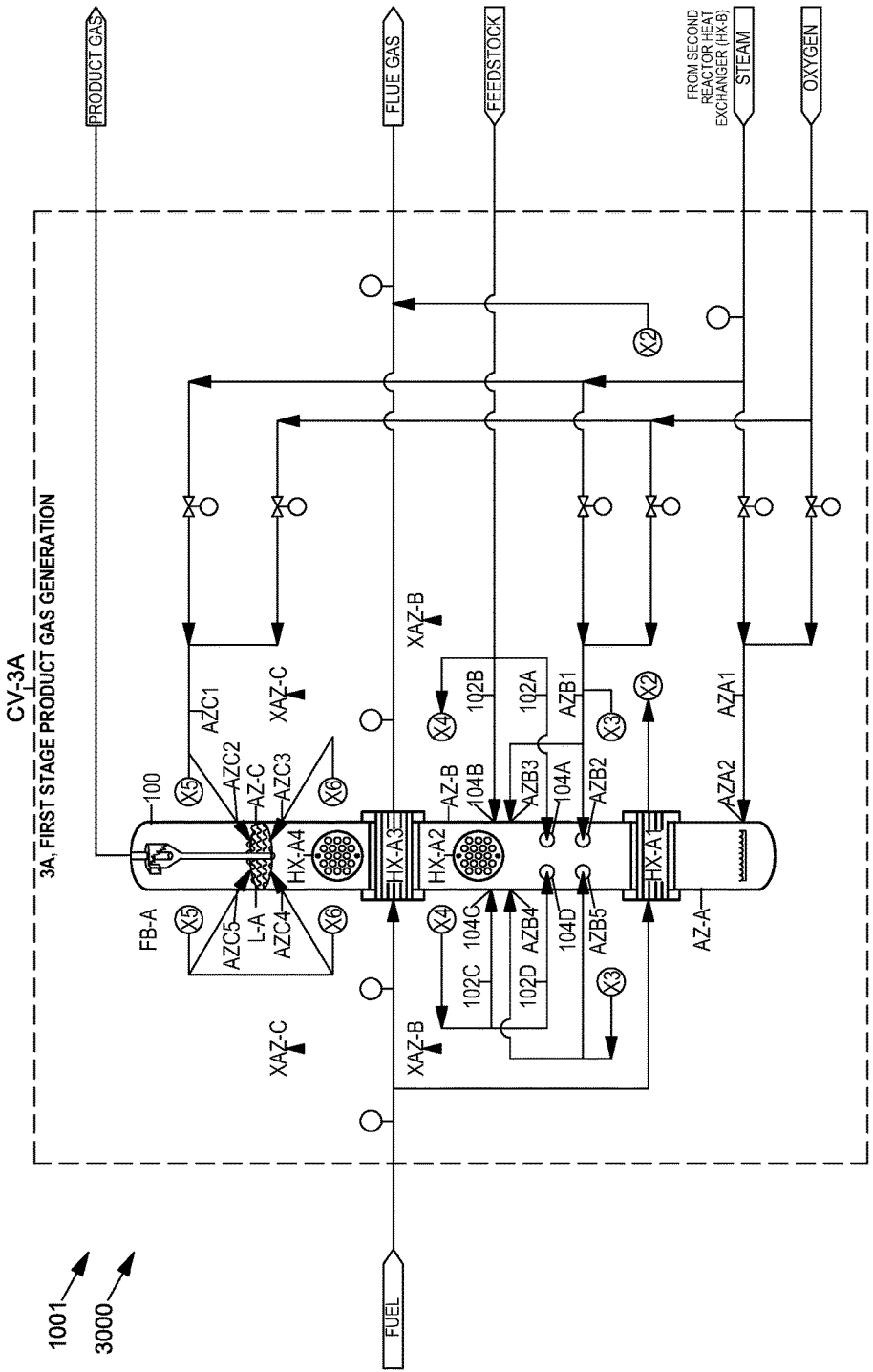

FIG. 8 elaborates upon the non-limiting embodiment of FIG. 7 further including multiple carbonaceous material inputs (104A, 104B, 104C, 104D) and multiple feed zone steam/oxygen inputs (AZB2, AZB3, AZB4, AZB5) positioned in the feed zone (AZ-B) along with multiple splash zone steam/oxygen inputs (AZC2, AZC3, AZC4, AZC5) positioned in the splash zone (AZ-C).

Figure 9:
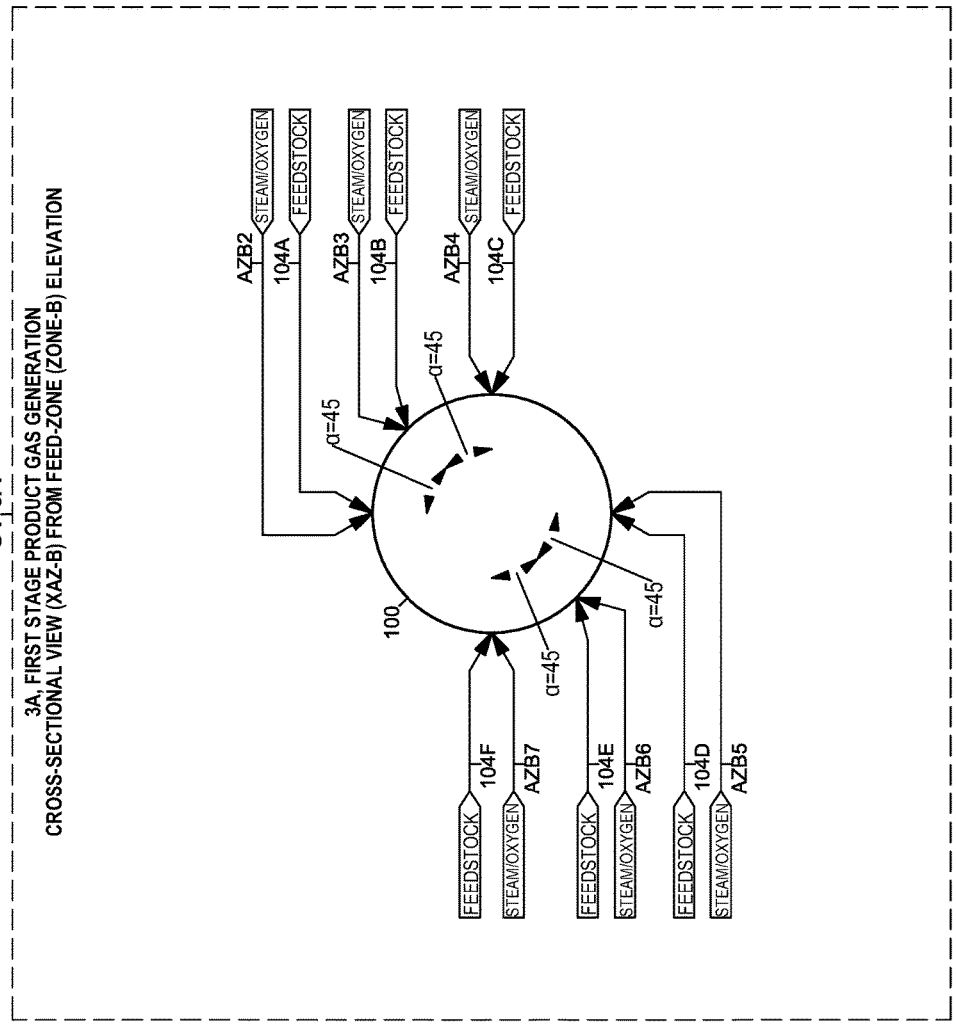

FIG. 9 shows a non-limiting embodiment of a first reactor feed zone circular cross-sectional view (XAZ-B) from the embodiment of FIG. 8.

Figure 10:
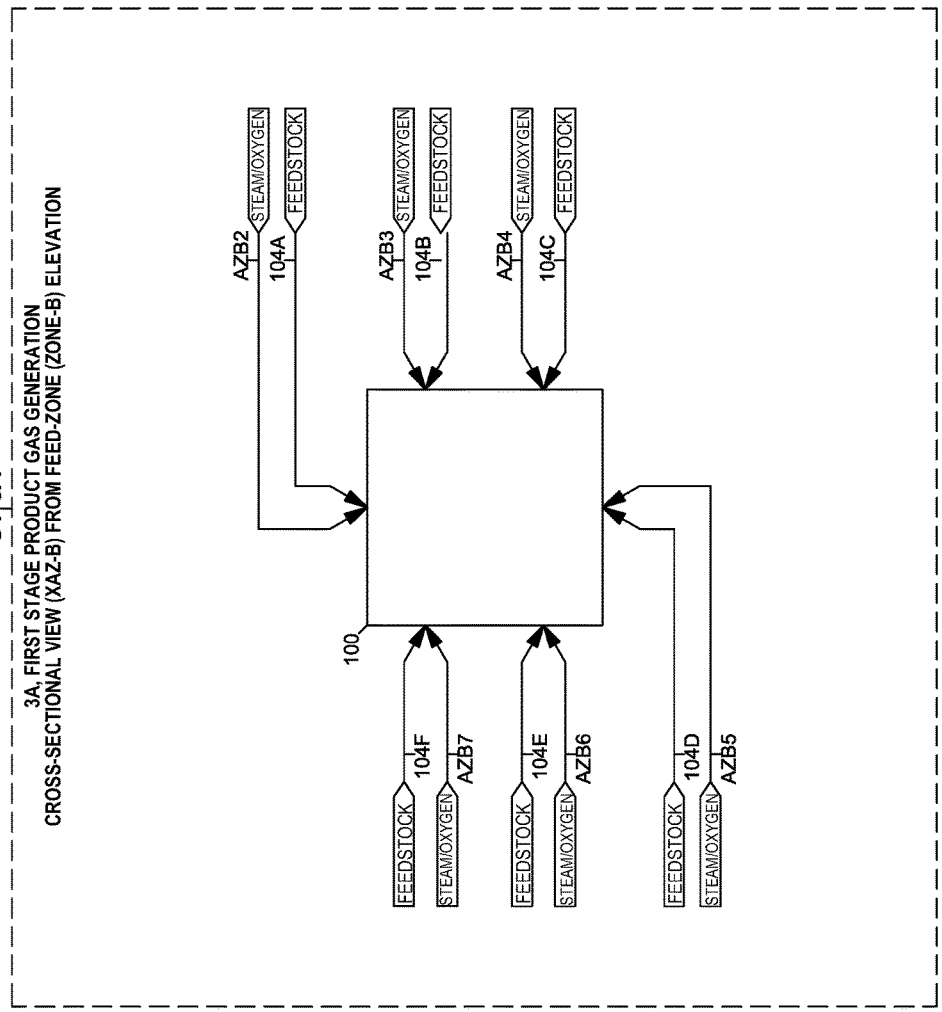

FIG. 10 shows a non-limiting embodiment of a first reactor feed zone rectangular cross-sectional view (XAZ-B) from the embodiment of FIG. 8.

Figure 11:
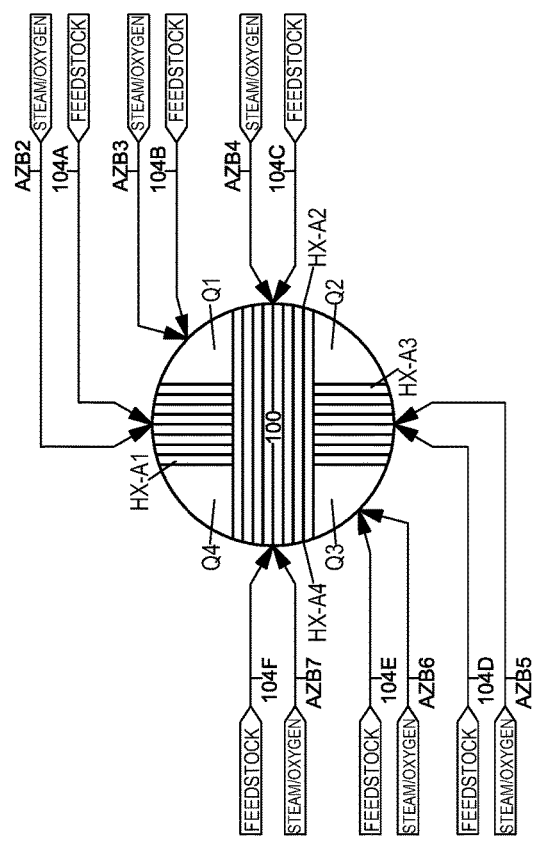

FIG. 11 shows a non-limiting embodiment of a first reactor feed zone cross-sectional view (XAZ-B) from the embodiment of FIG. 8 where only two of the six first reactor (100) carbonaceous material inputs (104B,104E) are configured to inject carbonaceous material into vertically extending quadrants (Q1, Q2, Q3, Q4).

Figure 12:
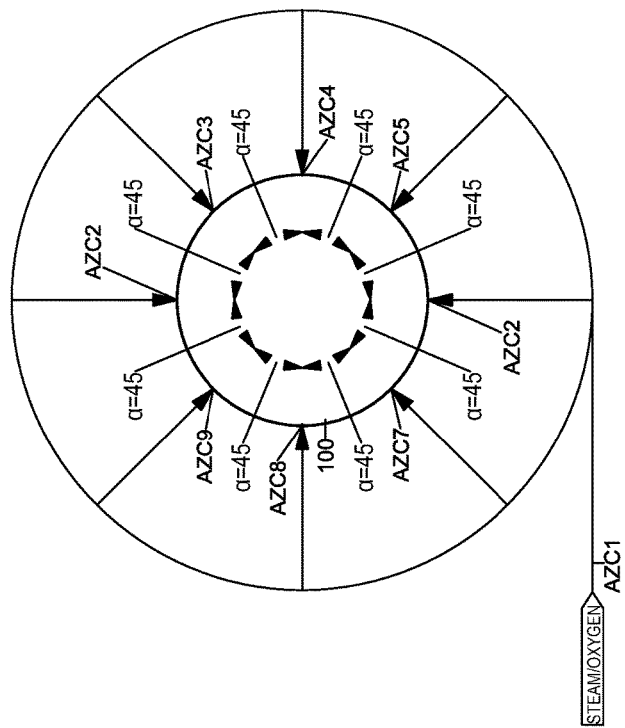

FIG. 12 shows a non-limiting embodiment of a first reactor splash zone cross-sectional view (XAZ-C) from the embodiment of FIG. 8.

Figure 13:
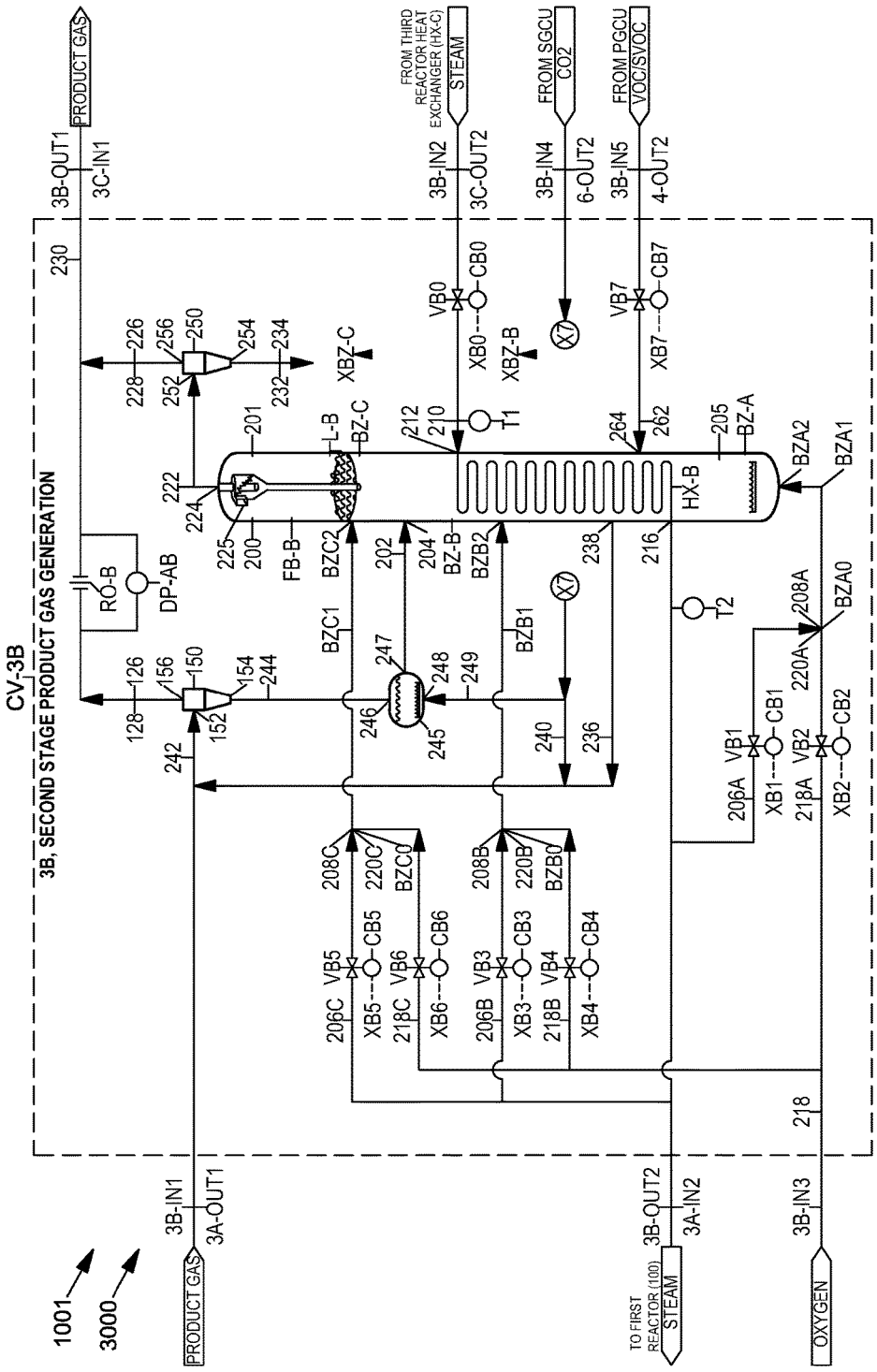

FIG. 13 is a detailed view of FIG. 3 showing a non-limiting embodiment of a Second Stage Product Gas Generation Control Volume (CV-3B) and Second Stage Product Gas Generation System (3B) of a three-stage energy-integrated product gas generation system (1001) including a second reactor (200) equipped with a dense bed zone (BZ-A), feed zone (BZ-B), and splash zone (BZ-C), along with a second reactor heat exchanger (HX-B), first solids separation device (150), second solids separation device (250), solids flow regulator (245), riser (236), dipleg (244), and valves, sensors, and controllers.

Figure 14:
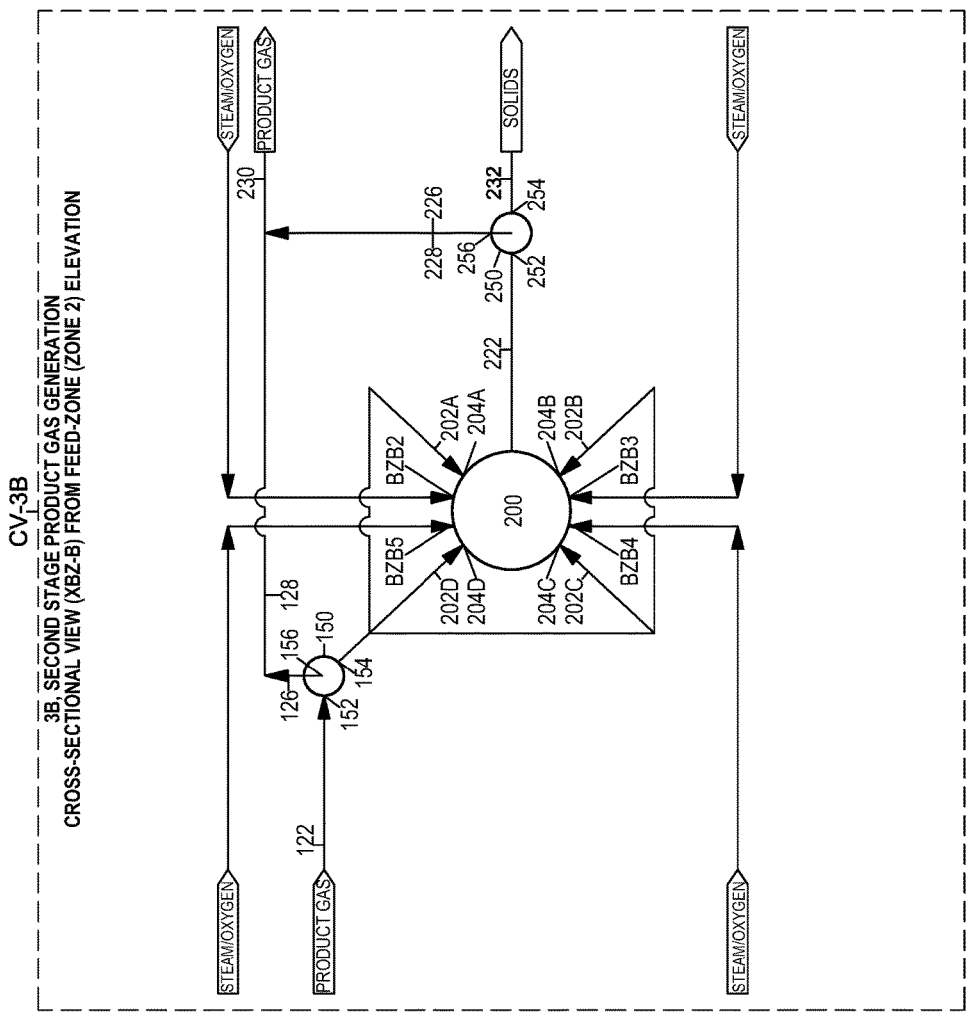

FIG. 14 shows a non-limiting embodiment of a second reactor feed zone cross-sectional view (XBZ-B) of the embodiment in FIG. 13, including: one first solids separation device (150); four second reactor first char inputs (204A, 204B, 204C, 204D); four feed zone steam/oxygen inputs (BZB2, BZB3, BZB4, BZB5); and, where the combined reactor product gas conduit (230) is configured to blend the first reactor product gas (126) with the second reactor product gas (226).

Figure 15:
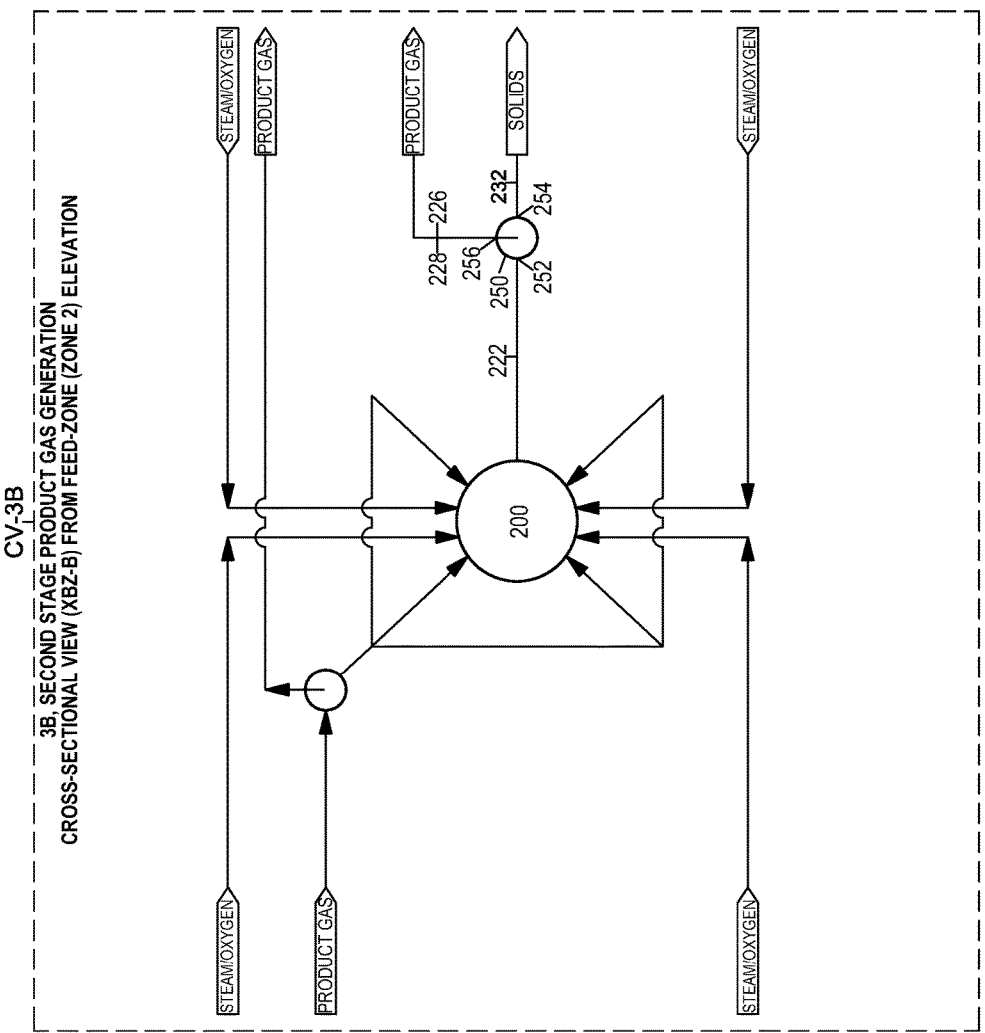

FIG. 15 shows a non-limiting embodiment of a second reactor feed zone cross-sectional view (XBZ-B) of the embodiment in FIG. 13 where the first reactor product gas (126) is not combined with the second reactor product gas (226).

Figure 16:
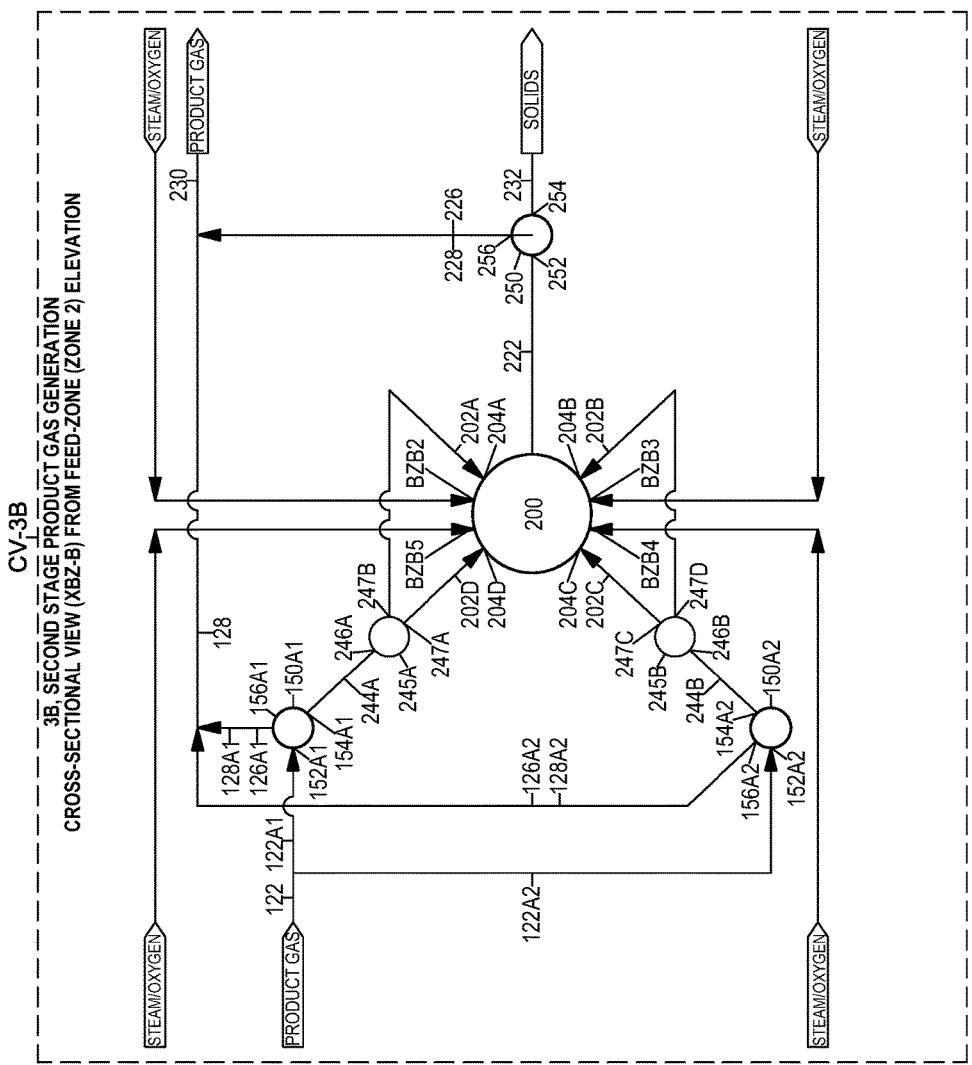

FIG. 16 shows a non-limiting embodiment of a second reactor feed zone cross-sectional view (XBZ-B) of the embodiment in FIG. 13, including: two first solids separation devices (150A1, 150A2); two solids flow regulators (245A, 245B); four second reactor first char inputs (204A, 204B, 204C, 204D); four feed zone steam/oxygen inputs (BZB2, BZB3, BZB4, BZB5); and, where the combined reactor product gas conduit (230) is configured to blend the first reactor product gas (126A1, 126A2) with the second reactor product gas (226).

Figure 17:
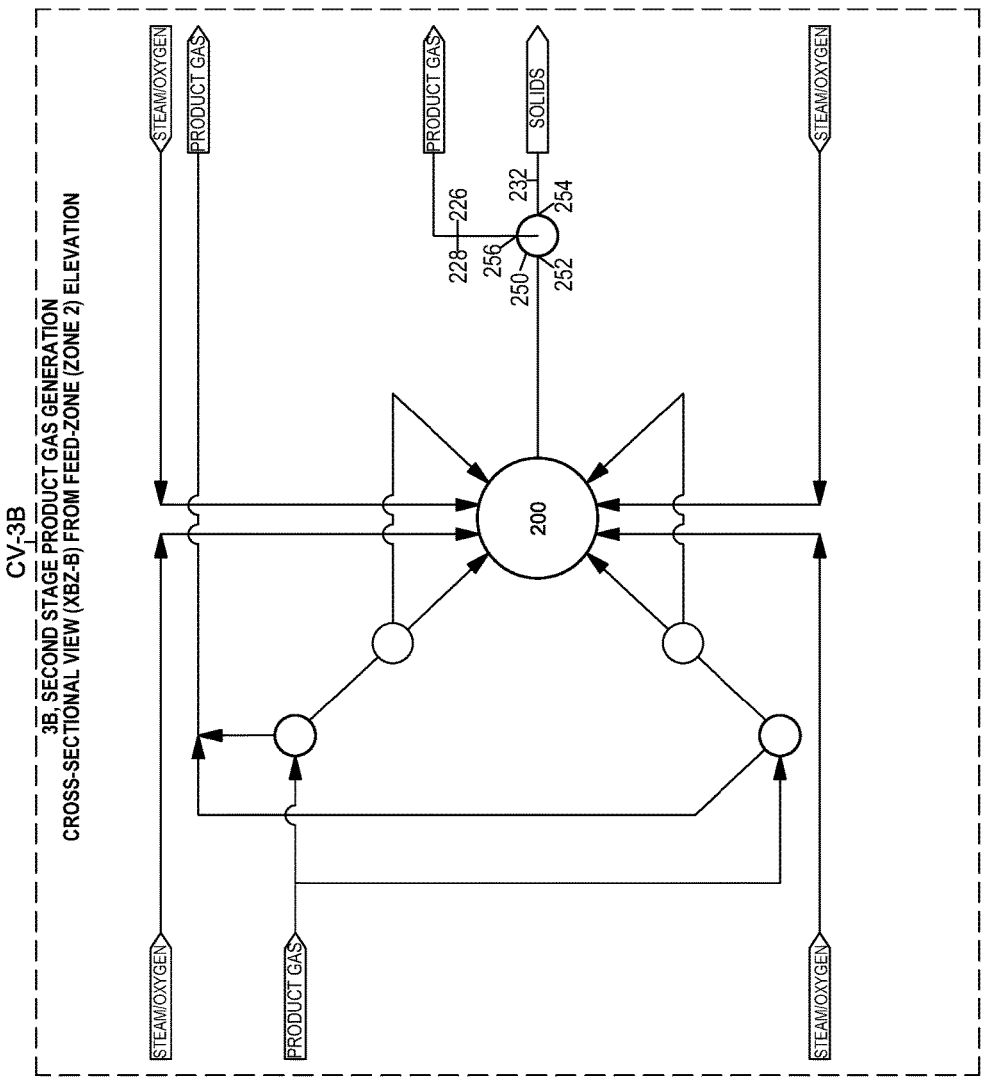

FIG. 17 shows a non-limiting embodiment of a second reactor feed zone cross-sectional view (XBZ-B) of the embodiment in FIG. 16 where the first reactor product gas (126A1, 126A2) is not combined with the second reactor product gas (226).

Figure 18:
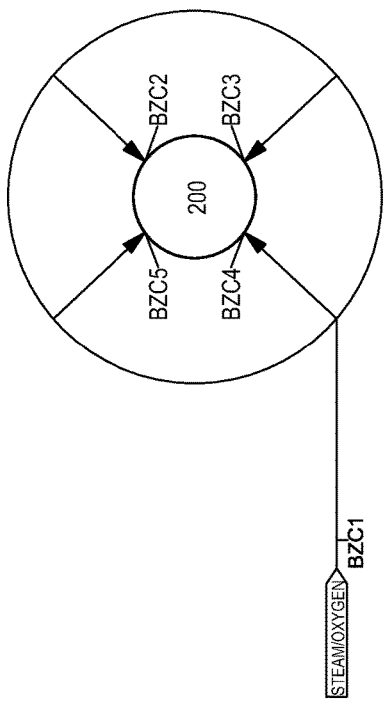

FIG. 18 shows a non-limiting embodiment of a second reactor splash zone cross-sectional view (XBZ-C) of the embodiment in FIG. 13, including four splash zone steam/oxygen inputs (BZC2, BZC3, BZC4, BZC5) configured to accept a source of splash zone steam/oxygen (BZC1).

Figure 19:
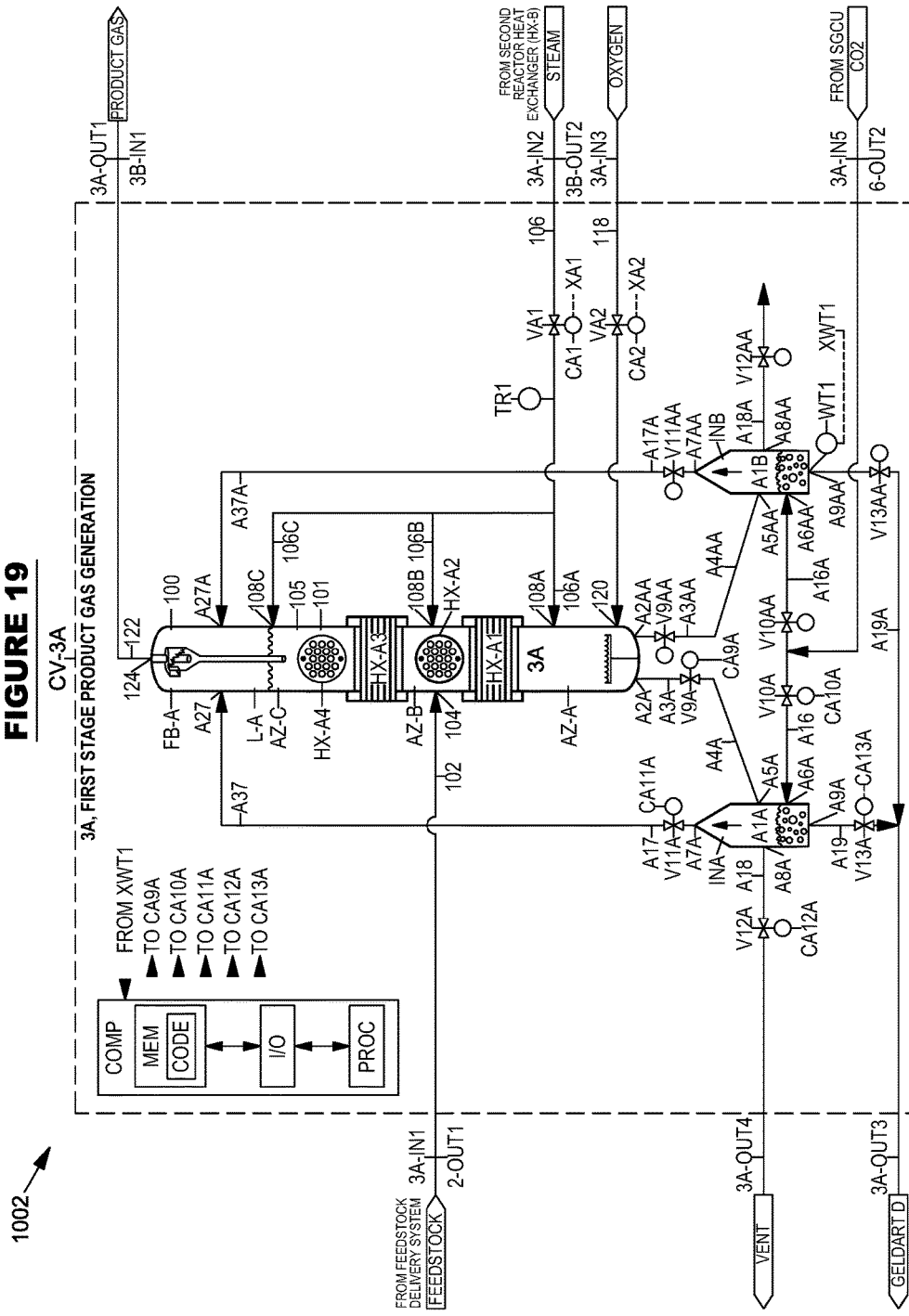

FIG. 19 elaborates upon the non-limiting embodiment of FIG. 7 further including two particulate classification vessels (A1A, A1B) that are configured to accept a bed material, inert feedstock contaminant mixture (A4A, A4AA), and a classifier gas (A16, A16A) and to clean and recycle the bed material portion back to the first interior (101) of the first reactor (100) while removing the inert feedstock contaminant portion from the system as a solids output (3A-OUT3).

FIG. 20 depicts the Classification Valve States for Automated Controller Operation of a typical particulate classification procedure. FIG. 20 is to be used in conjunction with FIG. 19 and depicts a listing of valve states that may be used in a variety of methods to operate valves associated with the particulate classification vessels (A1A, A1B).

Figure 21:
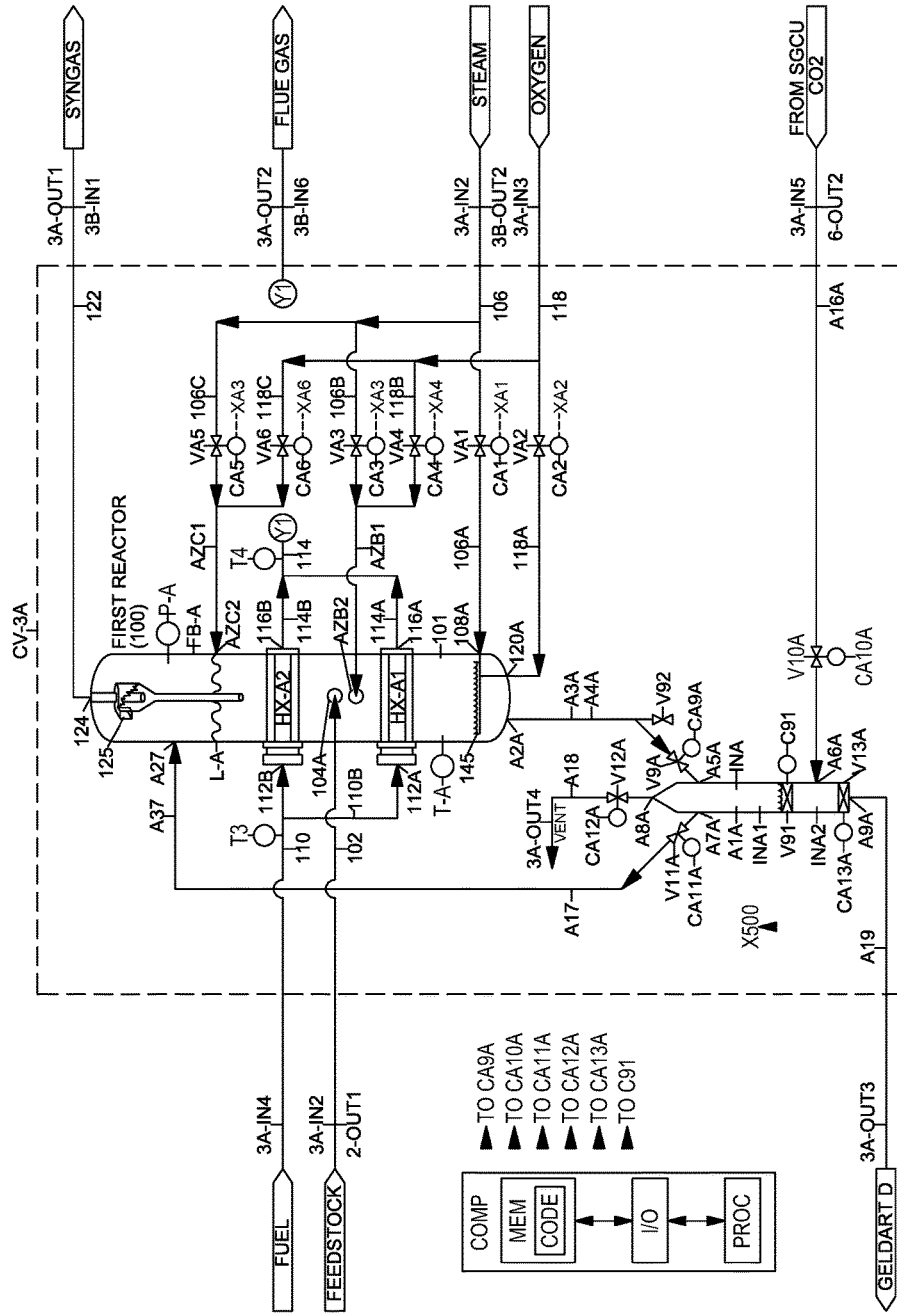

FIG. 21 elaborates upon the non-limiting embodiment of FIG. 7 and FIG. 19 including another embodiment of a particulate classification vessel (A1A) including gas distributor valve (V91) that separates the classifier interior (INA) into a classifier zone (INA1) and a gas distribution zone (INA2) and where the classifier (A1A) is configured to accept a bed material, inert feedstock contaminant mixture (A4A), and a classifier gas (A16) and to clean and recycle the bed material portion back to the first interior (101) of the first reactor (100) while removing the inert feedstock contaminant portion from the system as a solids output (3A-OUT3).

Figure 21A:
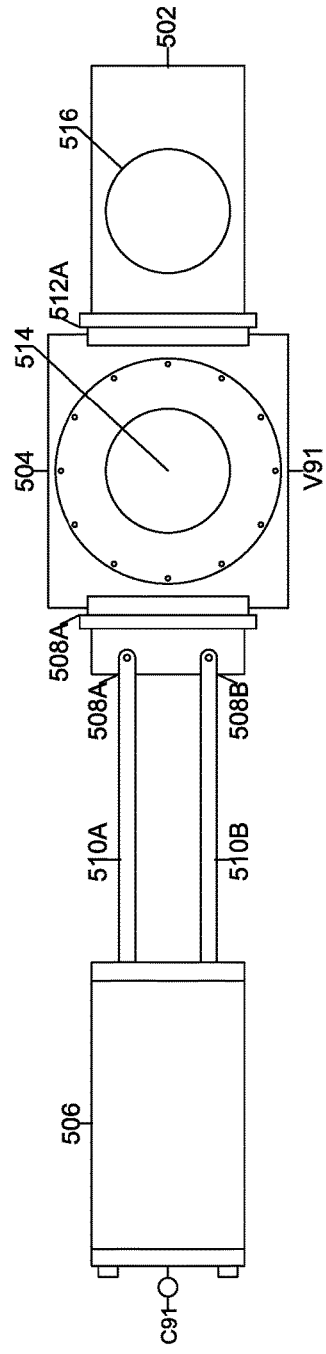

FIG. 21A shows a non-limiting embodiment of a classifier gas distributor valve cross-sectional view (X500) of the embodiment in FIG. 21, including depicting a top-down view of one embodiment of a gas distributor valve (V91) in the closed position.

Figure 21B:
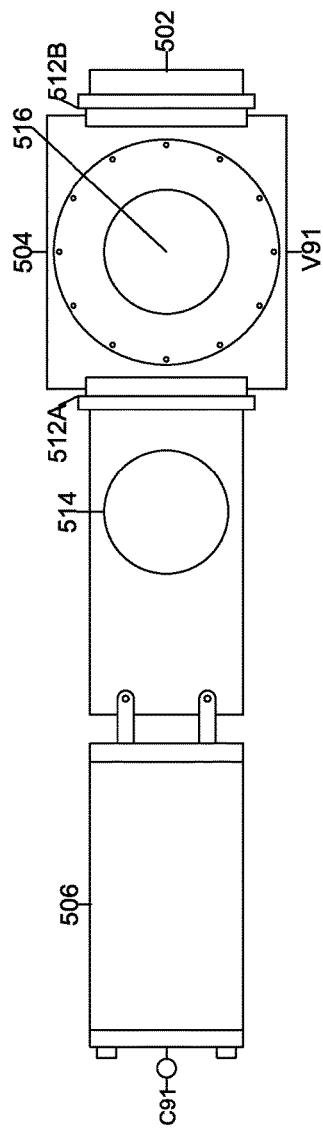

FIG. 21B shows a non-limiting embodiment of a classifier gas distributor valve cross-sectional view (X500) of the embodiment in FIG. 21, including depicting a top-down view of one embodiment of a gas distributor valve (V91) in the open position.

FIG. 22 depicts the Classification Valve States as described in FIG. 20 further including the operation of a gas distributor valve (V91). FIG. 22 is to be used in conjunction with FIG. 21 and depicts a listing of valve states that may be used in a variety of methods to operate valves associated with one embodiment of a particulate classification vessel (A1A).

Figure 23:
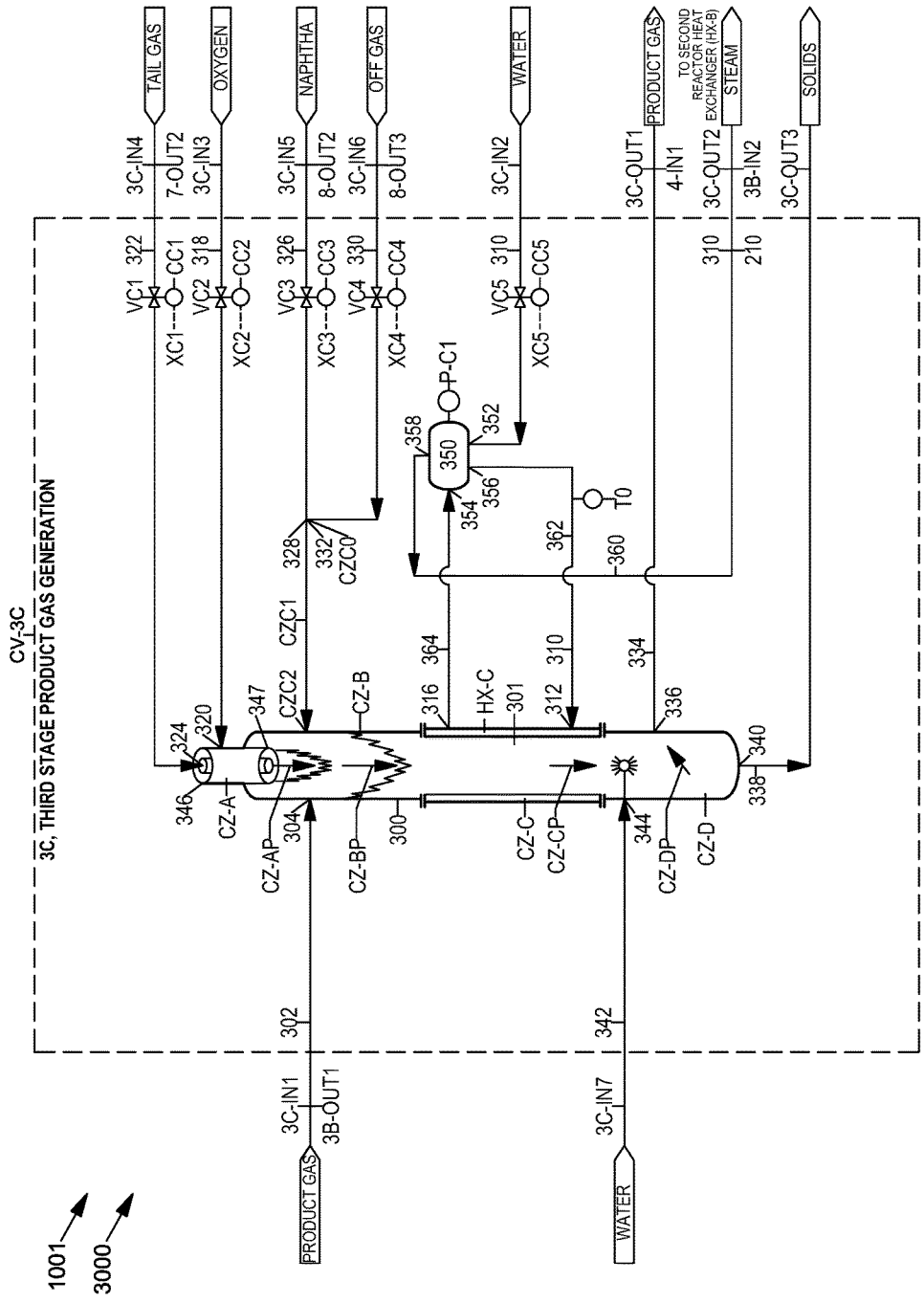

FIG. 23 shows a detailed view of one non-limiting embodiment of a Third Stage Product Gas Generation Control Volume (CV-3C) and Third Stage Product Gas Generation System (3C) of a three-stage energy-integrated product gas generation system (1001) in accordance with FIG. 3 also showing a third reactor (300) equipped with a third interior (301), and also showing a combustion zone (CZ-A), reaction zone (CZ-B), cooling zone (CZ-C), quench zone (CZ-E), steam drum (350), and valves, sensors, and controllers.

Figure 24:
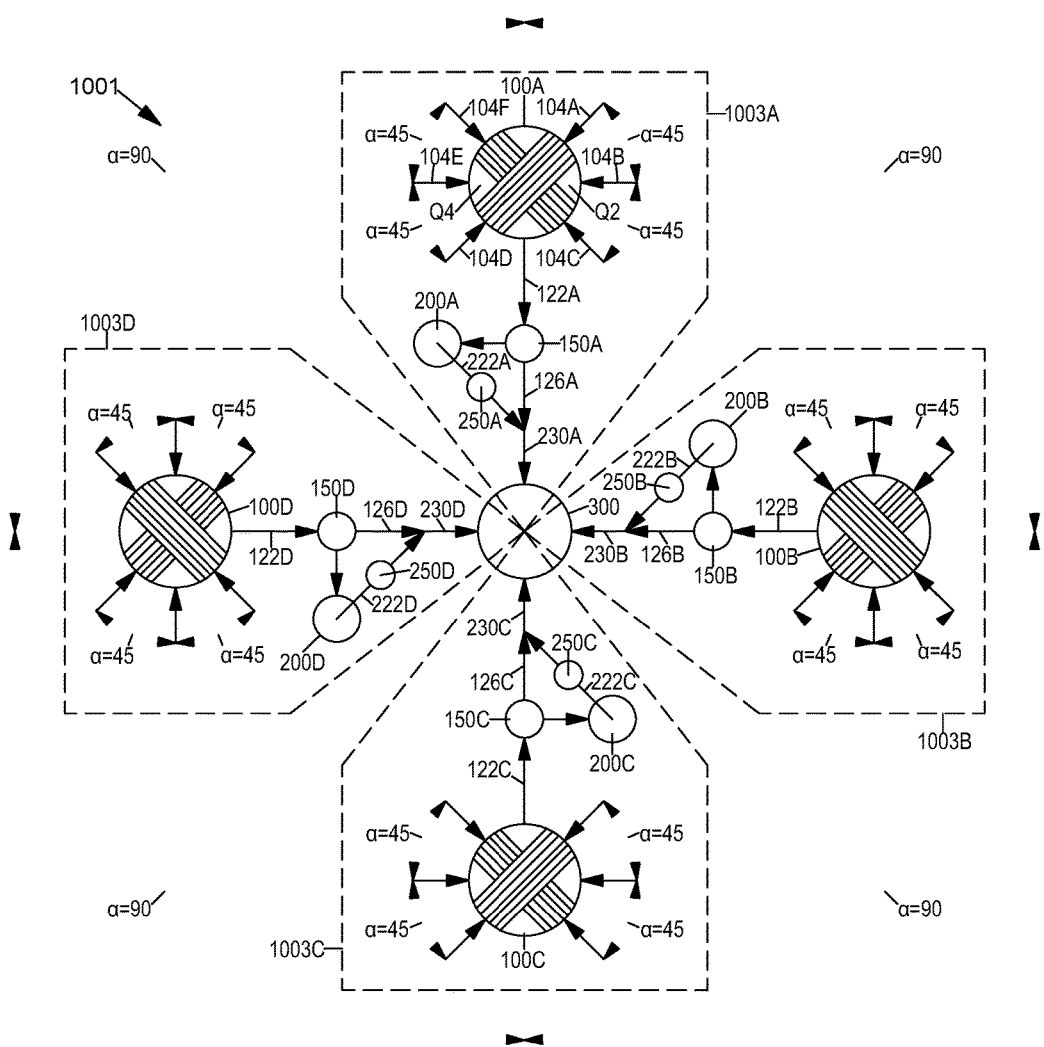

FIG. 24 depicts one non-limiting embodiment of a three-stage energy-integrated product gas generation system (1001) comprised of four first reactors (100A, 100B, 100C, 100D), and four second reactors (200A, 200B, 200C, 200D), each with their own separate first solids separation device (150A, 150B, 150C, 150D), and second solids separation device (250A, 250B, 250C, 250D), and combined reactor product gas conduits (230A, 230B, 230C, 230D) for feeding into one common third reactor (300).

Figure 25:
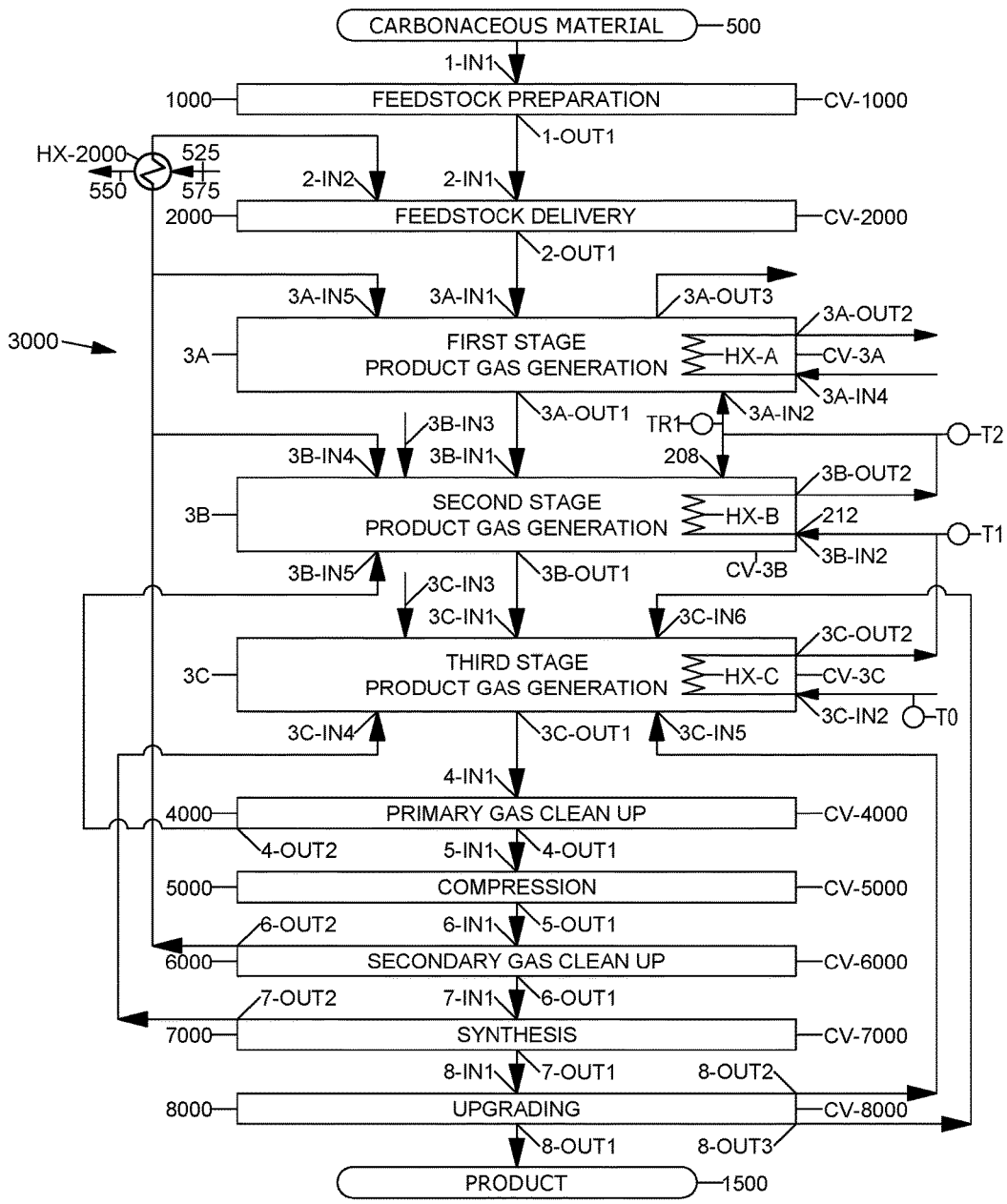

FIG. 25 shows Product Gas Generation System (3000) of FIG. 1 utilized in the framework of an entire Refinery Superstructure System (RSS). In embodiments, the RSS system as shown in FIG. 25 may be configured to employ the use of the three-stage energy integrated product gas generation method as elaborated upon in FIG. 1.

Figure 26:
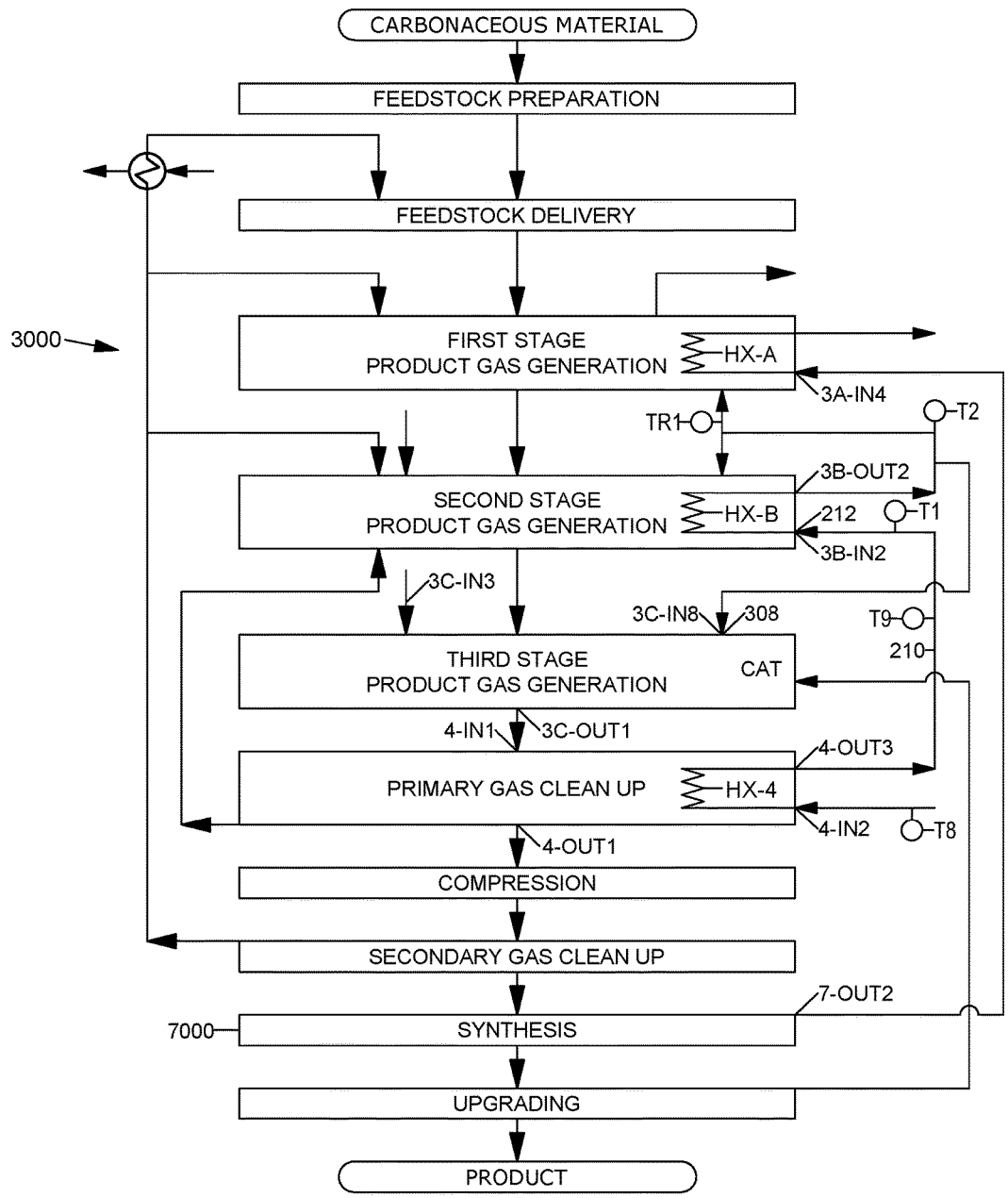

FIG. 26 shows Product Gas Generation System (3000) of FIG. 1 utilized in an entire Refinery Superstructure (RSS) system further including a Primary Gas Clean-Up Heat Exchanger (HX-4) in fluid communication with the second reactor heat transfer medium inlet (212) and configured to remove heat from at least a portion of the product gas input (4-IN1).

Figure 27:
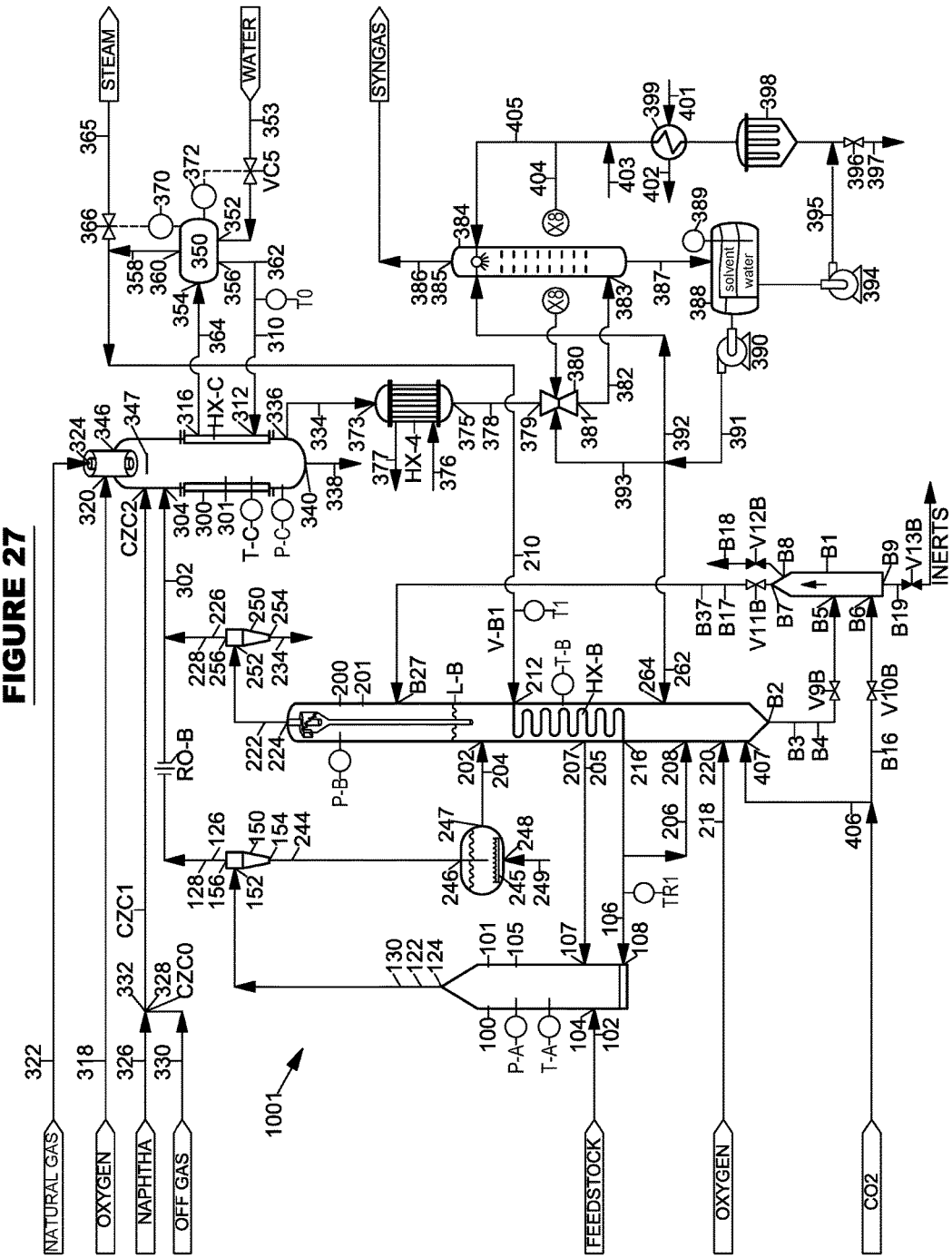

FIG. 27 further depicts a first reactor (100), first solids separation device (150), dipleg (244), solids flow regulator (245), second reactor (200), particulate classification chamber (B1), second solids separation device (250), second reactor heat exchanger (HX-B), third reactor (300), third reactor heat exchanger (HX-C), steam drum (350), Primary Gas Clean Up Heat Exchanger (HX-4), venturi scrubber (380), scrubber (384), decanter separator (388), solids separator (398), and a scrubber recirculation heat exchanger (399).

DETAILED DESCRIPTION

Notation and Nomenclature

Before the disclosed systems and processes are described, it is to be understood that the aspects described herein are not limited to specific embodiments, apparatus, or configurations, and as such can, of course, vary. It is also to be understood that the terminology used herein is for the purpose of describing particular aspects only and, unless specifically defined herein, is not intended to be limiting.

The idea of a control volume is an extremely general concept used widely in the study and practice of chemical engineering. Control volumes may be used in applications that analyze physical systems by utilization of the laws of conservation of mass and energy. They may be employed during the analysis of input and output data of an arbitrary space, or region, usually being a chemical process, or a portion of a chemical process. They may be used to define process streams entering a single piece of chemical equipment that performs a certain task, or they may be used to define process streams entering a collection of equipment, and assets which work together to perform a certain task.

With respect to the surrounding text, a control volume is meaningful in terms of defining the boundaries of a particular product gas generation sequence step or a sequence step related to the overarching topography of an entire refinery superstructure. The arrangements of equipment contained within each control volume are the preferred ways of accomplishing each sequence step. Furthermore, all preferred embodiments are non-limiting in that any number of combinations of unit operations, equipment and assets, including pumping, piping, and instrumentation, may be used as an alternate. However, it has been our realization that the preferred embodiments that make up each sequence step are those which work best to generate a product gas from a carbonaceous material using two separate and successive upstream and downstream thermochemical reactors that cooperate to efficiently and substantially completely convert a carbonaceous material into product gas while sharing heat from successive endothermic and exothermic reactions. Nonetheless, any types of unit operations or processes may be used within any control volume shown as long as it accomplishes the goal of that particular sequence step.

As used herein the term "carbonaceous material" refers to a solid or liquid substance that contains carbon such as for instance, agricultural residues, agro-industrial residues, animal waste, biomass, cardboard, coal, coke, energy crops, farm slurries, fishery waste, food waste, fruit processing waste, lignite, municipal solid waste (MSW), paper, paper mill residues, paper mill sludge, paper mill spent liquors, plastics, refuse derived fuel (RDF), sewage sludge, tires, urban waste, wood products, wood wastes and a variety of others. All carbonaceous materials contain both "fixed carbon feedstock components" and "volatile feedstock components", such as for example woody biomass, MSW, or RDF.

As used herein the term "fixed carbon feedstock components" refers to feedstock components present in a carbonaceous material other than volatile feedstock components, contaminants, ash or moisture. Fixed carbon feedstock components are usually solid combustible residue remaining after the removal of moisture and volatile feedstock components from a carbonaceous material.

As used herein the term "char" refers to a carbon-containing solid residue derived from a carbonaceous material and is comprised of the "fixed carbon feedstock components" of a carbonaceous material. Char also includes ash.

As used herein the term "char-carbon" refers to the mass fraction of carbon that is contained within the char transferred from the first reactor to the second reactor.

As used herein the term "char-ash" refers to the mass fraction of ash that is contained within the char transferred from the first reactor to the second reactor.

As used herein the term "volatile feedstock components" refers to components within a carbonaceous material other than fixed carbon feedstock components, contaminants, ash or moisture.

As used herein the term "inert feedstock contaminants" or "inert contaminants" refers to Geldart Group D particles contained within a MSW and/or RDF carbonaceous material. Geldart Group D solids comprise whole units and/or fragments of one or more of the group consisting of allen wrenches, ball bearings, batteries, bolts, bottle caps, broaches, bushings, buttons, cable, cement, chains, clips, coins, computer hard drive shreds, door hinges, door knobs, drill bits, drill bushings, drywall anchors, electrical components, electrical plugs, eye bolts, fabric snaps, fasteners, fish hooks, flash drives, fuses, gears, glass, gravel, grommets, hose clamps, hose fittings, jewelry, key chains, key stock, lathe blades, light bulb bases, magnets, metal audio-visual components, metal brackets, metal shards, metal surgical supplies, mirror shreds, nails, needles, nuts, pins, pipe fittings, pushpins, razor blades, reamers, retaining rings, rivets, rocks, rods, router bits, saw blades, screws, sockets, springs, sprockets, staples, studs, syringes, USB connectors, washers, wire, wire connectors, and zippers.

Generally speaking, Geldart grouping is a function of bed material particle size and density and the pressure at which the fluidized bed operates. In the present context which is related to systems and/or methods for converting municipal solid waste (MSW) into a product gas using a fluidized bed, Geldart C Group solids range in size from between about 0 and 29.99 microns, Geldart A Group solids range in size from between about 30 microns to 99.99 microns, Geldart B Group solids range in size from between about 100 and 999.99 microns, and, Geldart D Group solids range in size greater than about 1,000 microns.

As used herein the term "product gas" refers to volatile reaction products, syngas, or flue gas discharged from a thermochemical reactor undergoing thermochemical processes including hydrous devolatilization, pyrolysis, steam reforming, partial oxidation, dry reforming, or combustion.

As used herein the term "syngas" refers to a mixture of carbon monoxide (CO), hydrogen (H2), and other vapors/gases, also including char, if any and usually produced when a carbonaceous material reacts with steam (H2O), carbon dioxide (CO2) and/or oxygen (O2). While steam is the reactant in steam reforming, CO2 is the reactant in dry reforming. Generally, for operation at a specified temperature, the kinetics of steam reforming is faster than that of dry reforming and so steam reforming tends to be favored and more prevalent. Syngas might also include volatile organic compounds (VOC) and/or semi-volatile organic compounds (VOC).

As used herein the term "volatile organic compounds" or acronym "(VOC)" or "VOC" refer to aromatics including benzene, toluene, phenol, styrene, xylene, and cresol. It also refers to low molecular weight hydrocarbons like methane, ethane, ethylene, propane, propylene, etc.

As used herein the term "semi-volatile organic compounds" or acronym "(SVOC)" or "SVOC" refer to polyaromatics, such as indene, indane, naphthalene, methylnaphthalene, acenaphthylene, acenaphthalene, anthracene, phenanthrene, (methyl-) anthracenes/phenanthrenes, pyrene/fluoranthene, methylpyrenes/benzofluorenes, chrysene, benz[a]anthracene, methylchrysenes, methylbenz[a]anthracenes, perylene, benzo[a]pyrene, dibenz[a,kl]anthracene, and dibenz[a,h]anthracene.

As used herein the term "volatile reaction products" refers to vapor or gaseous organic species that were once present in a solid or liquid state as volatile feedstock components of a carbonaceous material wherein their conversion or vaporization to the vapor or gaseous state was promoted by the processes of either hydrous devolatilization and/or pyrolysis. Volatile reaction products may contain both, non-condensable species, and condensable species which are desirable for collection and refinement.

As used herein the term "oxygen-containing gas" refers to air, oxygen-enriched-air i.e. greater than 21 mole % oxygen, and substantially pure oxygen, i.e. greater than about 95 mole % oxygen (the remainder usually comprising nitrogen and rare gases).

As used herein the term "flue gas" refers to a vapor or gaseous mixture containing varying amounts of nitrogen ($N_2$), carbon dioxide ($CO_2$), water ($H_2O$), and oxygen ($O_2$). Flue gas is generated from the thermochemical process of combustion.

As used herein the term "thermochemical process" refers to a broad classification including various processes that can convert a carbonaceous material into product gas. Among the numerous thermochemical processes or systems that can be considered for the conversion of a carbonaceous material, the present disclosure contemplates: hydrous devolatilization, pyrolysis, steam reforming, partial oxidation, dry reforming, and/or combustion. Thermochemical processes may be either endothermic or exothermic in nature depending upon the specific set of processing conditions employed. Stoichiometry and composition of the reactants, type of reactants, reactor temperature and pressure, heating rate of the carbonaceous material, residence time, carbonaceous material properties, and catalyst or bed additives all dictate what sub classification of thermochemical processing the system exhibits.

As used herein the term "thermochemical reactor" refers to a reactor that accepts a carbonaceous material or char and converts it into one or more product gases.

Hydrous Devolatilization Reaction:

As used herein the term "hydrous devolatilization" refers to an endothermic thermochemical process wherein volatile feedstock components of a carbonaceous material are converted primarily into volatile reaction products in a steam environment. Typically this sub classification of a thermochemical process involves the use of steam as a reactant and involves temperatures ranging from 320° C. and 569.99° C. (608° F. and 1,057.98° F.), depending upon the carbonaceous material chemistry. Hydrous devolatilization permits release and thermochemical reaction of volatile feedstock components leaving the fixed carbon feedstock components mostly unreacted as dictated by kinetics.

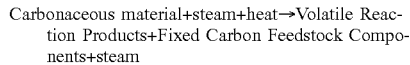

Carbonaceous material+steam+heat→Volatile Reaction Products+Fixed Carbon Feedstock Components+steam Pyrolysis Reaction:

As used herein the term "pyrolysis" or "devolatilization" is the endothermic thermal degradation reaction that organic material goes through in its conversion into a more reactive liquid/vapor/gas state.

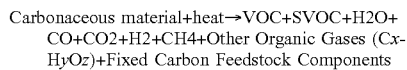

Carbonaceous material+heat→VOC+SVOC+$H_2O$+ CO+$CO_2$+$H_2$+$CH_4$+Other Organic Gases ($C_x$-$H_yO_z$)+Fixed Carbon Feedstock Components Steam Reforming Reaction:

As used herein the term "steam reforming" refers to a thermochemical process where steam reacts with a carbonaceous material to yield syngas. The main reaction is endothermic (consumes heat) wherein the operating temperature range is between 570° C. and 900° C. (1,058° F. and 1,652° F.), depending upon the feedstock chemistry.

$$H_2O+C+Heat \rightarrow H_2+CO$$

Water Gas Shift Reaction:

As used herein the term "water-gas shift" refers to a thermochemical process comprising a specific chemical reaction that occurs simultaneously with the steam reforming reaction to yield hydrogen and carbon dioxide. The main reaction is exothermic (releases heat) wherein the operating temperature range is between 570° C. and 900° C. (1,058° F. and 1,652° F.), depending upon the feedstock chemistry.

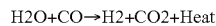

$$H_2O+CO \rightarrow H_2+CO_2+Heat$$

Dry Reforming Reaction:

As used herein the term "dry reforming" refers to a thermochemical process comprising a specific chemical reaction where carbon dioxide is used to convert a carbonaceous material into carbon monoxide. The reaction is endothermic (consumes heat) wherein the operating temperature range is between 600° C. and 1,000° C. (1,112° F. and 1,832° F.), depending upon the feedstock chemistry.

$$CO_2+C+Heat \rightarrow 2CO$$

Partial Oxidation Reactions:

As used herein the term "partial oxidation" refers to a thermochemical process wherein substoichiometric oxidation of a carbonaceous material takes place to exothermically produce carbon monoxide, carbon dioxide and/or water vapor. The reactions are exothermic (release heat) wherein the operating temperature range is between 500° C. and 1,400° C. (932° F. and 2,552° F.), depending upon the feedstock chemistry. Oxygen reacts exothermically (releases heat): 1) with the carbonaceous material to produce carbon monoxide and carbon dioxide; 2) with hydrogen to produce water vapor; and 3) with carbon monoxide to produce carbon dioxide.

$$4C+3O_2 \rightarrow CO+CO_2+Heat$$

$$C+\tfrac{1}{2}O_2 \rightarrow CO+Heat$$

$$H_2+\tfrac{1}{2}O_2 \rightarrow H_2O+Heat$$

$$CO+\tfrac{1}{2}O_2 \rightarrow CO_2+Heat$$

Combustion Reaction:

As used herein the term "combustion" refers to an exothermic (releases heat) thermochemical process wherein at least the stoichiometric oxidation of a carbonaceous material takes place to generate flue gas.

$$C+O_2 \rightarrow CO_2+Heat$$

$$CH_4+O_2 \rightarrow CO_2+2H_2O+Heat$$

Some of these reactions are fast and tend to approach chemical equilibrium while others are slow and remain far from reaching equilibrium. The composition of the product gas will depend upon both quantitative and qualitative factors. Some are unit specific i.e. fluidized bed size/scale specific and others are feedstock specific. The quantitative parameters are: feedstock properties, feedstock injection flux, reactor operating temperature, pressure, gas and solids residence times, feedstock heating rate, fluidization medium and fluidization flux; the qualitative factors are: degree of bed mixing and gas/solid contact, and uniformity of fluidization and feedstock injection.

FIG. 1:

FIG. 1 shows a simplistic block flow control volume diagram of one embodiment of an three-stage energy integrated product gas generation system (1001) used as a Product Gas Generation System (3000). The Product Gas Generation Control Volume (CV-3000) of FIG. 1 is comprised of Product Gas Generation System (3000) that accepts a carbonaceous material input (3-IN1) and generates a product gas output (3-OUT1) therefrom through at least one thermochemical process. The Product Gas Generation System (3000) contained within the Product Gas Generation Control Volume (CV-3000) accepts a carbonaceous material (500) through a carbonaceous material input (3-IN1) and generates a product gas output (3-OUT1) therefrom through at least one thermochemical process.

The non-limiting embodiment of FIG. 1 depicts the Product Gas Generation Control Volume (CV-3000) comprised of a First Stage Product Gas Generation Control Volume (CV-3A), a Second Stage Product Gas Generation Control Volume (CV-3B), and a Third Stage Product Gas Generation Control Volume (CV-3C) thermally integrated with one another and configured for the conversion of carbonaceous materials into product gas. Correspondingly, the Product Gas Generation System (3000) of FIG. 1 includes a First Stage Product Gas Generation System (3A), a Second Stage Product Gas Generation System (3B), and a Third Stage Product Gas Generation System (3C) thermally integrated with one another and configured for the conversion of carbonaceous materials into product gas.

In embodiments, three separate control volumes (CV-3A, CV-3B, CV-3C) are included within the Product Gas Generation Control Volume (CV-3000) to thermochemically convert the carbonaceous material input (3-IN1) into a product gas output (3-OUT1).

The First Stage Product Gas Generation System (3A) contained within the First Stage Product Gas Generation Control Volume (CV-3A) is configured to accept a carbonaceous material input (3A-IN1) and generate a product gas output (3-OUT1) therefrom through at least one thermochemical process.

The Second Stage Product Gas Generation System (3B) contained within the Second Stage Product Gas Generation Control Volume (CV-3B) accepts the first reactor product gas output (3A-OUT1) as a first reactor product gas input (3B-IN1) and exothermically reacts a portion thereof with oxygen-containing gas input (3B-IN3) to generate heat and a product gas output (3B-OUT1).

The Third Stage Product Gas Generation System (3C) contained within the Third Stage Product Gas Generation Control Volume (CV-3C) accepts the product gas output (3B-OUT1) from the Second Stage Product Gas Generation System (3B) as a combined product gas input (3C-IN1) and exothermically reacts a portion thereof with an oxygen-containing gas input (3C-IN3) to generate heat and a third reactor product gas output (3C-OUT1).

A third reactor heat exchanger (HX-C) is in thermal contact with the Third Stage Product Gas Generation System (3C) contained within the Third Stage Product Gas Generation Control Volume (CV-3C). The third reactor heat exchanger (HX-C) is in thermal contact with the exothermic reaction between the combined product gas input (3C-IN1) and the oxygen-containing gas input (3C-IN3). The third reactor heat exchanger (HX-C) is configured to accept a heat transfer medium, such as water or steam, at a third reactor heat transfer medium inlet temperature (T0), from a third reactor heat transfer medium input (3C-IN2) and transfer heat from the exothermic reaction taking place within the Third Stage Product Gas Generation System (3C) to the contents of the heat transfer medium input (3C-IN2) to result in a third reactor heat transfer medium output (3C-OUT2). The third reactor heat transfer medium output (3C-OUT2) is in fluid communication with the second reactor heat transfer medium input (3B-IN2) of the second reactor heat exchanger (HX-B).

A second reactor heat exchanger (HX-B) is in thermal contact with the Second Stage Product Gas Generation System (3B) contained within the Second Stage Product Gas Generation Control Volume (CV-3B). The second reactor heat exchanger (HX-B) is in thermal contact with an exothermic reaction between the first reactor product gas input (3B-IN1) and oxygen-containing gas input (3B-IN3). The second reactor heat exchanger (HX-B) is configured to accept a heat transfer medium, such as water or steam, at a second reactor inlet temperature (T1), from a second reactor heat transfer medium input (3B-IN2) and transfer heat from the exothermic reaction taking place within the Second Stage Product Gas Generation System (3B) to the contents of the heat transfer medium input (3B-IN2). As a result, the second reactor heat transfer medium output (3B-OUT2) is at a second reactor outlet temperature (T2) that is higher than the second reactor inlet temperature (T1). A portion of the second reactor heat transfer medium output (3B-OUT2) is transferred to the First Stage Product Gas Generation Control Volume (CV-3A) at a first reactor reactant temperature (TR1). In embodiments, the first reactor reactant temperature (TR1) is about equal to the second reactor outlet temperature (T2). In embodiments, the first reactor reactant temperature (TR1) is less than the second reactor outlet temperature (T2) due to heat losses in piping while transferring the heat transfer medium (210) from the outlet (216) of the second reactor heat exchanger (HX-B) to the First Stage Product Gas Generation System (3A).

The first reactor reactant input (3A-IN2) is in fluid communication with the second reactor heat transfer medium output (3B-OUT2) and is configured to introduce at least a portion of the contents therein into the First Stage Product Gas Generation System (3A) to react with the carbonaceous material (500) to realize a first reactor product gas output (3A-OUT1).

The second reactor reactant input (208) is in fluid communication with the second reactor heat transfer medium output (3B-OUT2) and is configured to introduce at least a portion of the contents therein into the Second Stage Product Gas Generation System (3B) to react with a portion of the contents of the first reactor product gas input (3B-IN1) to realize a product gas output (3B-OUT1).

A first reactor heat exchanger (HX-A) is in thermal contact with the First Stage Product Gas Generation System (3A) to provide the energy to endothermically react the carbonaceous material (500) with the first reactor reactant input (3A-IN2) to realize a first reactor product gas output (3A-OUT1). The first reactor heat exchanger (HX-A) is comprised of a fuel input (3A-IN4) and a combustion products output (3A-OUT2) and is configured to combust the contents of the fuel input (3A-IN4) to indirectly heat the contents within the First Stage Product Gas Generation System (3A) which, in turn, then promotes at least one endothermic reaction between a portion of the contents of the second reactor heat transfer medium output (3B-OUT2) to react with the carbonaceous material (500) to realize a first reactor product gas output (3A-OUT1).

FIG. 2:

FIG. 2 shows an embodiment of a three-stage energy integrated product gas generation method. The Product Gas Generation System (3000) of FIG. 1 may be configured to employ the use of the three-stage energy integrated product gas generation method as elaborated upon in FIG. 2. In embodiments, the method steps depicted in FIG. 2 may be used to describe the embodiment depicted in FIG. 1 showing a three-stage energy integrated product gas generation system (1001) used as a Product Gas Generation System (3000). The method depicted in FIG. 2 may be used to describe the operation of the embodiments of a Refinery Superstructure System (RSS) as indicated in FIGS. 1, 3, 24-26 where the Third Stage Product Gas Generation System (3C) cooperates with both the Second Stage Product Gas Generation System (3B) and the First Stage Product Gas Generation System (3A) to realize thermal integration.

FIG. 2 discloses a method for producing a first reactor product gas, second reactor product gas, and third reactor product gas from a carbonaceous material using a First Stage Product Gas Generation System (3A), Second Stage Product Gas Generation System (3B), and a Third Stage Product Gas Generation System (3C) that are thermally integrated with one another and configured for the conversion of carbonaceous materials into product gas. FIG. 2 discloses a method for producing a $H_2$, CO, and $CO_2$ from a carbonaceous material using a first reactor, a second reactor, and a third reactor, the method comprising:

(a) reacting carbonaceous material with a steam reactant in the first reactor and producing a first reactor product gas containing char;
(b) introducing at least a portion of the char generated in step (a) into the second reactor;
(c) reacting the char of step (b) with an oxygen-containing gas in the second reactor and producing a second reactor product gas;
(d) transferring the first reactor product gas generated in step (a) and the second reactor product gas generated in step (c) to the third reactor, to form a combined product gas;
(e) reacting the combined product gas with an oxygen-containing gas in the third reactor to generate a third reactor product gas and heat;
(f) transferring heat generated in step (e) to a heat transfer medium contained within a third reactor heat exchanger in thermal contact with the interior of the third reactor;
(g) transferring at least some of the heat transfer medium which has passed through the third reactor heat exchanger, to a second reactor heat exchanger in thermal contact with the interior of the second reactor;
(h) introducing a first portion of the heat transfer medium which has passed through the second reactor heat exchanger, into the first reactor as the steam reactant of step (a); and,
(i) introducing a second portion of the heat transfer medium which has passed through the second reactor heat exchanger, into the second reactor as a reactant.

FIG. 3:

FIG. 3 shows a simplistic block flow control volume diagram of one embodiment of a three-stage energy integrated product gas generation system (1001) used as a Product Gas Generation System (3000). FIG. 3 further shows a simplistic block flow control volume diagram of one non-limiting embodiment of a three-stage energy integrated product gas generation system (1001) including a First Stage Product Gas Generation Control Volume (CV-3A), a Second Stage Product Gas Generation Control Volume (CV-3B), and a Third Stage Product Gas Generation Control Volume (CV-3C).

The First Stage Product Gas Generation Control Volume (CV-3A) is comprised of a First Stage Product Gas Generation System (3A). The Second Stage Product Gas Generation Control Volume (CV-3B) is comprised of a Second Stage Product Gas Generation System (3B). The Third Stage Product Gas Generation Control Volume (CV-3C) is comprised of a Third Stage Product Gas Generation System (3C). The system (1001) includes First Stage Product Gas Generation System (3A) that cooperates with both (i) a downstream Second Stage Product Gas Generation System (3B) and (ii) a downstream Third Stage Product Gas Generation System (3C) to efficiently convert a carbonaceous material into product gas while sharing heat from upstream endothermic and downstream exothermic reactions.

FIG. 3 further shows a simplistic block flow control volume diagram of one non-limiting embodiment of a three-stage energy integrated product gas generation system (1001) including a first reactor (100), a first solids separation device (150), a second reactor (200), a second solids separation device (250), a second reactor heat exchanger (HX-B), a third reactor (300), a third reactor heat exchanger (HX-C).

The First Stage Product Gas Generation Control Volume (CV-3A) is comprised of First Stage Product Gas Generation System (3A) which includes a first reactor (100) having a first interior (101). The First Stage Product Gas Generation Control Volume (CV-3A) has a carbonaceous material input (3A-IN1), a first reactor reactant input (3A-IN2), an oxygen-containing gas input (3A-IN3), a fuel input (3A-IN4), and a first reactor product gas output (3A-OUT1). The carbonaceous material input (3A-IN1) may be provided from the carbonaceous material output (2-OUT1) of an upstream Feedstock Delivery System (2000) as referenced in FIG. 25 and FIG. 26. The first reactor reactant input (3A-IN2) may be provided from the second reactor heat transfer medium output (3B-OUT2) of a downstream Second Stage Product Gas Generation System (3B). The fuel input (3A-IN4) may be provided from a first synthesis hydrocarbon output (7-OUT2) (not shown) of a downstream Synthesis System (7000) as referenced in FIG. 25 and FIG. 26. The first reactor product gas output (3A-OUT1) transfers the first reactor product gas to the Second Stage Product Gas Generation Control Volume (CV-3B). The first reactor (100) has a first reactor reactant input (3A-IN2) that is made available from the Second Stage Product Gas Generation Control Volume (CV-3B) and configured to provide the heat transfer medium (210) from the outlet (216) of the second reactor heat exchanger (HX-B) for use as a reactant (106A,106B,106C) in the first reactor (100).

FIG. 3 further illustrates the first reactor (100) having a first interior (101) provided with a dense bed zone (AZ-A), a feed zone (AZ-B) above the dense bed zone (AZ-A), and a splash zone (AZ-C) above the feed zone (AZ-B). The carbonaceous material input (3A-IN1) is configured to convey a carbonaceous material (102) to the feed zone (AZ-B) of the first interior (101) of the first reactor (100) via a first reactor carbonaceous material input (104). The first reactor reactant (106A, 106B, 106C) is provided from the outlet (216) of the second reactor heat exchanger (HX-B) and is conveyed to the first reactor (100) via a first reactor reactant input (3A-IN2) or a second reactor heat transfer medium output (3B-OUT2).

FIG. 3 illustrates the first reactor (100) introducing at least a portion of the heat transfer medium (210) of the second reactor heat exchanger (HX-B) into any combination of the first reactor (100) dense bed zone (AZ-A), feed zone (AZ-B), or splash zone (AZ-C) or the second reactor (200) dense bed zone (BZ-A), feed zone (BZ-B), or splash zone (BZ-C). Thus, in embodiments, the reactant (210) from the second reactor heat exchanger (HX-B) is configured to be introduced to the interior (101) of the first reactor (100) via (i) a first reactor dense bed zone reactant input (108A) as a first reactor dense bed zone reactant (106A), (ii) a first reactor feed zone reactant input (108B) as a first reactor feed zone reactant (106B), and a (iii) first reactor splash zone reactant input (108C) as a first reactor splash zone reactant (106C).

In the embodiment of FIG. 3, at least a portion of the heat transfer medium (210) of the second reactor heat exchanger (HX-B) may be introduced into any combination of bed material zones found in either the first reactor (100) or in the second rector (200). In this regard, the first reactor (100) and second reactor (200) can each be considered to have a dense bend zone formed in the lower portion of the bed region, a feed zone formed in a middle portion of the bed region, and a splash zone formed in the upper portion of the bed region, immediately below the freeboard region of either reactor (100, 200). It is understood that within the bed material, the dense bed zone is located below both the feed and splash zones, the splash zone is located above both the dense bed zone and the feed zone, and the feed zone is located between the dense bed zone and the splash zone. It is further understood that for present purposes, the boundary between the dense bed zone and the feed zone is the lowest point at which carbonaceous material such as MSW, char, or any other feedstock is introduced into a reactor.

The oxygen-containing gas input (3A-IN3) is configured to convey a first reactor oxygen-containing gas (118) to the first interior (101) of the first reactor (100) via a series of first reactor oxygen-containing gas inputs (120A, 120B, 120C). The first reactor (100) has a first interior (101) provided with a first dense bed zone (AZ-A), a first feed zone (AZ-B) above the first dense bed zone (AZ-A), and a first splash zone (AZ-C) above the first feed zone (AZ-B). Further, in embodiments, the oxygen-containing gas input (3A-IN3) is configured to convey (i) a first reactor dense bed zone oxygen-containing gas (118A) to a first reactor dense bed zone oxygen-containing gas input (120A), (ii) a first reactor feed zone oxygen-containing gas (118B) to a first reactor feed zone oxygen-containing gas input (120B), and (iii) a first reactor splash zone oxygen-containing gas (118C) to a first reactor splash zone oxygen-containing gas input (120C).

The first reactor (100) further comprises: a first reactor dense bed zone reactant input (108A) configured to introduce a first reactor dense bed zone reactant (106A) to the first dense bed zone (AZ-A); a first reactor feed zone reactant input (108B) configured to introduce a first reactor feed zone reactant (106B) to the first feed zone (AZ-B); a first reactor splash zone reactant input (108C) configured to introduce a first reactor splash zone reactant (106C) to the first splash zone (AZ-C); a first reactor carbonaceous material input (104) to the first feed zone (AZ-B); and, a first reactor product gas output (124) configured to evacuate a first reactor product gas (122). The first reactor dense bed zone reactant input (108A), first reactor feed zone reactant input (108B), and the first reactor splash zone reactant input (108C), are all in fluid communication with the outlet (216) of the second reactor heat exchanger (HX-B).

The first reactor (100) further comprises: a first reactor dense bed zone oxygen-containing gas input (120A) configured to introduce a first reactor dense bed zone oxygen-containing gas (118A) to the first dense bed zone (AZ-A); a first reactor feed zone oxygen-containing gas input (120B) configured to introduce a first reactor feed zone oxygen-containing gas (118B) to the first feed zone (AZ-B); and, a first reactor splash zone oxygen-containing gas input (120C) configured to introduce a first reactor splash zone oxygen-containing gas (118C) to the first splash zone (AZ-C).

The First Stage Product Gas Generation Control Volume (CV-3A) having a First Stage Product Gas Generation System (3A) has a first reactor (100) with a first interior (101) containing a first reactor particulate heat transfer material (105), otherwise referred to as bed material. In embodiments, the first reactor particulate heat transfer material (105) is comprised of Geldart Group A or Group B solids in the form of inert material, catalyst, sorbent, or engineered particles. The engineered particles may be made of alumina, zirconia, sand, olivine sand, limestone, dolomite, or catalytic materials, any of which may be hollow in form, such as microballoons or microspheres. The preferred first reactor particulate heat transfer material (105) is Geldart Group B alumina microballoons. The first reactor particulate heat transfer material (105) enhances mixing, heat and mass transfer, and reaction between the carbonaceous material (102) and the reactant (106, 106A, 106B, 106C) or oxygen-containing gas (108, 108A, 108B, 108C) introduced to the first reactor (100).

The first interior (101) of the first reactor (100) is configured to accept a carbonaceous material (102) through a first reactor carbonaceous material input (104). The first interior (101) of the first reactor (100) is configured to accept a first reactor reactant (106A, 106B, 106C) through a first reactor reactant input (108A, 108B, 108C). The first reactor (100) is configured to thermochemically react the carbonaceous material (102) with the reactant (106A, 106B, 106C) and optionally the oxygen-containing gas (118A, 118B, 118C) to generate a first reactor product gas (122) that is discharged from the first interior (101) through a first reactor product gas output (124). A first reactor product gas (122) is evacuated from the interior (101) of the first reactor (100) via a first reactor product gas output (124) for transfer to the Second Stage Product Gas Generation Control Volume (CV-3B) via a first reactor product gas output (3A-OUT1) or a first reactor product gas input (3B-IN1).

FIG. 3 depicts the system (1001) including a first reactor first heat exchanger (HX-A1) and a first reactor second heat exchanger (HX-A2) in thermal contact with the first interior (101) of the first reactor (100). FIG. 3 also depicts the First Stage Product Gas Generation Control Volume (CV-3A) having a First Stage Product Gas Generation System (3A) configured to accept a fuel input (3A-IN4) as a heat exchanger fuel (110) and configured to discharge a combustion stream (114A, 114B). Two first reactor heat exchangers (HX-A1, HX-A2) are shown in FIG. 3 and in embodiments may be immersed in the particulate heat transfer material (105) of the first reactor (100) to provide indirect heat for thermochemical processes taking place within the interior (101) of the first reactor (100).

The first reactor first heat exchanger (HX-A1) is comprised of: a first reactor first heat exchanger fuel inlet (112A) configured to receive a first reactor first heat exchanger fuel (110A) at a first inlet temperature (T3A); a first reactor first heat exchanger combustion stream outlet (116A) configured to output a first reactor first heat exchanger combustion stream (114A) at a first outlet temperature (T4A). The first reactor second heat exchanger (HX-A2) is comprised of: a first reactor second heat exchanger fuel inlet (112B) configured to receive a first reactor second heat exchanger fuel (110B) at a first inlet temperature (T3B); a first reactor second heat exchanger combustion stream outlet (116B) a configured to output a first reactor second heat exchanger combustion stream (114B) at a first outlet temperature (T4B).

The first reactor first heat exchanger combustion stream (114A) may be combined with the first reactor second heat exchanger combustion stream (114B) (not shown). FIG. 3 also depicts the First Stage Product Gas Generation Control Volume (CV-3A) having a First Stage Product Gas Generation System (3A) configured to accept a fuel input (3A-IN4) as a heat exchanger fuel (110A, 110B) and configured to discharge a combustion products output (3A-OUT2) (not shown) as a combustion stream (114A,114B).

The fuel input (3A-IN4) to the First Stage Product Gas Generation Control Volume (CV-3A) may be comprised of a mixture of a hydrocarbon and an oxygen-containing gas. FIG. 3 shows an embodiment where the hydrocarbon used in the first reactor heat exchanger fuel (110) may be a methane containing gas such as natural gas, as seen in FIG. 25. In embodiments, the hydrocarbon used in the first reactor heat exchanger fuel (110A, 110B) may be provided by way of a first synthesis hydrocarbon output (7-OUT2) from a downstream Synthesis System (7000), such as tail gas from a Fischer-Tropsch synthesis system, or from a methanol synthesis system, or the like, as seen in FIG. 25 of FIG. 26. In embodiments, the hydrocarbon used in the first reactor heat exchanger fuel (110) may be provided by way of a downstream Upgrading System (8000) such as naphtha, off gas, or the like.

Carbonaceous material (102) enters the First Stage Product Gas Generation System (3A) through a carbonaceous material input (3A-IN1). The first reactor reactant (106A, 106B, 106C) enters the First Stage Product Gas Generation System (3A) and is transferred from the Second Stage Product Gas Generation Control Volume (CV-3B) via a second reactor heat transfer medium output (3B-OUT2). The second reactor heat transfer medium output (3B-OUT2) is configured to transfer the second reactor heat transfer medium (210) from the outlet (216) of the second reactor heat exchanger (HX-B) to the interior (101) of the first reactor (100). FIG. 3 shows the first reactor product gas (122) discharged from the First Stage Product Gas Generation System (3A) via a first reactor product gas output (3A-OUT1) or a first reactor product gas input (3B-IN1). The first reactor product gas (122) enters the Second Stage Product Gas Generation System (3B) via the first separation input (152) of the first solids separation device (150). The first reactor product gas (122) evacuated from the interior (101) of the first reactor (100) via a first reactor product gas output (124) is transferred to the Second Stage Product Gas Generation Control Volume (CV-3B). The first reactor product gas output (124) is in fluid communication with the first separation input (152) of the first solids separation device (150) contained within the Stage Product Gas Generation Control Volume (CV-3B).

The second interior (201) of the second reactor (200) is in fluid communication with the first interior (101) of the first reactor (100) via a first reactor product gas output (124), first solids separation device (150), and second reactor char input (204). Thus, portion of the first reactor product gas (122) is separated out in the first solids separation device (150) and routed to the interior (201) of the second reactor (200) via a second reactor char input (204). More specifically, char (202) contained within the first reactor product gas (122) is separated out in the first solids separation device (150) and routed to the interior (201) of the second reactor (200) via a second reactor char input (204).

The Second Stage Product Gas Generation Control Volume (CV-3B) is comprised of Second Stage Product Gas Generation System (3B) which includes a second reactor (200) having a second interior (201) and second reactor heat exchanger (HX-B) in thermal contact with the interior (201) of the second reactor (200). The Second Stage Product Gas Generation Control Volume (CV-3B) also includes a first solids separation device (150) and a second solids separation device (250). The Second Stage Product Gas Generation Control Volume (CV-3B) is configured to accept an oxygen-containing gas (218) as an input (3B-IN3) which is in fluid communication with (i) the second reactor dense bed zone (BZ-A) via a second reactor dense bed zone oxygen-containing gas input (220A), (ii) the second reactor feed zone (BZ-B) via a second reactor feed zone oxygen-containing gas input (220B), and (iii) the second reactor splash zone (BZ-C) via a second reactor splash zone oxygen-containing gas input (220C).

The Second Stage Product Gas Generation Control Volume (CV-3B) is configured to accept a portion of the third reactor heat transfer medium (310) from the outlet (316) of the third reactor heat exchanger (HX-C) via a third reactor heat transfer medium output (3C-OUT2) or a second reactor heat transfer medium input (3B-IN2). The third reactor heat transfer medium (310) transferred from the Third Stage Product Gas Generation Control Volume (CV-3C) to the Second Stage Product Gas Generation Control Volume (CV-3B) is used as a second reactor heat transfer medium (210) inside of the second reactor heat exchanger (HX-B).

The second reactor heat transfer medium inlet (212) is in fluid communication with the third reactor heat transfer medium outlet (316). At least a portion of the heat transfer medium (210) from the second reactor heat exchanger (HX-B) may be transferred into any combination of the first reactor (100) dense bed zone (AZ-A), feed zone (AZ-B), or splash zone (AZ-C) or the second reactor (200) dense bed zone (BZ-A), feed zone (BZ-B), or splash zone (BZ-C). The second reactor dense bed zone reactant input (208A), second reactor feed zone reactant input (208B), and the second reactor splash zone reactant input (208C), are all in fluid communication with the outlet (216) of the second reactor heat exchanger (HX-B).

At least a portion of the third reactor heat transfer medium (310) used in the third reactor heat exchanger (HX-C) is used as the second reactor heat transfer medium (210) in the reactor heat exchanger (HX-B). At least a portion of the second reactor heat transfer medium (210) used in the reactor heat exchanger (HX-B) is used as a reactant (106A, 106B, 106C) in the first reactor (100). A portion of the second reactor heat transfer medium (210) used in the reactor heat exchanger (HX-B) may be used as a reactant (206A, 206B, 206C) in the second reactor (200). At least a portion of the third reactor heat transfer medium (310) used in the third reactor heat exchanger (HX-C) is used as a reactant (106A, 106B, 106C) in the first reactor (100). A portion of the third reactor heat transfer medium (310) used in the third reactor heat exchanger (HX-C) is used as a reactant (206A, 206B, 206C) in the second reactor (200).

At least a portion of the third reactor heat transfer medium (310) used in the third reactor heat exchanger (HX-C) is used as a reactant (106A, 106B, 106C) in the first reactor (100) to effectuate at least one endothermic thermochemical process such as pyrolysis, steam reforming, water gas shift, dry reforming. A portion of the third reactor heat transfer medium (310) used in the third reactor heat exchanger (HX-C) is used as a reactant (206A, 206B, 206C) in the second reactor (200) to effectuate at least one endothermic thermochemical process such as pyrolysis, steam reforming, water gas shift, dry reforming.

At least a portion of the heat transfer medium (310) used in the third reactor heat exchanger (HX-C) is used as the heat transfer medium (210) in the reactor heat exchanger (HX-B) to maintain a second reactor temperature (T-B) within the operating range of 932° F. and 2,552° F. to maintain a partial oxidation thermochemical process in the second reactor (200) between a (i) second reactor oxygen-containing gas (218) and (ii) char (202) generated in a first reactor (100) in an endothermic reaction between carbonaceous material (102) and a portion of the third reactor heat transfer medium (310) used as a reactant (106A, 106B, 106C) in the first reactor (100).

The Second Stage Product Gas Generation Control Volume (CV-3B) having a Second Stage Product Gas Generation System (3B) has a second reactor (200) with a second interior (201). The second interior (201) preferably contains a second reactor particulate heat transfer material (205). In embodiments, the second reactor particulate heat transfer material (205) is comprised of Geldart Group A or Group B solids in the form of inert material or catalyst or sorbent or engineered particles. The engineered particles may be made of alumina, zirconia, sand, olivine sand, limestone, dolomite, or catalytic materials, any of which may be hollow in form, such as microballoons or microspheres. The preferred second reactor particulate heat transfer material (205) is Geldart Group B alumina microballoons. The second reactor particulate heat transfer material (205) enhances mixing, heat and mass transfer, and reaction between the char (202) and the reactant or oxygen-containing gas introduced to the second reactor (200).

The Second Stage Product Gas Generation Control Volume (CV-3B) having a Second Stage Product Gas Generation System (3B) also has a first solids separation device (150). The first solids separation device (150) has: a first separation input (152) in fluid communication with the first reactor product gas output (124); a first separation char output (154) in fluid communication with the second reactor char input (204); and a first separation gas output (156).

The second reactor (200) is configured to accept a char (202) through a second reactor char input (204) to the second interior (201). The second reactor char input (204) is in fluid communication with the first separation char output (154) of the first solids separation device (150) and is configured to convey char (202) separated from the first reactor product gas (122). The second reactor (200) has a second reactor pressure (P-B) and a second reactor temperature (T-B).

The first separation char output (154) of the first solids separation device (150) is configured to output char (202) and is in fluid communication with the second reactor (200) via a second reactor char input (204). The first separation gas output (156) of the first solids separation device (150) is configured to output a char depleted first reactor product gas (126) via a char depleted first reactor product gas conduit (128). The second reactor (200) is also configured to accept a second reactor oxygen-containing gas (218A, 218B, 218C) through any number of second reactor oxygen-containing gas inputs (220A, 220B, 220C) to the second interior (201).

A second reactor oxygen-containing gas (218) enters the Second Stage Product Gas Generation System (3B) through an oxygen-containing gas input (3B-IN3). The second reactor (200) is configured to react the char (202) with a second reactor oxygen-containing gas (218, 218A, 218B, 218C). The second reactor (200) is also configured to react the char (202) with a reactant (206A, 206B, 206C) provided to the second interior (201) from the outlet (216) of the second reactor heat exchanger (HX-B).

The second reactor (200) is configured to react the char (202) in an exothermic thermochemical process to generate a second reactor product gas (222) that is discharged from the second interior (201) through a second reactor product gas output (224). The second reactor (200) is configured to react char (202) in an endothermic thermochemical process to generate a second reactor product gas (222) that is discharged from the second interior (201) through a second reactor product gas output (224). The second reactor (200) is configured to react the char (202) in a combination of exothermic and endothermic thermochemical processes to generate a second reactor product gas (222) that is discharged from the second interior (201) through a second reactor product gas output (224).

The Second Stage Product Gas Generation Control Volume (CV-3B) having a Second Stage Product Gas Generation System (3B) also has a second solids separation device (250). The second solids separation device (250) has: a second separation input (252) in fluid communication with the second reactor product gas output (224); a second separation solids output (254) in fluid communication with a solids transfer conduit (234); and a second separation gas output (256) in fluid communication with the char depleted first reactor product gas conduit (128) or the combined reactor product gas conduit (230). The second separation gas output (256) of the second solids separation device (250) is configured to output a solids depleted second reactor product gas (226) via a solids depleted second reactor product gas conduit (228). The second separation solids output (254) of the second solids separation device (250) is configured to output a second reactor separated solids (232) via a solids transfer conduit (234).

The Second Stage Product Gas Generation Control Volume (CV-3B) is configured to output both, (i) the char depleted first reactor product gas (126) created by the first reactor (100) and (ii) the solids depleted second reactor product gas (226) created by the second reactor (200), to the third reactor (300) within the Third Stage Product Gas Generation Control Volume (CV-3C) via a combined product gas input (3C-IN1) or a product gas output (3B-OUT1). The combined reactor product gas conduit (230) is in fluid communication with both the first separation gas output (156) and the second separation gas output (256). The combined reactor product gas conduit (230) is configured to combine product gas created by both the first reactor (100) and the second reactor (200) and route both to the third reactor (300) for conversion in subsequent downstream thermochemical processes. Thus, the product gas created by both the first reactor (100) and the second reactor (200) are directed to the third reactor (300) contained within the Third Stage Product Gas Generation System (3C). More specifically, combined reactor product gas conduit (230) is in fluid communication with both the char depleted first reactor product gas conduit (128) and the solids depleted second reactor product gas conduit (228) and configured to combine the char depleted first reactor product gas (126) created by the first reactor (100) and the solids depleted second reactor product gas (226) created by the second reactor (200). In embodiments, the product gas generated in the first reactor (100) and the second reactor (200) are not combined but are separately and individually transferred to the third reactor (300).

The char depleted first reactor product gas (126) may pass through a restriction orifice (RO-B) prior to being combined with the solids depleted second reactor product gas (226) created by the second reactor (200). In embodiments, the first reactor pressure (P-A) may be greater than the second reactor pressure (P-B). In embodiments, the first reactor pressure (P-A) may be less than the second reactor pressure (P-B). The first reactor (100) has a first reactor pressure (P-A) and a first reactor temperature (T-A). In embodiments, the first reactor temperature (T-A) may be greater than the second reactor temperature (T-B). In embodiments, the first reactor temperature (T-A) may be less than the second reactor temperature (T-B).

A second reactor heat exchanger (HX-B) is in thermal contact with the second interior (201) of the second reactor (200). In embodiments, the second reactor heat exchanger (HX-B) is immersed beneath the second reactor particulate heat transfer material (205) within the interior (201) of the second reactor (200). In embodiments, the second reactor heat exchanger (HX-B) is not immersed beneath the second reactor particulate heat transfer material (205) within the interior (201) of the second reactor (200). The second reactor heat exchanger (HX-B) comprises: a second reactor heat transfer medium inlet (212) configured to receive a heat transfer medium (210) at an inlet temperature (T1); and a second reactor heat transfer medium outlet (216) configured to output the heat transfer medium (210), at a higher, outlet temperature (T2). The second reactor heat transfer medium inlet (212) is in fluid communication with the third reactor heat transfer medium outlet (316) of the third reactor heat exchanger (HX-C) so as to convey at least a portion of the third reactor heat transfer medium (310) from the third reactor heat exchanger (HX-C) to the second reactor heat exchanger (HX-B) for use as the second reactor heat transfer medium (210).

The heat transfer medium (210) enters the Second Stage Product Gas Generation System (3B) from the third reactor heat transfer medium outlet (316) via a third reactor heat transfer medium output (3C-OUT2) or a second reactor heat transfer medium input (3B-IN2). The heat transfer medium outlet (316) of the third reactor heat exchanger (HX-C) contained within the Third Stage Product Gas Generation System (3C) is in fluid communication with the inlet (212) of the second reactor heat exchanger (HX-B) within the Second Stage Product Gas Generation System (3B). A second reactor heat transfer medium (210) may in turn be discharged from the Second Stage Product Gas Generation System (3B) to the First Stage Product Gas Generation System (3A) via a second reactor heat transfer medium output (3B-OUT2) or a first reactor reactant input (3A-IN2).

The second reactor heat transfer medium outlet (216) on the second reactor heat exchanger (HX-B) is in fluid communication with the reactant inputs (108A, 108B, 108C) of the first reactor (100) and is configured to transfer the second reactor heat transfer medium (210) to the first reactor (100) for use as a reactant (106A, 106B, 106B) in any combination of the dense bed zone (AZ-A), feed zone (AZ-B), or splash zone (AZ-C). The second reactor heat transfer medium outlet (216) on the second reactor heat exchanger (HX-B) is in fluid communication with the reactant inputs (208A, 208B, 208C) of the second reactor (200) and is configured to transfer the second reactor heat transfer medium (210) to the second reactor (200) for use as a reactant (206A, 206B, 206B) in any combination of the dense bed zone (BZ-A), feed zone (BZ-B), or splash zone (BZ-C).

FIG. 3 further illustrates the second reactor (200) having a second interior (201) provided with a dense bed zone (BZ-A), feed zone (BZ-B) above the dense bed zone (BZ-A), and a splash zone (BZ-C) above the feed zone (BZ-B). Char (202) is fed into the feed zone (BZ-B) of the second reactor (200). The second reactor (200) further comprises: a second reactor char input (204) to the feed zone (BZ-B), said second reactor char input (204) being in fluid communication with the first reactor product gas output (124); a second reactor dense bed zone reactant input (208A) configured to introduce a second reactor dense bed zone reactant (206A) to the dense bed zone (BZ-A); a second reactor feed zone reactant input (208B) configured to introduce a second reactor feed zone reactant (206B) to the feed zone (BZ-B); a second reactor splash zone reactant input (208C) configured to introduce a second reactor splash zone reactant (206C) to the splash zone (BZ-C); a second reactor dense bed zone oxygen-containing gas input (220A) configured to introduce a second reactor dense bed zone oxygen-containing gas (218A) to the dense bed zone (BZ-A); a second reactor feed zone oxygen-containing gas input (220B) configured to introduce a second reactor feed zone oxygen-containing gas (218B) to the feed zone (BZ-B); a second reactor splash zone oxygen-containing gas input (220C) configured to introduce a second reactor splash zone oxygen-containing gas (218C) to the splash zone (BZ-C); a second reactor product gas output (224); and, a second reactor heat exchanger (HX-B) in thermal contact with the second interior (201); wherein:

the second reactor heat exchanger (HX-B) is configured to receive a heat transfer medium (210) at a second reactor inlet temperature (T1) and output the heat transfer medium (210), at a higher, second reactor outlet temperature (T2), via a second reactor heat transfer medium outlet (216);

the second reactor heat transfer medium outlet (216) is configured to be selectively in fluid communication with any combination of the first reactor dense bed zone reactant input (108A), the first reactor feed zone reactant input (108B) and the first reactor splash zone reactant input (108C); and, the second reactor heat transfer medium outlet (216) is configured to be selectively in fluid communication with any combination of the second reactor dense bed zone reactant input (208A), second reactor feed zone reactant input (208B) and the second reactor splash zone reactant input (208C); whereby:

at least a portion of the heat transfer medium (210) is capable of being introduced into any combination of: (i) the corresponding first reactor dense bed zone (AZ-A), (ii) the first reactor feed zone (AZ-B), (iii) the first reactor splash zone (AZ-C), (iv) the corresponding second reactor dense bed zone (BZ-A), (v) the second reactor feed zone (BZ-B), and, (vi) the second reactor splash zone (BZ-C).

A portion of the second reactor heat transfer medium (210) is transferred to the first interior (101) of the first reactor (101) at a first reactor reactant temperature (TR1). In embodiments, the first reactor reactant temperature (TR1) is about equal to the second reactor outlet temperature (T2). In embodiments, the first reactor reactant temperature (TR1) is less than the second reactor outlet temperature (T2) due to heat losses in piping while transferring the heat transfer medium (210) from the outlet (216) of the second reactor heat exchanger (HX-B) to the first interior (101) o the first reactor (100).

The Third Stage Product Gas Generation Control Volume (CV-3C) is comprised of Third Stage Product Gas Generation System (3C) which includes a third reactor (300) having a third interior (301) with a third reactor heat exchanger (HX-C) in thermal contact with the interior (301). The Third Stage Product Gas Generation Control Volume (CV-3C) has a combined product gas input (304) for accepting the combined product gas (302) including the char depleted first reactor product gas (126) and the solids depleted second reactor product gas (226). The third reactor (300) is in fluid communication with the first reactor (100) and the second reactor (200). More specifically, the combined product gas input (304) of the third reactor (300) is in fluid communication with the char depleted first reactor product gas conduit (128) and the solids depleted second reactor product gas conduit (228).

The Third Stage Product Gas Generation Control Volume (CV-3C) has a combined product gas input (3C-IN1), a third reactor heat exchanger heat transfer medium input (3C-IN2), an oxygen-containing gas input (3C-IN3), a first hydrocarbon input (3C-IN4), a second hydrocarbon input (3C-IN5), and a third hydrocarbon input (3C-IN6). The combined product gas input (3C-IN1) enters the Third Stage Product Gas Generation System (3C) through a product gas output (3B-OUT1) from the Second Stage Product Gas Generation System (3B). The first hydrocarbon input (3C-IN4) may be provided from a first synthesis hydrocarbon output (7-OUT2) of a downstream Synthesis System (7000) as referenced in FIG. 25 and FIG. 26. The second hydrocarbon input (3C-IN5) may be provided from a first hydrocarbon output (8-OUT2) of a downstream Upgrading System (8000) as referenced in FIG. 25 and FIG. 26. The third hydrocarbon input (3C-IN6) may be provided from a second hydrocarbon output (8-OUT3) of a downstream Upgrading System (8000) as referenced in FIG. 25 and FIG. 26.

The third reactor heat transfer medium (310) that flows through the heat transfer medium input (3C-IN2) is preferably water in the liquid state or vapor state or a combination of both. In other embodiments, the third reactor heat exchanger heat transfer medium can be carbon dioxide, product gas, Fischer-Tropsch tail gas, naphtha, hydrocarbons, nitrogen, air or a combination thereof as appropriate. In some embodiments, carbon dioxide can be used as the third reactor heat transfer medium (310), second reactor heat transfer medium (21) and reactant (106, 206).

The third reactor heat transfer medium (310) enters the third reactor heat exchanger (HX-C) via an inlet (312). In embodiments, heat is generated from at least one exothermic thermochemical process taking place within the interior (301) of the third reactor (300) and the heat is transferred through the third reactor heat exchanger (HX-C) into the heat transfer medium (310) contained within the heat exchanger (HX-C). The third reactor heat exchanger (HX-C) is configured to receive a heat transfer medium (310) at a third reactor heat transfer medium inlet temperature T0 and output the heat transfer medium (310) via a third reactor heat transfer medium outlet (316). The third reactor heat transfer medium outlet (316) is in fluid communication with the second reactor heat transfer medium inlet (212) of the second reactor heat exchanger (HX-B) via a third reactor heat transfer medium output (3C-OUT2) or a second reactor heat transfer medium input (3B-IN2).

The oxygen-containing gas input (3C-IN3) is configured to transfer a third reactor oxygen-containing gas (318) to the third reactor (300) via a third reactor oxygen-containing gas input (320). The first hydrocarbon input (3C-IN4) is configured to transfer a first hydrocarbon stream (322) to the third reactor (300) via a first hydrocarbon stream input (324). In embodiments, the first hydrocarbon stream (322) may be a first synthesis hydrocarbon output (7-OUT2), such as tail gas, transferred from a downstream Synthesis System (7000) as seen in the Refinery Superstructure System (RSS) of FIG. 25. The second hydrocarbon input (3C-IN5) is configured to transfer a second hydrocarbon stream (326) to the third reactor (300) via a second hydrocarbon stream input (328). In embodiments, the second hydrocarbon stream (326) may be a first hydrocarbon output (8-OUT2), such as naphtha, transferred from a downstream Upgrading System (8000) as seen in the Refinery Superstructure System (RSS) of FIG. 25. The third hydrocarbon input (3C-IN6) is configured to transfer a third hydrocarbon stream (330) to the third reactor (300) via a third hydrocarbon stream input (332). In embodiments, the third hydrocarbon stream (330) may be a second hydrocarbon output (8-OUT3), such as off gas, transferred from a downstream Upgrading System (8000) as seen in the Refinery Superstructure System (RSS) of FIG. 25.

In the embodiment of FIG. 3, the third reactor can be considered to have a combustion zone (CZ-A) in the upper portion of the interior (301) of the third reactor (300), a reaction zone (CZ-B) below the combustion zone (CZ-A), a cooling zone (CZ-C) below the reaction zone (CZ-B), and a quench zone (CZ-D) below the cooling zone (CZ-C).

The third reactor (300) has a third reactor pressure (P-C) and a third reactor temperature (T-C). In embodiments, the third reactor pressure (P-C) may be greater than the first reactor pressure (P-A). In embodiments, the third reactor pressure (P-C) may be less than the first reactor pressure (P-A). In embodiments, the third reactor pressure (P-C) may be greater than the second reactor pressure (P-B). In embodiments, the third reactor pressure (P-C) may be less than the second reactor pressure (P-B). In embodiments, the third reactor temperature (T-C) may be greater than the first reactor temperature (T-A). In embodiments, the third reactor temperature (T-C) may be less than the first reactor temperature (T-A). In embodiments, the third reactor temperature (T-C) may be greater than the second reactor temperature (T-B). In embodiments, the third reactor temperature (T-C) may be less than the second reactor temperature (T-B).

In embodiments, the third reactor may operate in an exothermic mode. In embodiments, the third reactor may operate in an exothermic mode in a non-catalytic environment. In embodiments, the third reactor may operate in an exothermic mode in a catalytic environment. In embodiments, the third reactor may operate in an endothermic mode. In embodiments, the third reactor may operate in an endothermic mode in a catalytic environment. In embodiments, the third reactor may operate in an endothermic mode in a non-catalytic environment.

The Third Stage Product Gas Generation Control Volume (CV-3C) is configured to generate a third reactor product gas (334) that is evacuated from the interior (301) of the third reactor (300) via a third reactor product gas output (336) or a third reactor product gas output (3C-OUT1). The third reactor product gas output (3C-OUT1) as seen in FIG. 3 may also be made available to a downstream Primary Gas Clean Up System (4000) as a product gas input (4-IN1) as displayed in FIG. 25 and FIG. 26. The Third Stage Product Gas Generation Control Volume (CV-3C) is configured to output slag (338) that is evacuated from the interior (301) of the third reactor (300) via a third reactor slag output (340) or a solids output (3C-OUT3).

In one non-limiting embodiment, FIG. 3 shows the third reactor (300) configured to accept product gas from the first reactor (100) and second reactor (200), along with a third reactor oxygen-containing gas (318), and optionally a hydrocarbon (322, 326, 330), and thermochemically react a portion thereof in an exothermic reaction to generate heat and product gas. In response, a third reactor heat exchanger (HX-C) is configured to transfer heat generated in the third reactor (300) to a heat transfer medium (310) for use as a heat transfer medium (210) in the second reactor heat exchanger (HX-B). The second reactor heat exchanger (HX-B) is configured to transfer heat from the second reactor (200) to a heat transfer medium (210) for use as a reactant (106A, 106B, 106C) in the first reactor (100) or the second reactor (200), or both the first reactor (100) and the second reactor (200).

In embodiments, water in the liquid or vapor form are used as the third reactor heat transfer medium (310). In embodiments, water in the liquid or vapor form are used as the second reactor heat transfer medium (210). In embodiments, the second reactor heat transfer medium (210) discharged from the outlet (216) of the second reactor heat exchanger (HX-B) and transferred as a reactant (106A, 106B, 106C) to the first reactor (100) is superheated steam. In embodiments, the second reactor heat transfer medium (210) discharged from the outlet (216) of the second reactor heat exchanger (HX-B) and transferred as a reactant (206A, 206B, 206C) to the second reactor (200) is superheated steam.

In embodiments, carbon dioxide or product gas is used as the third reactor heat transfer medium (310). In embodiments, carbon dioxide or product gas is used as the third reactor heat transfer medium (310). In the embodiment of FIG. 3, the heat transfer medium (310) transferred from the outlet (316) of the third reactor heat exchanger (HX-C) to the inlet (212) of the second reactor heat exchanger (HX-B) is steam. In the embodiment of FIG. 3, the heat transfer medium (310) transferred from the outlet (316) of the third reactor heat exchanger (HX-C) to the inlet (212) of the second reactor heat exchanger (HX-B) and from the outlet (216) of the second reactor heat exchanger (HX-B) to the interior (101) of the first reactor (100) is steam. However, the heat transfer medium (310) transferred from the outlet (316) of the third reactor heat exchanger (HX-C) to the inlet (212) of the second reactor heat exchanger (HX-B) and from the outlet (216) of the second reactor heat exchanger (HX-B) to the interior (101) of the first reactor (100) may be water in the liquid state or vapor state or a combination of both. In embodiments, the third reactor heat transfer medium (310) can be water, carbon dioxide, product gas, Fischer-Tropsch tail gas, naphtha, hydrocarbons, nitrogen, air or a combination thereof as appropriate.

FIG. 4:

FIG. 4 elaborates upon the non-limiting embodiment of FIG. 3 however shows the third reactor (300) having both a first reactor product gas input (303) and a second reactor product gas input (305) as opposed to only one combined product gas input (304), as depicted in FIG. 3. As displayed in FIG. 4, the product gas generated in the first reactor (100) and the second reactor (200) are not combined but are separately and individually transferred to the third reactor (300). The first reactor product gas input (303) on the third reactor (300) is in fluid communication with the first separation gas output (156) to permit a char depleted first reactor product gas (126) to flow through the char depleted first reactor product gas conduit (128) and into the third interior (301). The second reactor product gas input (305) on the third reactor (300) is in fluid communication with the second separation gas output (256) to permit a solids depleted second reactor product gas (226) to flow through the solids depleted second reactor product gas conduit (228) and into the third interior (301).

FIG. 5:

FIG. 5 elaborates upon the non-limiting embodiment of FIG. 3 further including an auxiliary heat exchanger (HX-2) configured to transfer heat from a combustion stream (114) to an auxiliary heat exchanger heat transfer medium (164) that is fluid communication with the heat transfer medium inlet (212) of the second reactor heat exchanger (HX-B) via a exchanger heat transfer medium outlet conduit (170). FIG. 5 shows a combined combustion stream (114) exiting the First Stage Product Gas Generation System (3A) through a combustion products output (3A-OUT2) and entering the Second Stage Product Gas Generation System (3B) through a combustion products input (3B-IN6). Connection X0 indicates the combined combustion stream (114) entering the Second Stage Product Gas Generation Control Volume (CV-3B) en route to the auxiliary heat exchanger (HX-2).

Note that FIG. 5 only shows one first reactor heat exchanger (HX-A) as opposed to FIG. 3 where both, a first heat exchanger (HX-A1) and a second heat exchanger (HX-A2) are shown. Irrespective as to how many heat exchangers are contained within the interior (101) of the first reactor (100), any suitable configuration is suitable so long as the auxiliary heat exchanger (HX-2) may accept one or more of the combined combustion streams (114, 114A, 114B, 114C, 114D) from any number of heat exchanger combustion stream outlets (116, 116A, 116B, 116C, 116D) from any number of first reactor heat exchangers (HX-A, HX-A1, HX-A2, HX-A3, HX-A4). Notwithstanding the quantity of first reactor heat exchangers (HX-A, HX-A1, HX-A2), FIG. 5 depicts the system (1001) according to FIG. 3, further comprising: an auxiliary heat exchanger (HX-2) external to the first reactor (100) and in thermal contact with a first reactor heat exchanger combustion stream (114) exiting the heat exchanger combustion stream outlet (116); wherein the auxiliary heat exchanger (HX-2) is configured to transfer heat from the combustion stream (114) to an auxiliary heat exchanger heat transfer medium (164) which exits the auxiliary heat exchanger (HX-2) via auxiliary heat exchanger heat transfer medium outlet conduit (170).

An auxiliary heat exchanger (HX-2) has an auxiliary heat exchanger heat transfer medium (164) in thermal contact with the combustion stream (114) exiting the first heat exchanger (HX-A). The auxiliary heat exchanger (HX-2) is comprised of: an auxiliary heat exchanger heat transfer medium inlet (166) configured to receive an auxiliary heat exchanger heat transfer medium (164) at a first inlet temperature (T6); and an auxiliary heat exchanger heat transfer medium outlet (168) configured to output the heat transfer medium (164), at a higher, second outlet temperature (T7). The auxiliary heat exchanger (HX-2) is also comprised of: a combustion stream inlet (160) configured to receive a combustion stream (114) at a third inlet temperature (T4); and a combustion stream outlet (167) configured to output a combustion stream (114), at a lower, fourth outlet temperature (T5). (T3) is synonymous with the first reactor heat exchanger fuel inlet temperature (T3). (T4) is synonymous with the first reactor heat exchanger combined combustion stream outlet temperature (T4). Connection X0 shows the combustion stream (114) exiting the first heat exchanger (HX-A) within the First Stage Product Gas Generation Control Volume (CV-3A) and entering the auxiliary heat exchanger (HX-2) contained within the Second Stage Product Gas Generation Control Volume (CV-3B).

In embodiments, the auxiliary heat exchanger heat transfer medium outlet conduit (170) routes the heat transfer medium (164) at the second outlet temperature (T7) to a second reactor combined heat transfer medium conduit (174) to be used as the heat transfer medium (210) for the second reactor heat exchanger (HX-B).

The first reactor auxiliary heat exchanger heat transfer medium outlet (168) is in fluid communication with the second reactor heat transfer medium inlet (212) of the second reactor heat exchanger (HX-B) via an auxiliary heat exchanger heat transfer medium outlet conduit (170), to thereby supply the auxiliary heat exchanger heat transfer medium (164) as a heat transfer medium (210) for the second reactor heat exchanger (HX-B), and ultimately as a portion of the reactant (106) in the first reactor (100) and also as a portion of the reactant (206) used in the second reactor (200).

FIG. 6:

FIG. 6 elaborates upon the non-limiting embodiment of FIG. 5 where a portion of the third reactor heat transfer medium (310) is transferred from the outlet (316) of the third reactor heat exchanger (HX-C) to the inlet (166) of the auxiliary heat exchanger (HX-2) for use as the auxiliary heat exchanger heat transfer medium (164). In embodiments, the third reactor heat transfer medium (310) may come into thermal contact with the combustion stream (114) prior to being introduced to the inlet (212) of the second reactor heat exchanger (HX-B). Accordingly, the third reactor heat transfer medium (310) may have an inlet temperature (T6) to the auxiliary heat exchanger (HX-2) that is less than the outlet temperature (T7) of the auxiliary heat exchanger (HX-2). Connection X1 shows the combustion stream (114) exiting the first reactor heat exchanger (HX-A) within the First Stage Product Gas Generation Control Volume (CV-3A) and entering the auxiliary heat exchanger (HX-2) contained within the Second Stage Product Gas Generation Control Volume (CV-3B).

FIG. 6 displays the outlet (316) of the third reactor heat exchanger (HX-C) being in fluid communication with the inlet (212) of the second reactor heat exchanger (HX-B) with an auxiliary heat exchanger (HX-2), and a steam turbine (172) interposed therebetween. The third reactor heat transfer medium (310) may become superheated by the combustion stream (114) in the auxiliary heat exchanger (HX-2) prior to being routed to the steam turbine (172). A steam turbine (172) may be positioned in the conduit (171) in between the outlet (168) of the auxiliary heat exchanger (HX-2) and the inlet (212) of the second reactor heat exchanger (HX-B).

In embodiments, water may be used as the third reactor heat transfer medium (310). FIG. 6 shows water as the third reactor heat transfer medium (310) and introduced to the inlet (312) of the third reactor heat exchanger (HX-C). The water used as the third reactor heat transfer medium (310), and introduced to the inlet (312) of the third reactor heat exchanger (HX-C) may be in the liquid phase. However, in some embodiments, the water used as the third reactor heat transfer medium (310), and introduced to the inlet (312) of the third reactor heat exchanger (HX-C) may be in the liquid and vapor phase. In some embodiments, the water used as the third reactor heat transfer medium (310), and introduced to the inlet (312) of the third reactor heat exchanger (HX-C) is in the vapor phase.

As a result of at least one exothermic thermochemical process or reaction taking place within the interior (301) of the third reactor (300), heat is transferred from the interior (301) of the third reactor (300), through the third reactor heat exchanger (HX-C), and into the water heat transfer medium (310) contained within the third reactor heat exchanger (HX-C). As a result, steam is discharged from the outlet (316) of the third reactor heat exchanger (HX-C) and subsequently introduced to the inlet (166) of the auxiliary heat exchanger (HX-2).

Heat is transferred from the combustion stream (114), through the auxiliary heat exchanger (HX-2), and into the heat transfer medium (310) contained within the auxiliary heat exchanger (HX-2). As a result of the indirect contact between a portion of the third reactor heat transfer medium (310) and the combustion stream (114), superheated steam is discharged from the heat transfer medium outlet (168) of the auxiliary heat exchanger (HX-2).

A steam turbine (172) with an integrated generator (173) may be configured to accept the superheated heat transfer medium (310) discharged from the auxiliary heat exchanger (HX-2) to produce power (175). A portion of the third reactor heat transfer medium (310) may be further transferred to the inlet (212) of the second reactor heat exchanger (HX-B) for eventual use as a reactant (160, 106A, 106B, 106C) in the first reactor (100) or as a reactant (206, 206A, 206B, 206C) in the second reactor (200). The embodiment of FIG. 6 enables in-situ power generation via a steam turbine (172) and integrated generator (173) to satisfy the power demand of the Refinery Superstructure System (RSS) as depicted in FIGS. 25 and 26.

FIG. 7:

FIG. 7 is a detailed view of FIG. 3 showing a non-limiting embodiment of a First Stage Product Gas Generation Control Volume (CV-3A) and First Stage Product Gas Generation System (3A) of a three-stage energy-integrated product gas generation system (1001) including a first reactor (100) equipped with a dense bed zone (AZ-A), feed zone (AZ-B), and splash zone (AZ-C), along with the first reactor carbonaceous material input (104), valves, sensors, and controllers.

FIG. 7 shows a first reactor (100) having a first interior (101) provided with a first dense bed zone (AZ-A), a first feed zone (AZ-B) above the first dense bed zone (AZ-A), and a first splash zone (AZ-C) above the first feed zone (AZ-B). The first splash zone (AZ-C) is proximate to the first fluid bed level (L-A) and below the first freeboard zone (FB-A). In embodiments, the dense bed zone (AZ-A) corresponds to the lower portion of the dense bed within the first interior (101). In embodiments, the feed zone (AZ-B) is located above the dense bed zone (AZ-A). In embodiments, the splash zone (AZ-C) may be located above the feed zone (AZ-B) and below the first fluid bed level (L-A).

The system (1001) according to FIG. 7, comprises four first reactor heat exchangers (HX-A1, HX-A2, HX-A3, HX-A4) in thermal contact with the first interior (101) of the first reactor (100). The four first reactor heat exchangers (HX-A1, HX-A2, HX-A3, HX-A4) are positioned in the first interior (101) and vertically spaced apart from one another along the height dimension of the first interior (101).

The first reactor first heat exchanger (HX-A1) is comprised of: a first reactor first heat exchanger fuel inlet (112A) configured to introduce a first reactor first heat exchanger fuel (110A) at a first inlet temperature (T3A); and a first reactor first heat exchanger combustion stream outlet (116A) configured to discharge a first reactor first heat exchanger combustion stream (114A) at a higher, second outlet temperature (T4A).

The first reactor third heat exchanger (HX-A3) is comprised of: a first reactor third heat exchanger fuel inlet (112C) configured to introduce a first reactor third heat exchanger fuel (110C) at a first inlet temperature (T3C); and a first reactor third heat exchanger combustion stream outlet (116C) configured to discharge a first reactor third heat exchanger combustion stream (114C) at a higher, second outlet temperature (T4C).

Connection X2 shows the first reactor first heat exchanger combustion stream (114A) being routed to be combined with the discharge of the first reactor third heat exchanger combustion stream (114C) from the first reactor third heat exchanger combustion stream outlet (116C) of the first reactor first heat exchanger (HX-A1) to form a combined combustion stream (114).

FIG. 7 further depicts the First Stage Product Gas Generation Control Volume (CV-3A) having a First Stage Product Gas Generation System (3A) configured to accept a fuel input (3A-IN4) as a heat exchanger fuel (110, 110A, 110B, 110C, 110D) for the four first reactor heat exchangers (HX-A1, HX-A2, HX-A3, HX-A4). Each first reactor heat exchangers (HX-A1, HX-A2, HX-A3, HX-A4) is shown in be in physical contact with the first reactor particulate heat transfer material (105) and configured to discharge a combustion products output (3A-OUT2) as a combustion stream (114). The combustion products output (3A-OUT2) may be routed to an auxiliary heat exchanger (HX-2) as a combustion products input (3B-IN6) as depicted in FIGS. 5 and 6.

The embodiment of FIG. 7 shows the heat of reaction is supplied to the bed material (104) of the first reactor (100) indirectly by heat exchangers (HX-A1, HX-A3) such as pulse combustion device. Any type of heat exchanger may be used, such as pulse heater tailpipes, electrical heater rods in thermowells, fuel cells, heat pipes, fire-tubes, annulus-type heat exchangers, or radiant tubes. The embodiment of FIG. 7 also shows the heat of reaction also being supplied to the bed material (105) of the first reactor (100) directly by utilization of a fuel (3A-IN4) such as a mixture of hydrocarbons and an oxygen-containing gas. A portion of the product gas may be supplied as fuel (110) to the pulse combustion devices and combustion of these gases provides the heat necessary for the indirect endothermic thermochemical processes taking place within the first interior (101) of the first reactor (100). In one embodiment, the heat exchangers (HX-A1, HX-A3) may be a pulse combustion device that combusts a source of fuel (110) to form a pulse combustion stream (114) comprising flue gas. The pulse combustion stream (114) indirectly heats the particulate bed material (105) of the first reactor (100). As used therein, indirectly heating the bed means that the pulse combustion stream (114) does not contact the contents of the bed material (105) of the first reactor (100).

In some embodiments, the combustion of the fuel and oxygen-containing gas contained in the first reactor heat exchanger fuel (110) takes place within the first reactor heat exchangers (HX-A1, HX-A3). As a result, the first reactor heat exchanger fuel inlet temperature (T3) will be less than the first reactor heat exchanger combined combustion stream outlet temperature (T4). In some embodiments, the combustion of the fuel and oxygen-containing gas contained in the first reactor heat exchanger fuel (110) takes place outside of and prior to entering the first reactor heat exchangers (HX-A1, HX-A3). As a result, the first reactor heat exchanger combined combustion stream outlet temperature (T4) will be less than the first reactor heat exchanger fuel inlet temperature (T3). Heat exchangers for transferring thermal energy to a particulate heat transfer material (105) contained within the interior (101) of a first reactor are well known in the art and as such the details and design are not particularly relevant here.

In embodiments, the first reactor particulate heat transfer material (105) is comprised of Geldart Group A or Group B solids in the form of inert material or catalyst or sorbent or engineered particles. The engineered particles may be made of alumina, zirconia, sand, olivine sand, limestone, dolomite, or catalytic materials, any of which may be hollow in form, such as microballoons or microspheres. The preferred first reactor particulate heat transfer material (105) is Geldart Group B alumina microballons. The first reactor particulate heat transfer material (105) enhances mixing, heat and mass transfer, and reaction between the carbonaceous material (102) and the reactant or oxygen-containing gas introduced to the first reactor (100).

A carbonaceous material input (3A-IN1) is introduced to the First Stage Product Gas Generation Control Volume (CV-3A) as a first reactor carbonaceous material input (104) and is configured to provide a carbonaceous material (102) to the feed zone (AZ-B) of the first reactor (100).

A carbonaceous material (102) is introduced to the interior (101) of the first reactor (100) for intimate contact with the heated particulate heat transfer material (105), reactant (106, 106A, 106B, 106C) and oxygen-containing gas (218, 218A, 218B, 218C) to produce a first reactor product gas (122) that is discharged from the interior (101) of the first reactor (100) via a first reactor product gas output (124).

The first reactor product gas output (124) exits the First Stage Product Gas Generation Control Volume (CV-3A) through a first reactor product gas output (3A-OUT1) and enters the Second Stage Product Gas Generation Control Volume (CV-3B) shown in FIG. 13 as a first reactor product gas input (3B-IN1).

FIG. 7 depicts steam being introduced to the First Stage Product Gas Generation Control Volume (CV-3A) as a reactant (106) via a first reactor reactant input (3A-IN2) or a second reactor heat transfer medium output (3B-OUT2) to be made available to any combination of (i) the corresponding first reactor dense bed zone (AZ-A), (ii) the first reactor feed zone (AZ-B), and (iii) the first reactor splash zone (AZ-C). The reactant (106) is at a first reactor reactant temperature (TR1).

Further, FIG. 7 depicts an oxygen-containing gas (118) being introduced to the First Stage Product Gas Generation Control Volume (CV-3A) through an oxygen-containing gas input (3A-IN3) to be made available to any combination of (i) the corresponding first reactor dense bed zone (AZ-A), (ii) the first reactor feed zone (AZ-B), and (iii) the first reactor splash zone (AZ-C).

FIG. 7 depicts the system (1001) further including: a first reactor dense bed zone reactant input (108A) and first reactor dense bed zone oxygen-containing gas input (120A) in fluid communication with a dense bed zone steam/oxygen connection (AZA0). The dense bed zone steam/oxygen connection (AZA0) is in fluid communication with the dense bed zone steam/oxygen input (AZA2) and is configured to transport the dense bed zone steam/oxygen (AZA1) to the first reactor (100) dense bed zone (AZ-A). The first reactor (100) dense bed zone steam/oxygen (AZA1) is a mixture of the first reactor dense bed zone reactant (106A) and first reactor dense bed zone oxygen-containing gas (118A).

A first reactor dense bed zone reactant valve (VA1), configured to accept a signal (XA1) from a controller (CA1), is installed upstream of the input (108A) to control the amount of reactant (106A) supplied to the first reactor (100) dense bed zone (AZ-A). A first reactor dense bed zone oxygen-containing gas valve (VA2), configured to accept a signal (XA2) from a controller (CA2), is installed upstream of the input (120A) to control the amount of oxygen-containing gas (118A) supplied to the first reactor (100) dense bed zone (AZ-A).

FIG. 7 depicts the system (1001) further including: a first reactor feed zone reactant input (108B) and first reactor feed zone oxygen-containing gas input (120B) in fluid communication with a feed zone steam/oxygen connection (AZB0). The feed zone steam/oxygen connection (AZB0) is in fluid communication with the feed zone steam/oxygen input (AZB2) and configured to transport the feed zone steam/oxygen (AZB1) to the first reactor (100) feed zone (AZ-B).

The first reactor (100) feed zone steam/oxygen (AZB1) is a mixture of the first reactor feed zone reactant (106B) and first reactor feed zone oxygen-containing gas (118B).

A first reactor feed zone reactant valve (VA3), configured to accept a signal (XA3) from a controller (CA3), is installed upstream of the input (108B) to control the amount of reactant (106B) supplied to the first reactor (100) feed zone (AZ-B). A first reactor feed zone oxygen-containing gas valve (VA4), configured to accept a signal (XA4) from a controller (CA4), is installed upstream of the input (120B) to control the amount of oxygen-containing gas (118B) supplied to the first reactor (100) feed zone (AZ-B).

FIG. 7 depicts the system (1001) further including: a first reactor splash zone reactant input (108C) and first reactor splash zone oxygen-containing gas input (120C) in fluid communication with a splash zone steam/oxygen connection (AZC0). The splash zone steam/oxygen connection (AZC0) is in fluid communication with the splash zone steam/oxygen input (AZC2) and configured to transport the splash zone steam/oxygen (AZC1) to the first reactor (100) splash zone (AZ-C). The first reactor (100) splash zone steam/oxygen (AZC1) is a mixture of the first reactor splash zone reactant (106C) and first reactor splash zone oxygen-containing gas (118C).

A first reactor splash zone reactant valve (VA5), configured to accept a signal (XA5) from a controller (CA5) is installed upstream of the input (108C) to control the amount of reactant (106C) supplied to the first reactor (100) splash zone (AZ-C). A first reactor splash zone oxygen-containing gas valve (VA6), configured to accept a signal (XA6) from a controller (CA6) is installed upstream of the input (120C) to control the amount of oxygen-containing gas (118C) supplied to the first reactor (100) splash zone (AZ-C). An internal cyclone (125) is shown in the freeboard zone (FB-A) of the first reactor (100).

FIG. 8:

FIG. 8 elaborates upon the non-limiting embodiment of FIG. 7 further including multiple carbonaceous material inputs (104A, 104B, 104C, 104D) and multiple feed zone steam/oxygen inputs (AZB2, AZB3, AZB4, AZB5) positioned in the feed zone (AZ-B) along with multiple splash zone steam/oxygen inputs (AZC2, AZC3, AZC4, AZC5) positioned in the splash zone (AZ-C). FIG. 8 depicts four carbonaceous material inputs (104A, 104B, 104C, 104D) to the feed zone (AZ-B) of the first interior (101) of the first reactor (100). Each carbonaceous material input (104A, 104B, 104C, 104D) has a corresponding steam/oxygen input (AZB2, AZB3, AZB4, AZB5).

Specifically, the first reactor first carbonaceous material input (104A) has its own source of feed zone steam/oxygen (AZB1) introduced from the first feed zone steam/oxygen input (AZB2). The second carbonaceous material input (104B) has its own source of feed zone steam/oxygen (AZB1) introduced from the second feed zone steam/oxygen input (AZB3). The third carbonaceous material input (104C) has its own source of feed zone steam/oxygen (AZB1) introduced from the third feed zone steam/oxygen input (AZB4). The fourth carbonaceous material input (104D) has its own source of feed zone steam/oxygen (AZB1) introduced from the fourth feed zone steam/oxygen input (AZB5). Connection X3 indicates the feed zone steam/oxygen (AZB1) being introduced to the third feed zone steam/oxygen input (AZB4) and the fourth feed zone steam/oxygen input (AZB5). Connection X4 indicates carbonaceous material (102C and 102D) being introduced to a third carbonaceous material input (104C) and a fourth carbonaceous material input (104D), respectively.

FIG. 8 depicts four splash zone steam/oxygen inputs (AZC2, AZC3, AZC4, AZC5) to the splash zone (AZ-C) of the first interior (101) of the first reactor (100). Each of the four splash zone steam/oxygen inputs (AZC2, AZC3, AZC4, AZC5) is fed from a common source of splash zone steam/oxygen (AZC1) for delivery to the splash zone (AZ-C) of the first interior (101) of the first reactor (100). Connection X5 indicates the splash zone steam/oxygen (AZC1) being introduced to the second splash zone steam/oxygen input (AZC3), third splash zone steam/oxygen input (AZC4), and the fourth splash zone steam/oxygen input (AZC5). Connection X6 indicates the splash zone steam/oxygen (AZC1) being introduced to the second splash zone steam/oxygen input (AZC3). Note that although only four carbonaceous material inputs (104A, 104B, 104C, 104D) it is preferred to have six inputs as later indicated in FIG. 9 and FIG. 10.

FIG. 8 also shows the perspective of a first reactor feed zone cross-sectional view (XAZ-B) that will be elaborated upon in FIGS. 9, 10, and 11. FIG. 8 also shows the perspective of a first reactor splash zone cross-sectional view (XAZ-C) that will be elaborated upon in FIG. 12.

FIG. 8 also shows the first reactor first carbonaceous material input (104A) and the first reactor second carbonaceous material input (104B) introduced to the interior (101) of the first reactor at different planes at different vertical heights about the first reactor (100). FIG. 8 also shows the first reactor third carbonaceous material input (104C) and the first reactor fourth carbonaceous material input (104D) introduced to the interior (101) of the first reactor at different planes at different vertical heights about the first reactor (100).

FIG. 9:

FIG. 9 shows a non-limiting embodiment of a first reactor feed zone cross-sectional view (XAZ-B) from the embodiment of FIG. 8. In embodiments, six carbonaceous material inputs (104A, 104B, 104C, 104D, 104E, 104F) are positioned about the circumference of the first reactor (100). FIG. 9 also depicts each of the six carbonaceous material inputs (104A, 104B, 104C, 104D, 104E, 104F) having its own dedicated source of feed zone steam/oxygen introduced through a respective feed zone steam/oxygen input (AZB2, AZB3, AZB4, AZB5, AZB6). The first feed zone steam/oxygen input (AZB2) has a first reactor first carbonaceous material input (104A). The first reactor second carbonaceous material input (104B) has a second feed zone steam/oxygen input (AZB3). The first reactor third carbonaceous material input (104C) has a third feed zone steam/oxygen input (AZB4). The first reactor fourth carbonaceous material input (104D) has a fourth feed zone steam/oxygen input (AZB5). The first reactor fifth carbonaceous material input (104E) has a fifth feed zone steam/oxygen input (AZB6). The first reactor sixth carbonaceous material input (104F) has a sixth feed zone steam/oxygen input (AZB7).

Four of the six carbonaceous material inputs (104A, 104C, 104D, 104F) are positioned 90 degrees from one another. Two of the six carbonaceous material inputs (104B, 104E) are positioned 180 degrees from one another at angles of 45 degrees and 225 degrees leaving the angled positions of 135 degrees and 315 degrees vacant where the angle 0 degrees and 360 degrees are at the twelve-o-clock position on the circular diagram depicting the first reactor (100).

FIG. 10:

FIG. 10 shows a non-limiting embodiment of a first reactor feed zone cross-sectional view (XAZ-B) from the embodiment of FIG. 8, however, FIG. 10 shows a rectangular first reactor (100) cross-sectional view. In embodiments, six carbonaceous material inputs (104A, 104B, 104C, 104D, 104E, 104F) are positioned about the perimeter of the first reactor (100).

Similar to FIG. 9, FIG. 10 shown each of the six carbonaceous material inputs (104A, 104B, 104C, 104D, 104E, 104F) having its own dedicated source of feed zone steam/oxygen introduced through a respective feed zone steam/oxygen input (AZB2, AZB3, AZB4, AZB5, AZB6). The first feed zone steam/oxygen input (AZB2) has a first reactor first carbonaceous material input (104A). The first reactor second carbonaceous material input (104B) has a second feed zone steam/oxygen input (AZB3). The first reactor third carbonaceous material input (104C) has a third feed zone steam/oxygen input (AZB4). The first reactor fourth carbonaceous material input (104D) has a fourth feed zone steam/oxygen input (AZB5). The first reactor fifth carbonaceous material input (104E) has a fifth feed zone steam/oxygen input (AZB6). The first reactor sixth carbonaceous material input (104F) has a sixth feed zone steam/oxygen input (AZB7).

FIG. 11:

FIG. 11 shows a non-limiting embodiment of a first reactor feed zone cross-sectional view (XAZ-B) from the embodiment of FIG. 8 where only two of the six first reactor (100) carbonaceous material inputs (104B, 104E) are configured to inject carbonaceous material into vertically extending quadrants (Q1, Q2, Q3, Q4). FIG. 11 elaborates upon the preference to have only two of the six first reactor carbonaceous material inputs (104B, 104E) configured to inject carbonaceous material into the vertically extending quadrants (Q1, Q3). Further, each of the six carbonaceous material inputs (104A, 104B, 104C, 104D, 104E, 104F) has its own dedicated steam/oxygen input (AZB2, AZB3, AZB4, AZB5, AZB6, AZB7), respectfully. FIG. 11 depicts four first reactor heat exchangers (HX-A1, HX-A2, HX-A3, HX-A4) positioned in the first interior (101) and vertically spaced apart from one another along the height dimension of the first interior; wherein: alternate first reactor heat exchangers along said first height dimension are arranged orthogonal to one another such that, in a top view of the first interior, the four first reactor heat exchangers define four open vertically extending quadrants (Q1, Q2, Q3, Q4).

FIG. 12:

FIG. 12 shows a non-limiting embodiment of a first reactor splash zone cross-sectional view (XAZ-C) from the embodiment of FIG. 8. In embodiments, eight separate splash zone steam/oxygen inputs (AZC2, AZC3, AZC4, AZC5, AZC6, AZC7, AZC8, AZC9) are shown equidistantly spaced apart at 45 degree angles to one another about the circumference of the first reactor (100). Each of the eight separate splash zone steam/oxygen inputs (AZC2, AZC3, AZC4, AZC5, AZC6, AZC7, AZC8, AZC9) accepts a source of splash zone steam/oxygen (AZC1).

FIG. 13:

FIG. 13 is a detailed view of FIG. 3 showing a non-limiting embodiment of a Second Stage Product Gas Generation Control Volume (CV-3B) and Second Stage Product Gas Generation System (3B) of a three-stage energy-integrated product gas generation system (1001) including a second reactor (200) equipped with a dense bed zone (BZ-A), feed zone (BZ-B), and splash zone (BZ-C), along with a second reactor heat exchanger (HX-B), first solids separation device (150), second solids separation device (250), solids flow regulator (245), riser (236), dipleg (244), and valves, sensors, and controllers.

FIG. 13 shows a second reactor (200) having a second interior (201) provided with a dense bed zone (BZ-A), a feed zone (BZ-B) above the dense bed zone (BZ-A), and a splash zone (BZ-C) above the feed zone (BZ-B). The splash zone (BZ-C) is proximate to the fluid bed level (L-B) and below the freeboard zone (FB-B). In embodiments, the dense bed zone (BZ-A) corresponds to the lower portion of the dense bed within the second interior (201). In embodiments, the feed zone (BZ-B) is located above the dense bed zone (BZ-A). In embodiments, the splash zone (BZ-C) may be located above the feed zone (BZ-B) and below the second fluid bed level (L-B). The embodiment shown in FIG. 13 depicts the second reactor heat exchanger (HX-B) immersed below the fluid bed level (L-B) of the second reactor (200).

The second reactor heat exchanger (HX-B) comprises: a second reactor heat transfer medium inlet (212) configured to receive a heat transfer medium (210) at a second reactor inlet temperature (T1); and a second reactor heat transfer medium outlet (216) configured to output the heat transfer medium (210), at a higher, second reactor outlet temperature (T2).

A second reactor heat transfer medium supply valve (VB0), configured to accept a signal (XB0) from a controller (CB0) is installed upstream of the second reactor heat transfer medium inlet (212) to control the amount of heat transfer medium (210) supplied to the second reactor heat exchanger (HX-B). The heat transfer medium (210) is supplied via the second reactor heat transfer medium input (3B-IN2) or third reactor heat transfer medium output (3C-OUT2). As depicted in FIG. 3, a portion of the third reactor heat transfer medium (310) is used as the second reactor heat transfer medium (210). Thus, the inlet (212) of the second reactor heat exchanger (HX-B) is fluidly in communication with the outlet (316) of the third reactor heat exchanger (HX-C).

The upstream first reactor (100) is in fluid communication with the second reactor heat transfer medium outlet (216) of the second reactor heat exchanger (HX-B) and is configured to introduce at least a portion of second reactor heat transfer medium (210) into the first reactor (100) via a first reactor reactant input (3A-IN2) or a second reactor heat transfer medium output (3B-OUT2). Therefore, the upstream first reactor (100) is also in fluid communication with the third reactor heat transfer medium outlet (316) of the third reactor heat exchanger (HX-C) and is configured to introduce at least a portion of the third reactor heat transfer medium (310) into the first reactor (100).

The second interior (201) of the second reactor (200) is in fluid communication with the second reactor heat transfer medium outlet (216) of the second reactor heat exchanger (HX-B) and is configured to introduce at least a portion of second reactor heat transfer medium (210) into the second reactor (200). Therefore, the second interior (201) of the second reactor (200) is in fluid communication with the third reactor heat transfer medium outlet (316) of the third reactor heat exchanger (HX-C) and is configured to introduce at least a portion of the third reactor heat transfer medium (310) into the second reactor (200).

FIG. 13 further illustrates a Second Stage Product Gas Generation Control Volume (CV-3B) and Second Stage Product Gas Generation System (3B) showing a first reactor product gas input (3B-IN1) entering as a first solids separation device (150) as a first reactor product gas output (3A-OUT1). FIG. 13 further illustrates a Second Stage Product Gas Generation Control Volume (CV-3B) and Second Stage Product Gas Generation System (3B) discharging a product gas output (3B-OUT1) as a combined product gas input (3C-IN1) to the Third Stage Product Gas Generation System (3C) within the Third Stage Product Gas Generation Control Volume (CV-3C).

The first solids separation device (150) is comprised of: a first separation input (152) in fluid communication with the first reactor product gas output (124); a first separation char output (154) in fluid communication with the second reactor char input (204); and a first separation gas output (156). The second reactor (200) is configured to accept a char (202) through a second reactor char input (204) routed to the second interior (201) via a dipleg (244).

A riser (236) connects the interior (201) of the second reactor (200) with the terminal portion (242) of the conduit that connects the first reactor product gas output (124) with the first separation input (152). The riser (236) is configured to transport particulate heat transfer material (205) from the interior (201) of the second reactor (200) via riser connection (238) to the first separation input (152).

In embodiments, the second reactor particulate heat transfer material (205) is comprised of Geldart Group A or Group B solids in the form of inert material or catalyst or sorbent or engineered particles. The engineered particles may be made of alumina, zirconia, sand, olivine sand, limestone, dolomite, or catalytic materials, any of which may be hollow in form, such as microballoons or microspheres. The preferred second reactor particulate heat transfer material (205) is Geldart Group B alumina microballons. The second reactor particulate heat transfer material (205) enhances mixing, heat and mass transfer, and reaction between the char (202) and the reactant (206A, 206B, 206C) or oxygen-containing gas (218A, 218B, 218C) introduced to the second reactor (200).

A riser conveying fluid (240) is preferably introduced to the riser (236) to assist in uniform flow of particulate heat transfer material (205) from the interior (201) of the second reactor (200) to the first separation input (152).

A solids flow regulator (245) is interposed in between the first separation char output (154) and the second reactor char input (204) and configured as a sealing apparatus to prevent backflow of particulate heat transfer material (205) from the interior (201) of the second reactor (200). The solids flow regulator (245) is comprised of: a solids flow regulator solids input (246) configured to receive char (202) and solids (205) separated from the first separation char output (154) of the first solids separation device (150); a solids flow regulator solids output (247) configured to output char (202) and solids (205) to the second reactor char input (204) via a dipleg (244); a solids flow regulator gas input (248) to accept a solids flow regulator gas (249). Connection X7 in FIG. 13 shows a gas input (3B-IN4) being used as the riser conveying fluid (240) originating from a downstream Secondary Gas Clean-Up System (6000) as a carbon dioxide output (6-OUT2) also as depicted in FIG. 25 and FIG. 26. In embodiments, the solids flow regulator gas (249) originates from a downstream Secondary Gas Clean-Up System (6000) as a carbon dioxide output (6-OUT2) and is transferred from connection X7 to the solids flow regulator gas input (248).

The first separation char output (154) of the first solids separation device (150) is configured to output char (202) and is in fluid communication with the second reactor (200) via a second reactor char input (204). The first separation gas output (156) of the first solids separation device (150) is configured to output a char depleted first reactor product gas (126) via a char depleted first reactor product gas conduit (128).

The second reactor (200) comprises: a second reactor char input (204) to the second feed zone (BZ-B), said second reactor char input (204) being in fluid communication with the first reactor product gas output (124); a second reactor dense bed zone reactant input (208A) configured to introduce a second reactor dense bed zone reactant (206A) to the second dense bed zone (BZ-A); a second reactor feed zone reactant input (208B) configured to introduce a second reactor feed zone reactant (206B) to the second feed zone (BZ-B); a second reactor splash zone reactant input (208C) configured to introduce a second reactor splash zone reactant (206C) to the second splash zone (BZ-C); a second reactor dense bed zone oxygen-containing gas input (220A) configured to introduce a second reactor dense bed zone oxygen-containing gas (218A) to the second dense bed zone (BZ-A); a second reactor feed zone oxygen-containing gas input (220B) configured to introduce a second reactor feed zone oxygen-containing gas (218B) to the second feed zone (BZ-B); a second reactor splash zone oxygen-containing gas input (220C) configured to introduce a second reactor splash zone oxygen-containing gas (218C) to the second splash zone (BZ-C); a second reactor product gas output (224); and, a second reactor heat exchanger (HX-B) in thermal contact with the second interior (201); wherein:

the second reactor heat exchanger (HX-B) is configured to receive a heat transfer medium (210) at a second reactor inlet temperature (T1) and output the heat transfer medium (210), at a higher, second reactor outlet temperature (T2), via a second reactor heat transfer medium outlet (216); and, the second reactor heat transfer medium outlet (216) is configured to be selectively in fluid communication with any combination of the first reactor dense bed zone reactant input (108A), the first reactor feed zone reactant input (108B) and the first reactor splash zone reactant input (108C); and, the second reactor heat transfer medium outlet (216) is configured to be selectively in fluid communication with any combination of the second reactor dense bed zone reactant input (208A), second reactor feed zone reactant input (208B) and the second reactor splash zone reactant input (208C); whereby: at least a portion of the heat transfer medium (210) is capable of being introduced into any combination of: (i) the corresponding second reactor (200) dense bed zone (BZ-A), (ii) the second reactor (200) feed zone (BZ-B), and (iii) the second reactor (200) splash zone (BZ-C).

Further, FIG. 13 depicts an oxygen-containing gas (218) being introduced to the Second Stage Product Gas Generation Control Volume (CV-3B) as an oxygen-containing gas input (3B-IN3) to be made available to any combination of: (i) the corresponding second reactor (200) dense bed zone (BZ-A), (ii) the second reactor (200) feed zone (BZ-B), (iii) the second reactor (200) splash zone (BZ-C).

FIG. 13 depicts the system (1001) further including: a second reactor dense bed zone reactant input (208A) and second reactor dense bed zone oxygen-containing gas input (220A) in fluid communication with a dense bed zone steam/oxygen connection (BZA0). The dense bed zone steam/oxygen connection (BZA0) is in fluid communication with the dense bed zone steam/oxygen (BZA2) and configured to transport the dense bed zone steam/oxygen (BZA1) to the second reactor (200) dense bed zone (BZ-A). The second reactor (200) dense bed zone steam/oxygen (BZA1) is a mixture of the second reactor dense bed zone reactant (206A) and second reactor dense bed zone oxygen-containing gas (218A).

A second reactor dense bed zone reactant valve (VB1), configured to accept a signal (XB1) from a controller (CB1) is installed upstream of the input (208A) to control the amount of reactant (206A) supplied to the second reactor (200) dense bed zone (BZ-A). A second reactor dense bed zone oxygen-containing gas valve (VB2), configured to accept a signal (XB2) from a controller (CB2) is installed upstream of the input (220A) to control the amount of oxygen-containing gas (218A) supplied to the second reactor (200) dense bed zone (BZ-A).

FIG. 13 depicts the system (1001) further including: a second reactor feed zone reactant input (208B) and second reactor feed zone oxygen-containing gas input (220B) in fluid communication with a feed zone steam/oxygen connection (BZB0). The feed zone steam/oxygen connection (BZB0) is in fluid communication with the feed zone steam/oxygen input (BZB2) and configured to transport the feed zone steam/oxygen (BZB1) to the second reactor (200) feed zone (BZ-B). The second reactor (200) feed zone steam/oxygen (BZB1) is a mixture of the second reactor feed zone reactant (206B) and second reactor feed zone oxygen-containing gas (218B).

A second reactor feed zone reactant valve (VB3), configured to accept a signal (XB3) from a controller (CB3) is installed upstream of the input (208B) to control the amount of reactant (206B) supplied to the second reactor (200) feed zone (BZ-B). A second reactor feed zone oxygen-containing gas valve (VB4), configured to accept a signal (XB4) from a controller (CB4) is installed upstream of the input (220B) to control the amount of oxygen-containing gas (218B) supplied to the second reactor (200) feed zone (BZ-B).

FIG. 13 depicts the system (1001) further including: a second reactor splash zone reactant input (208C) and second reactor splash zone oxygen-containing gas input (220C) in fluid communication with a splash zone steam/oxygen connection (BZC0). The splash zone steam/oxygen connection (BZC0) is in fluid communication with the splash zone steam/oxygen input (BZC2) and configured to transport the splash zone steam/oxygen (BZC1) to the second reactor (200) splash zone (BZ-C). The second reactor (200) splash zone steam/oxygen (BZC1) is a mixture of the second reactor splash zone reactant (206C) and second reactor splash zone oxygen-containing gas (218C).

A second reactor splash zone reactant valve (VB5), configured to accept a signal (XB5) from a controller (CB5) is installed upstream of the input (208C) to control the amount of reactant (206C) supplied to the second reactor (200) splash zone (BZ-C). A second reactor splash zone oxygen-containing gas valve (VB6), configured to accept a signal (XB6) from a controller (CB6) is installed upstream of the input (220C) to control the amount of oxygen-containing gas (218C) supplied to the second reactor (100) splash zone (BZ-C).

An internal cyclone (225) is shown in the freeboard zone (FB-B) of the second reactor (200). A restriction orifice differential pressure sensor (DP-AB) is shown to measure the pressure drop across the restriction orifice (RO-B). A fuel input (264) is shown on the second reactor (200) and is configured to introduce a source of fuel (262) to the interior (201) of the second reactor (200). In embodiments, the fuel (262) may be provided to the second reactor (200) via a fuel input (3B-IN5) transferred from a fuel output (4-OUT2) from a downstream Primary Gas Clean Up System (4000) as depicted in FIG. 25 and FIG. 26. The fuel output (4-OUT2) may include VOC, SVOC, hydrocarbons such as solvents, Fischer Tropsch Products such as naphtha, or carbonaceous materials in the liquid, solid, or slurry form including coal or char.

A second reactor hydrocarbon valve (VB7) is positioned upstream of the fuel input (264) on the second reactor (200), and is configured to accept a signal (XB7) from a controller (CB7) to control the amount of fuel (262) supplied to the second reactor (200).

Char (202) is introduced to the interior (201) of the second reactor (200) for intimate contact with the particulate heat transfer material (205), reactants (206A, 206B, 206C), and oxygen-containing gas (218, 218A, 218B, 218C) to produce a second reactor product gas (222) that is discharged via a second reactor product gas output (224).

The second solids separation device (250) is configured to accept a second reactor product gas (222) and output a solids depleted second reactor product gas (226) via a solids depleted second reactor product gas conduit (228). The second solids separation device (250) has a second separation input (252) in fluid communication with the second reactor product gas output (224). The second solids separation device (250) has a second separation solids output (254) in fluid communication with a solids transfer conduit (234) and is configured to output second reactor separated solids (232) such as char or ash. The second separation gas output (256) of the solids separation device (250) is in fluid communication with the char depleted first reactor product gas conduit (128) or the combined reactor product gas conduit (230).

FIG. 13 refers to a second reactor feed zone cross-sectional view (XBZ-B) that will be elaborated upon in FIGS. 14, 15, 16, and 17. FIG. 13 also refers to a second reactor splash zone cross-sectional view (XBZ-C) that will be elaborated upon in FIG. 18.

FIG. 14:

FIG. 14 shows a non-limiting embodiment of a second reactor feed zone cross-sectional view (XBZ-B) of the embodiment in FIG. 13, including: one first solids separation device (150); four second reactor char inputs (204A, 204B, 204C, 204D); four feed zone steam/oxygen inputs (BZB2, BZB3, BZB4, BZB5); and, where the combined reactor product gas conduit (230) is configured to blend the first reactor product gas (126) with the second reactor product gas (226). FIG. 14 depicts four separate second reactor char inputs (204A, 204B, 204C, 204D) for transferring four separate streams of char (202A, 202B, 202C, 202D) to the feed zone (BZ-B) of the second reactor (200). The four separate streams of char (202A, 202B, 202C, 202D) may be reacted with the four feed zone steam/oxygen inputs (BZB2, BZB3, BZB4, BZB5) to generate a second reactor product gas (222). The second reactor product gas (222) may in turn be routed to the inlet (252) of a second solids separation device (250). The second solids separation device (250) is configured to separate solids (232) from the product gas (222) to result in a solids depleted second reactor product gas (226). The solids depleted second reactor product gas (226) is shown to be routed to the combined reactor product gas conduit (230) via a conduit (228). The first reactor product gas (126) may be combined with the second reactor product gas (226) in a combined reactor product gas conduit (230).

FIG. 15:

FIG. 15 shows a non-limiting embodiment of a second reactor feed zone cross-sectional view (XBZ-B) of the embodiment in FIG. 13 where the first reactor product gas (126) is not combined with the second reactor product gas (226).

FIG. 16:

FIG. 16 shows a non-limiting embodiment of a second reactor feed zone cross-sectional view (XBZ-B) of the embodiment in FIG. 13, including: two first solids separation devices (150A1, 150A2); two solids flow regulators (245A, 245B); four second reactor char inputs (204A, 204B, 204C, 204D); four feed zone steam/oxygen inputs (BZB2, BZB3, BZB4, BZB5); and the combined reactor product gas conduit (230), configured to blend the first reactor product gas (126A1, 126A2) with the second reactor product gas (226).

FIG. 16 elaborates upon the embodiment where each of two first solids separation devices (150A1, 150A2) accept a portion of the first reactor product gas (122). One first solids separation device (150A) accepts a portion of the first reactor product gas (122A1) via a first separation input (152A1). Another first solids separation device (150B) accepts another portion of the first reactor product gas (122A2) via a first separation input (152A2). Each first solids separation device has a dipleg (244A, 244B) that is connected to a respective solids flow regulator (245A, 245B).

One first solids separation device (150A1) accepts a portion of the first reactor product gas (122A1) removes char (202A, 202D) therefrom for transfer to the second reactor (200) and outputs a char depleted first reactor product gas (126A1) via a char depleted first reactor product gas conduit (128A1). Another first solids separation device (150A2) accepts a portion of the first reactor product gas (122A2) removes char (202B, 202C) therefrom for transfer to the second reactor (200) and outputs a char depleted first reactor product gas (126A2) via a char depleted first reactor product gas conduit (128A2). Each char depleted first reactor product gas conduit (128A1, 128A2) may be combined into one common conduit (128).

The first separation char output (154A1) on one first solids separation device (150A1) is in fluid communication with the first solids flow regulator solids input (246A) of the first solids flow regulator (245A) via a dipleg (244A). The first separation char output (154A2) on the other first solids separation device (150A2) is in fluid communication with the second solids flow regulator solids input (246B) of the second solids flow regulator (245B) via a dipleg (244B).

One solids slow regulator (245A) has a first solids flow regulator solids output (247A) and a second solids flow regulator solids output (247B). The first solids flow regulator solids output (247A) is in fluid communication with the second reactor fourth char input (204D) and is configured to transfer char (202D) to the second reactor (200). The second solids flow regulator solids output (247B) is in fluid communication with the second reactor first char input (204A) and is configured to transfer char (202A) to the second reactor (200).

Another solids slow regulator (245B) has a third solids flow regulator solids output (247C) and a fourth solids flow regulator solids output (247D). The third solids flow regulator solids output (247C) is in fluid communication with the second reactor third char input (204C) and is configured to transfer char (202C) to the second reactor (200). The fourth solids flow regulator solids output (247D) is in fluid communication with the second reactor second char input (204B) and is configured to transfer char (202B) to the second reactor (200).

FIG. 17:

FIG. 17 shows a non-limiting embodiment of a second reactor feed zone cross-sectional view (XBZ-B) of the embodiment in FIG. 16 where the first reactor product gas (126A1, 126A2) is not combined with the second reactor product gas (226).

FIG. 18:

FIG. 18 shows a non-limiting embodiment of a second reactor splash zone cross-sectional view (XBZ-C) of the embodiment in FIG. 13, including four splash zone steam/oxygen inputs (BZC2, BZC3, BZC4, BZC5) configured to accept a source of splash zone steam/oxygen (BZC1).

FIG. 19:

FIG. 19 elaborates upon the non-limiting embodiment of FIG. 7 further including two particulate classification vessels (A1A, A1B) that are configured to accept a bed material and inert feedstock contaminant mixture (A4A, A4AA), and a classifier gas (A16, A16A) and to classify or clean and recycle the bed material portion back to the first interior (101) of the first reactor (100) while removing the inert feedstock contaminant portion from the system as a solids output (3A-OUT3).

The product gas generation and particulate classification system (1002) shown in FIG. 19 depicts a Product Gas Generation System (3A) configured to produce both a product gas (122) and classified inert feedstock contaminants (A19, A19A) from a carbonaceous material (102). The system (1002) comprises a first reactor (100) having a first interior (101) and comprising: a first reactor carbonaceous material input (104) to the first interior (101); a first reactor reactant input (108A, 108B, 108C) to the first interior (101); a first reactor product gas output (124) from the first interior (101); a classified recycled bed material input (A27, A27A) to the first interior (101); and, a bed material and inert feedstock contaminant mixture output (A2A, A2AA) from the first interior (101).

The system (1002) further comprises two particulate classification vessels (A1A, A1B) each having a classifier interior (INA, INB) and comprising: a bed material and inert feedstock contaminant mixture input (A5A, A5AA), a classifier gas input (A6A, A6AA), a classified recycled bed material output (A7A, A7AA), a classifier depressurization gas output (ABA, A8AA), and a classifier inert feedstock contaminant output (A9A, A9AA).

The system (1002) shown in FIG. 19 depicts one first reactor (100) equipped with two particulate classification vessels (A1A, A1B). Each particulate classification vessel (A1A, A1B) is equipped with a bed material and inert feedstock contaminant mixture input (A5A, A5AA) in fluid communication with the first interior (101) of the first reactor (100) through a bed material and inert feedstock contaminant mixture output (A2A, A2AA) and a bed material and inert feedstock contaminant mixture transfer conduit (A3A,A3AA). Each bed material and inert feedstock contaminant mixture input (A5A, A5AA) is configured to introduce a bed material and inert feedstock contaminant mixture (A4A, A4AA) to the interior (INA, INB) via a bed material and inert feedstock contaminant mixture transfer conduit (A3A, A3AA).

The bed material and inert feedstock contaminant mixture (A4A, A4AA) is comprised of a bed material portion and an inert feedstock contaminant portion. The bed material portion is synonymous with the first reactor particulate heat transfer material (105).

MSW and/or RDF are carbonaceous materials that contain inert feedstock contaminants in the form of Geldart Group D particles comprising whole units and/or fragments of one or more from the group consisting of allen wrenches, ball bearings, batteries, bolts, bottle caps, broaches, bushings, buttons, cable, cement, chains, clips, coins, computer hard drive shreds, door hinges, door knobs, drill bits, drill bushings, drywall anchors, electrical components, electrical plugs, eye bolts, fabric snaps, fasteners, fish hooks, flash drives, fuses, gears, glass, gravel, grommets, hose clamps, hose fittings, jewelry, key chains, key stock, lathe blades, light bulb bases, magnets, metal audio-visual components, metal brackets, metal shards, metal surgical supplies, mirror shreds, nails, needles, nuts, pins, pipe fittings, pushpins, razor blades, reamers, retaining rings, rivets, rocks, rods, router bits, saw blades, screws, sockets, springs, sprockets, staples, studs, syringes, USB connectors, washers, wire, wire connectors, and zippers. Thus when MSW and/or RDF are transferred to the first reactor (100), inert feedstock contaminants contained therein, are also unavoidably transferred to the first reactor (100) as well.

The inert feedstock contaminant portion of the MSW carbonaceous material (102) of FIG. 19 is that which cannot be converted into a product gas (122) and as a result, accumulates within the interior (101) of the first reactor (100). It is therefore desirable to be able to remove Geldart Group D inert feedstock contaminant solids which may accumulate within the first reactor (100). Thus it is therefore desirable to be able to clean bed material by classification or via the removal of Geldart Group D inert feedstock contaminant solids therefrom to permit continuous and uninterrupted operation within the first reactor (100).

The accumulation of Geldart Group D inert feedstock contaminant solids within the first reactor (100) inhibits continuous operation of the first reactor (100) and may cause defluidization within the first reactor (100). Defluidization of the first reactor (100) may be caused by unpredictable and unavoidable buildup of larger Geldart particles, in comparison to the mean bed particle characteristic, introduced to the interior (101). For example, FIG. 19 depicts an interior (101) comprised of a fluidized bed of a mean bed particle characteristic of Geldart Group B solids which may become defluidized by buildup or accumulation of comparatively larger, coarser and/or heavier Geldart Group D solids that are introduced to the fluidized bed with the carbonaceous material (102).

A mixture transfer valve (V9, V9A, V9AA) is interposed in each mixture transfer conduit (A3A, A3AA) in between the first reactor (100) and each particulate classification vessel (A1A, A1B) to start and stop flow of the contents transferred therein, and to isolate the particulate classification vessel (A1A, A1B) from the first reactor (100).

Each particulate classification vessel (A1A, A1B) is equipped with a classifier gas input (A6A, A6AA) configured to introduce a classifier gas (A16, A16A) to each interior (IN1, INB). The classifier gas input (A6A, A6AA) may be in fluid communication with the carbon dioxide output (6-OUT2) of a downstream Secondary Gas Clean-Up System (6000) as seen in FIGS. 25 and 26. The classifier gas (A16, A16A) is preferably carbon dioxide. However, the classifier gas (A16, A16A) may be any gas as deemed appropriate, such as nitrogen, product gas, air, hydrocarbons, refinery off-gases, or the like.

A classification gas transfer valve (V10, V10A, V10AA) is configured to regulate classifier gas (A16, A16A) flow through the classifier gas input (A6A, A6AA) to the interior (INA, INB) of the particulate classification vessel (A1A, A1B). Each particulate classification vessel (A1A, A1B) is equipped with a classified recycled bed material output (A7A, A7AA) in fluid communication with the interior (101) of the first reactor (100) via a classified recycled bed material input (A27, A27A) and a classifier riser (A17, A17A).

The classified recycled bed material input (A27, A27A) is preferably positioned at or above the fluid bed level (L-A) of the first reactor (100) so as to let the recycled bed material or particulate heat transfer material (105) to be recycled back to the interior (101) of the first reactor (100) in an unimpeded manner.

A bed material riser recycle transfer valve (V11, V11A, V11AA) is interposed in each classifier riser (A17, A17A) in between the first reactor (100) and each particulate classification vessel (A1A, A1B) to start and stop flow of the contents transferred therein, and to isolate the particulate classification vessel (A1A, A1B) from the first reactor (100).

Each particulate classification vessel (A1A, A1B) is equipped with a classifier inert feedstock contaminant output (A9A, A9AA) configured to remove classified inert feedstock contaminants (A19, A19A) from the interior (INA, INB).

An inert feedstock contaminant drain valve (V13, V13A, V13AA) is configured to start and stop flow of classified inert feedstock contaminants (A19, A19A) transferring through the classifier inert feedstock contaminant output (A9A, A9AA).

Each particulate classification vessel (A1A, A1B) may also be equipped with a classifier depressurization gas output (A8A, A8AA) configured to evacuate classifier depressurization gas (A18, A18A) from the interior (INA, INB) thus reducing the pressure contained therein.

A depressurization vent valve (V12, V12A, V12AA) is configured to start and stop flow of classifier depressurization gas (A18, A18A) transferred through the classifier depressurization gas output (A8A, A8AA).

The classified recycled bed material output (A7A, A7AA) is configured to output a classified recycled bed material (A37, A37A) to the interior (101) of the first reactor (100). In embodiments, the classifier riser (A17, A17A) conveys the classified recycled bed material (A37, A37A) to the interior (101) of the first reactor (100) in a suspension of gas (A16, A16A) and conveyed in a dilute-phase flow regime.

A carbonaceous material input (3A-IN1) is introduced to the as first reactor carbonaceous material input (104) and is configured to provide a carbonaceous material (102) to the feed zone (AZ-B) of the first reactor (100). A carbonaceous material (102) is introduced to the interior (101) of the first reactor (100) for intimate contact with the heated particulate heat transfer material (105), reactants (106, 106A, 106B, 106C) and oxygen-containing gas (118, 118a, 118B, 118C) contained within the interior (101) to produce a first reactor product gas (122) that is discharged from the interior (101) of the first reactor (100) via a first reactor product gas output (124).

FIG. 19 is to be used in conjunction with FIG. 20 which depicts a valve sequencing diagram that describes the method of operating the sequence of the product gas generation and particulate classification system (1002) embodiment shown in FIG. 19.

FIG. 19 shows one embodiment of the product gas generation and particulate classification system (1002) equipped with a variety of sensors, valves, assets and controllers which are all configured to methodically and systematically manipulate the operation of the particulate classification vessel (A1A, A1B) to accept a variety of inputs and discharge a variety of outputs to and from the first reactor (100).

The particulate classification vessel (A1A, A1B) is configured to accept the bed material and inert feedstock contaminant mixture (A4A, A4AA) transferred from the interior (101) of the first reactor (100). In embodiments, the bed material and inert feedstock contaminant mixture (A4A, A4AA) are conveyed in a dense phase flow regime through the mixture transfer conduit (A3A, A3AA) into the classifier interior (INA,INB). The bed material and inert feedstock contaminant mixture (A4A, A4AA) is comprised of a bed material portion and an inert feedstock contaminant portion.

The bed material and inert feedstock contaminant mixture (A4A, A4AA) is transferred to the classifier interior (INA, INB) via a mixture transfer conduit (A3A, A3AA) and flow is regulated through modulation or actuation of an associated mixture transfer valve (V9A, V9AA).

The embodiments shown in FIG. 7 and FIG. 19 show the first reactor (100) having particulate heat transfer material (105) with a mean bed particle characteristic including Geldart Group B solids. Therefore the bed material portion of the mixture (A4A, A4AA) is comprised of Geldart Group B solids and the inert feedstock contaminant portion is comprised of Geldart Group D solids. The embodiment of FIG. 19 shows the classification vessel (A1A, A1B) configured to accept a classifier gas (A16, A16A), such as carbon dioxide, the supply of which is regulated through modulation or actuation of a classification gas transfer valve (V10A, V10AA).

In response to accepting the gas (A16, A16A), the classification vessel (A1A, A1B) is configured to output: (1) a bed material portion to be returned to the first reactor (100); and, (2) an inert feedstock contaminant portion to be discharged from the classifier vessel (A1A, A1B). As a result, the bed material and inert feedstock contaminant mixture (A4A, A4AA) is cleaned to separate the bed material portion (Geldart Group B solids) from the inert feedstock contaminant portion (Geldart Group D solids). The cleaned and separated bed material portion (Geldart Group B solids) is then available to be used again in the first reactor (100) in a thermochemical process to generate a product gas.

The system in FIG. 19 displays a first reactor (100) configured to accept a carbonaceous material (102), such as MSW containing inert feedstock contaminants. The system in FIG. 19 also displays a first reactor (100) configured to accept a first reactor reactant input (3A-IN2) or the second reactor heat transfer medium output (3B-OUT2), such as steam, from the third reactor heat exchanger (HX-C) (not shown). The system in FIG. 19 also displays a first reactor (100) configured to accept an oxygen-containing gas (118) through an input (3A-IN3).

FIG. 25 and FIG. 26 display a Refinery Superstructure System (RSS) equipped with a Secondary Gas Clean-Up System (6000) configured to remove carbon dioxide from product gas. The Secondary Gas Clean-Up System (6000) has a carbon dioxide laden product gas input (6-IN1) and a carbon dioxide depleted product gas output (6-OUT1). Membrane based carbon dioxide removal systems and processes are preferred to remove carbon dioxide from product gas, however other alternate systems and methods may be utilized to remove carbon dioxide, not limited to adsorption or absorption based carbon dioxide removal systems and processes.

FIG. 25 and FIG. 26 display the Secondary Gas Clean-Up System (6000) discharging a carbon dioxide output (6-OUT2) to both the (1) First Stage Product Gas Generation System (3A), for use as a classifier gas (A16, A16A), and to the (2) the Feedstock Delivery System (2000) to be combined with a carbonaceous material (500). Thus FIG. 19 displays the product gas generation and particulate classification system (1002) in the context of a Refinery Superstructure System (RSS) as depicted in FIG. 25 and FIG. 26 and displays the introduction of the combined carbonaceous material and carbon dioxide into a first reactor via a carbonaceous material input (3A-IN1).

Thus FIG. 19 depicts the system (1002) configured to react the MSW carbonaceous material with steam, carbon dioxide, and an oxygen-containing gas in a thermochemical process to generate a first reactor product gas containing char. For example, in embodiments, the first reactor (100) in FIG. 19 operates under a combination of steam reforming, water-gas shift, dry reforming, and partial oxidation thermochemical processes. FIG. 19 also shows combustion taking place within the first reactor first heat exchangers (HX-A1, HX-A2, HX-A3, HX-A4) to indirectly heat the first reactor particulate heat transfer material (105) contained within the first reactor (100). The first reactor particulate heat transfer material (105) essentially is a bed material and inert feedstock contaminant mixture due to the introduction of MSW introduced to the reactor that contains inert feedstock contaminants that build up within the interior (101) of the first reactor (100).

The product gas shown generated in FIG. 19 contains carbon dioxide, which is then later separated out in the Secondary Gas Clean-Up System (6000) to allow the carbon dioxide to be recycled back to the (1) Feedstock Delivery System (2000) to be combined with a carbonaceous material for transfer to the first reactor (100), and the (2) First Stage Product Gas Generation System (3A) for use as a classifier gas (A16, A16A) to clean the bed material. Thus the first particulate heat transfer material may be cleaned with a gas, or a portion of the product gas generated in the first reactor (100), such as for example, the carbon dioxide portion of the product gas generated in the first reactor that is recycled from a downstream Secondary Gas Clean-Up System (6000).

The embodiment of FIG. 19 shows the bed material portion comprised of Geldart Group A or B solids free of inert contaminants, transferred and regulated through actuation or modulation of a bed material riser recycle transfer valve (V11A, V11AA) that is positioned on a classifier riser (A17, A17A).

The embodiment of FIG. 19 also shows the classification vessel (A1A, A1B) configured to transfer Geldart Group D solids free of Geldart Group A or B solids as an inert feedstock contaminant portion from the classifier vessel (A1A, A1B) for removal from the via an inert feedstock contaminant drain valve (V13A, V13AA) positioned on the classifier inert feedstock contaminant output (A9A, A9AA)

FIG. 19 also shows a mass sensor (WT-1) positioned on the particulate classification vessel (A1B) to measure the mass of the bed material and inert feedstock contaminant mixture (A4AA) entering the particulate classification vessel (A1B). The mass sensor (WT-1) is also configured to measure the mass lost from the particulate classification vessel (A1B) due to the classified recycled bed material (A37A) transported to the first reactor (100) via the classifier riser (A17A) using the classifier gas (A16A) as the transport motive.

A depressurization vent valve (V12A, V12AA) may optionally be utilized to evacuate residual pressured gas from the contents of the classification vessel (A1A, A1B) to prevent erosion and solids abrasion of solids passing through the inert feedstock contaminant drain valve (V13A, V13AA).

In embodiments, FIG. 19 depicts a municipal solid waste (MSW) energy recovery system for converting MSW containing inert feedstock contaminants, into a product gas (122), the system comprising: (a) a first reactor (100) comprising: a first reactor interior (101) suitable for accommodating a bed material and endothermically reacting MSW in the presence of steam to produce product gas; a first reactor carbonaceous material input (104) for introducing MSW into the first reactor interior (101); a first reactor reactant input (108A, 108B, 108C) for introducing steam into the first interior (101); a first reactor product gas output (124) through which product gas is removed; a classified recycled bed material input (A27, A27A) in fluid communication with an upper portion of the first reactor interior (101); a particulate output (A2A, A2AA) connected to a lower portion of the first reactor interior, and through which a mixture (A4A, A4AA) of bed material and unreacted inert feedstock contaminants selectively exits the first reactor interior; and (b) a plurality of particulate classification vessels (A1A, A1B) in fluid communication with the first reactor interior (101), each vessel comprising: (i) a mixture input (A5A, A5AA) connected to the particulate output (A2A, A2AA), for receiving said mixture from the first reactor interior (101); (ii) a classifier gas input (A6A, A6AA) connected to a source of classifier gas (A16, A16A), for receiving classifier gas to promote separation of said bed material from said unreacted inert feedstock contaminants within said vessel; (iii) a bed material output (A7A, A7AA) connected to the classified recycled bed material input (A27, A27A) of the first reactor interior (101) via a classifier riser conduit (A17, A17A), for returning bed material separated from said mixture to the first reactor interior; and (iv) a contaminant output (A9A, A9AA) for removing unreacted inert feedstock contaminants (A19, A19A) which have been separated from said mixture, within the vessel.

In embodiments, FIG. 19 discloses a mixture transfer valve (V9A, V9AA) positioned between the particulate output (A2A, A2AA) and the mixture input (A5A, A5AA), to selectively control transfer of said mixture from the first reactor to the vessel; a classification gas transfer valve (V10A, V10AA) positioned between the source of classifier gas (A16, A16A) and the classifier gas input (A6A, A6AA), to selectively provide said classifier gas to the vessel; a bed material riser recycle transfer valve (V11A, V11 AA) positioned between the bed material output (A7A, A7AA) and the classified recycled bed material input (A27, A27A), to selectively return bed material separated from said mixture, to the first reactor interior; and an inert feedstock contaminant drain valve (V13A, V13AA) configured to selectively remove unreacted inert feedstock contaminants (A19, A19A) which have been separated from said mixture. In embodiments, each vessel further comprises a classifier depressurization gas output (A8A, A8AA) and a depressurization vent valve (V12A, V12AA) connected to the classifier depressurization gas output (A8A, A8AA) to selectively vent the vessel.

In embodiments, FIG. 19 depicts a master controller configured to operate the system in any one of a plurality of states disclosed in FIG. 20, including: a first state in which all of said valves are closed; a second state in which the mixture transfer valve (V9A, V9AA) is open and the remainder of said valves are closed, to allow said mixture to enter the vessel; a third state in which the classification gas transfer valve (V10A, V10AA) and the bed material riser recycle transfer valve (V11A, V11AA) are open and the remainder of said valves are closed, to promote separation of said bed material from said mixture and recycling of separated bed material back into the first reactor; a fourth state in which the depressurization vent valve (V12A, V12AA) is open and the remainder of said valves are closed, to allow the vessel to vent; and a fifth state in which the inert feedstock contaminant drain valve (V13A, V13AA) is open and the remainder of said valves are closed, to remove unreacted inert feedstock contaminants from the vessel. In embodiments, the classifier gas may be carbon dioxide. In embodiments, the product gas (122) generated comprises carbon dioxide and a first portion of the carbon dioxide in the product gas (122) may be introduced into the vessel as the classifier gas.

In embodiments, FIG. 19 further discloses that the inert feedstock contaminants comprise a plurality of different Geldart Group D solids having a size greater than 1000 microns; and the Geldart Group D solids may comprise whole units and/or fragments of one or more of the group consisting of allen wrenches, ball bearings, batteries, bolts, bottle caps, broaches, bushings, buttons, cable, cement, chains, clips, coins, computer hard drive shreds, door hinges, door knobs, drill bits, drill bushings, drywall anchors, electrical components, electrical plugs, eye bolts, fabric snaps, fasteners, fish hooks, flash drives, fuses, gears, glass, gravel, grommets, hose clamps, hose fittings, jewelry, key chains, key stock, lathe blades, light bulb bases, magnets, metal audio-visual components, metal brackets, metal shards, metal surgical supplies, mirror shreds, nails, needles, nuts, pins, pipe fittings, pushpins, razor blades, reamers, retaining rings, rivets, rocks, rods, router bits, saw blades, screws, sockets, springs, sprockets, staples, studs, syringes, USB connectors, washers, wire, wire connectors, and zippers.

In embodiments, the bed material separated from the mixture and returned to the first reactor interior may comprise Geldart Group A solids ranging in size from about 30 microns to about 99.99 microns. These Geldart Group A solids may comprise one or more of the group consisting of inert material, catalyst, sorbent, engineered particles and combinations thereof. The engineered particles comprise one or more of the group consisting of alumina, zirconia, sand, olivine sand, limestone, dolomite, catalytic materials, microballoons, microspheres, and combinations thereof.

In embodiments, the bed material separated from said mixture and returned to the first reactor interior may comprise Geldart Group B solids ranging in size from about 100 to about 999.99 microns. There Geldart Group B solids may be from one or more of group consisting of inert material, catalyst, sorbent, and engineered particles. These engineered particles may comprise one or more of the group consisting of alumina, zirconia, sand, olivine sand, limestone, dolomite, catalytic materials, microballoons, micro spheres, and combinations thereof.

In embodiments, the first reactor is operated at a temperature between 320° C. and about 900° C. to endothermically react the MSW in the presence of steam to produce product gas. In embodiments, the first reactor operates at any combination or permutation of thermochemical processes or reactions identified above.

FIG. 20:

FIG. 20 depicts the Classification Valve States for Automated Controller Operation of a typical particulate classification procedure. FIG. 20 is to be used in conjunction with FIG. 19 and depicts a listing of valve states that may be used in a variety of methods to operate valves associated with the particulate classification vessels (A1A, A1B). FIG. 20 identifies five separate discrete valve states of which any number of states can be selected to result in a sequence of steps for the classification of bed material and recovery of inert feedstock contaminants to prevent defluidization within the first reactor (100).

In embodiments, methods may be implemented for operating the product gas generation and classification system depicted in FIG. 19 by using the discrete states listed in FIG. 20 to realize a sequence of steps. FIG. 19 depicts a master controller, such as a control computer (COMP) that is configured to communicate and cooperate with controllers and valves associated with the particulate classification vessels (A1A, A1B). The master control computer (COMP) may be configured to operate the system using any combinations and permutations of states listed in FIG. 20 or FIG. 22.

It is contemplated that in some embodiments, sequence steps of a classification method may be chosen from any number of states listed in FIG. 20. In embodiments, sequence steps of a classification method may be chosen from a combination of state 1, state 2, state 3, state 4, and/or state 5, and may incorporate methods or techniques described herein and to be implemented as program instructions and data capable of being stored or conveyed via a master controller. In embodiments, the classification sequence may have only five steps which entail each of those listed in FIG. 20, wherein: step 1 is state 1; step 2 is state 2; step 3 is state 3; step 4 is state 4; and, step 5 is state 5. This may be typical if a carbonaceous material comprising MSW is fed into the first reactor that has a relatively greater than average amount of inert feedstock contaminants, where states 1 through 3 are not repeated because a sufficient quantity of inert feedstock contaminants is sufficiently present within the classifier prior to proceeding with state 4 and state 5 to vent and drain the classifier, respectively.

In embodiments, state 1, state 2, and state 3 may be repeated at least once prior to implementing state 4 and state 5. For example, the classification sequence may have eight steps, wherein states 1 through 3 are repeated once prior to proceeding with state 4 and state 5, wherein: step 1 is state 1; step 2 is state 2; step 3 is state 3; step 4 is state 1; and step 5 is state 2; step 6 is state 3; step 7 is state 4; and, step 8 is state 5. Thus, a classification sequence may entail a multitude of different combinations and permutations of sequence steps given the operator or user defined states to be repeated. For example, from a practical perspective, if a carbonaceous material comprising MSW is fed into the first reactor that has a relatively minimal amount of inert feedstock contaminants, states 1 through 3 may be repeated at least once, or several times, to ensure that a sufficient quantity of inert feedstock contaminants is present within the classifier vessel prior to proceeding with states 4 and state 5 to vent and drain the classifier, respectively.

Nonetheless, any combination or permutation of classifier method states and steps may be selected by a user or operator to realize the goal of cleaning the first particulate heat transfer material with a gas, such as carbon dioxide recycled from a downstream Secondary Gas Clean-Up System (6000), in a systematic, logical, and directed manner. The objective of the classifier (A1A) is to achieve 99% separation of the med material portion from the inert feedstock contaminant portion in the classification state 3.

Disclosed methods or techniques may include the execution and implementation of states associated with the Automated Controller Operated Classification Valve Sequence Matrix as depicted in FIG. 20. Embodiments of the sequencing methods including steps and states may be implemented by program instructions entered into the master control computer (COMP) by a user or operator via an input/output interface (I/O) as disclosed in FIG. 19. Program and sequencing instructions may be executed to perform a particular computational functions such as automated operation of the valves associated with the product gas generation and classification system as depicted in FIG. 19.

FIG. 19 depicts one exemplary embodiment of a master control computer (COMP) including a processor (PROC) coupled to a system memory (MEM) via an input/output interface (I/O). The processor (PROC) may be any suitable processor capable of executing instructions. System memory (MEM) may be configured to store instructions and data accessible by processor (PROC). In various embodiments, system memory (MEM) may be implemented using any suitable memory technology. In the illustrated embodiment, program instructions and data implementing desired functions, are shown stored within system memory (MEM) as code (CODE). In embodiments, the I/O interface (I/O) may be configured to coordinate I/O traffic between processor (PROC), and system memory (MEM). In some embodiments, the I/O interface (I/O) is configured for a user or operator to input necessary sequencing protocol into the master control computer (COMP) for process execution, including sequence timing, repetition of a given number of states to realize a desired sequence of steps and/or states. In embodiments, the mass sensor signal (XWT1) positioned on the classifier vessel may be an input value to be entered into the master control computer (COMP) by the I/O interface (I/O).

Thus, the system is fully flexible to be tuned, configured, an optimized to provide an environment for scheduling the appropriate process parameters by programmatically controlling the opening and closing of valves at specific time intervals. In embodiments, a user or operator may define cycle times, step numbers, and states which may be programmed into the master control computer (COMP) by an operator accessible input/output interface (I/O). In embodiments, the signal from the mass sensor signal (XWT1) may be incorporated into the sequencing protocol to determine when the classification vessel is full or empty. In embodiments, the signal from the mass sensor signal (XWT1) is used to determine when to switch from classification state 3 to vent state 4 to avoid clogging of the classification vessel, or to prevent process upsets, and to facilitate process optimization.

The following describes various further embodiments of the systems and methods discussed above, and presents exemplary techniques and uses illustrating variations. Thus, the master control computer (COMP) may implement automation of the following controllers and their respective valves: mixture transfer valve controller (C9A,C9AA); classification gas transfer valve controller (C10A,C10AA); bed material riser recycle transfer valve controller (C11A, C11AA); depressurization vent valve controller (C12A, C12AA); and, inert feedstock contaminant drain valve controller (C13A,C13AA).

Controllers are shown only on the first of two shown particulate classification vessels (A1A) for simplicity in FIG. 19. However, it is to be noted that the each valve depicted in FIG. 19 has an associated controller that acts in communication with the master control computer (COMP). FIG. 21:

FIG. 21 elaborates upon the non-limiting embodiment of FIG. 7 and FIG. 19 including another embodiment of a particulate classification vessel (A1A) including gas distributor valve (V91) that separates the classifier interior (INA) into a classifier zone (INA1) and a gas distribution zone (INA2) and where the classifier (A1A) is configured to accept a bed material, inert feedstock contaminant mixture (A4A), and a classifier gas (A16) and to clean and recycle the bed material portion back to the first interior (101) of the first reactor (100) while removing the inert feedstock contaminant portion from the system as a solids output (3A-OUT3). Although only one particulate classification vessel (A1A) is shown in FIG. 21 for simplicity, it is to be understood that two particulate classification vessels (A1A, A1B) will almost certainly always be used. Therefore, FIG.

19 can be used to illustrate the embodiment where two particulate classification vessels (A1A, A1B) are integrated with the operation of one first reactor (100).

FIG. 21 differs from FIG. 7 and FIG. 19 in that the first reactor oxygen-containing gas (118) and reactant (106) enter the first reactor (100) through separate inputs (120 and 108, respectively) and are then mixed prior to being distributed to the dense bed zone (AZ-A) through a distributor (145) located in the lower region of the interior (101). The distributor may be any suitable type to substantially, evenly distribute the mixture of oxygen-containing gas (108) and steam reactant (106) throughout the cross-sectional area of the interior (101) and dense bed zone (AZ-A). The distributor (145) may be a ring distributor, pipe distributor, bubble-cap plate distributor, slit-nozzle distributor, tent-grid plate distributor, perforated plate distributor, ring sparger, tree sparger, orthogonal sparger, or any other type of distributor known in the art.

The classifier (A1A) has an interior (INA) and a gas distributor valve (V91) separates the interior (INA) into a classifier zone (INA1) and a gas distribution zone (INA2). The classifier zone (INA1) is above the gas distribution zone (INA2) and the gas distribution zone (INA2) is below the classifier zone. The classifier gas (A16) introduced to the classifier (A1A) via the classifier gas input (A6A) is introduced into the classifier zone (INA1), below the gas distributor valve (V91), to permit substantially completely even distribution of the gas (A16) through the perforations of the gas distributor valve (V91). Thus, the even distribution of gas (A16) through the perforations of the closed gas distributor valve (V91) permits the gas (A16) to elutriate the bed material portion from the classifier leaving the inert feedstock contaminant portion resting upon the perforated surface of the closed gas distributor valve (V91).

The gas distributor valve (V91) has a perforated cross sectional area that is in contact with the interior (INA) of the classifier (A1A). The gas distributor valve (V91) may be any conceivable type of valve suitable for use in the application. We have found that a sliding gate valve with a perforated gate or blade is most suitable because it slidably completely retracts and permits the classified inert feedstock contaminants (A19) to be freely transferred from the classifier zone (INA1) through the gas distribution zone (INA2) and drained via the classifier inert feedstock contaminant output (A9A). However, a butterfly valve with a perforated butterfly disc may also be used as well, but is not preferred since the stem along which the axis of perforated valve disc rotates impedes draining since it occupies a portion of the cross sectional area of the classifier interior (INA).

Preferably, the gas distributor valve (V91) has holes, perforations, or pores are on the order of about 10 to 100 microns so as to permit the valve to be in the closed position and still allow (a) classifier gas (A16) to pass up through the valve (V91), and (b) inert feedstock contaminants and bed material to not pass down through the valve. Thus, when the gas distributor valve (V91) is in the closed position, the bed material and inert feedstock contaminant mixture (A4A) may rest upon the closed gas distributor valve (V91). When the classification procedure as described in FIG. 22 is implemented, the classifier gas (A16) is introduced to the gas distribution zone (INA2) of the classifier (A1A). During classification, the gas (A16) flows up through the pores of the closed gas distributor valve (V91) and elutriates the bed material portion for transfer to the first reactor (100) via a riser (A17) leaving the inert feedstock contaminant portion resting upon the perforated surface of the closed gas distributor valve (V91). Thus, in the configuration of FIG. 21, the positioning of the perforated gas distributor valve (V91) permits inerts to be transferred from the classifier zone (INA1) to the gas distribution zone (INA2) without opening the inert feedstock contaminant drain valve (V13) to evacuate the inerts from the classifier (A1A).

FIG. 21 also depicts the classified recycled bed material output (A7A) positioned on the cylindrical outer section of the classifier (A1A). FIG. 21 also depicts the classifier depressurization gas output (A8A) positioned on the upper portion of the classifier zone (INA1), however the gas output (A8A) may also be positioned on the gas distribution zone (INA2).

The master control computer (COMP) may implement automation of the following controllers and their respective valves: mixture transfer valve controller (C9A); classification gas transfer valve controller (C10A); bed material riser recycle transfer valve controller (C11A); depressurization vent valve controller (C12A); inert feedstock contaminant drain valve controller (C13A); and, the gas distributor valve controller (C91).

A large objects drain valve (V92) is positioned in between the bed material and inert feedstock contaminant mixture output (A2A) of the first reactor (100) and the bed material and inert feedstock contaminant mixture input (A5A) of the classifier (A1A). The large objects drain valve (V92) prevents large objects, such as agglomerates or broken or dislodged refractory materials to be removed prior to being sent to the classifier (A1A).

FIG. 21A:

Details of the gas distributor valve (V91) as referred to in FIG. 21 are shown in FIGS. 21A & 21B. FIGS. 21A & 21B depict the gas distributor valve (V91) as a type of slide-gate valve or through-port valve which comprises a well-guided blade (502) passing through both ends of the valve body (504). The gas distributor valve (V91) is opened and closed by use of an actuator (506) with an integrated controller (C91). The actuator (506) is connected to the blade (502) via a first clevis (508A) and a first rod (510A) and a second clevis (508B) and a second rod (510B). Packing (512A, 512B) is used as a seal between the blade (502) and valve body (504) on both ends of the valve body (504). The blade (502) has of porous perforations (514) at one end and a hole (516) at an opposite end of the blade (502).

FIG. 21A shows a top-down view of the classifier gas distributor valve (V91) in the closed position. When the gas distributor valve (V91) is in the closed position, bed material and inert feedstock contaminants may rest upon the perforations (514) in surface of the valve blade (502) without falling through. Also when the gas distributor valve (V91) is in the closed position, a classifier gas may pass up through the perforations (514) in the valve blade (502). As gas passes through the perforations (514) in the blade (502), the gas entrains bed material resting upon the perforations (514) in the blade (502) leaving the inert contaminants behind resting upon the perforations (514) in the blade (502).

FIG. 21B:

FIG. 21B shows a top-down view of the classifier gas distributor valve (V91) in the open position. In the open position, classified inert feedstock contaminants pass through the hole (516) in the blade (502) and are subsequently removed from the classifier. They are subsequently removed from the classifier via the inert feedstock contaminant drain valve (V13A) seen in FIG. 21. It is understood that a slide-gate valve having some other design may be used instead. For instance, the slide gate valve (V91) may comprise a fixed hole (516), and a slidable blade having a perforated portion which can selectively be positioned over the hole. When transitioning from the closed position to the open position, the classified inert feedstock contaminants remaining on the perforations are kept in place until they drop through the hole (516) for subsequent removal.

FIG. 22:

FIG. 22 depicts the Classification Valve States as described in FIG. 20 further including the operation of a gas distributor valve (V91). FIG. 22 is to be used in conjunction with FIG. 21 and depicts a listing of valve states that may be used in a variety of methods to operate valves associated with one embodiment of a particulate classification vessel (A1A). The only difference between FIG. 20 and FIG. 22 is that the gas distributor valve (V91) is open during the drain sequence of State 5. It is preferred to keep the gas distributor valve (V91) closed during all other states. It is preferred to keep the gas distributor valve (V91) closed during the vent sequence of state 4 to prevent erosion of the valve caused by opening the valve while the classifier interior (INA), classifier zone (INA1), or gas distribution zone (INA2) are above atmospheric pressure. However, it may in some instances be permissible to depart slightly from the sequencing state diagram of FIG. 22 and allow the gas distributor valve (V91) to be open during the vent sequence of state 4.

FIG. 23:

FIG. 23 shows a detailed view of one non-limiting embodiment of a Third Stage Product Gas Generation Control Volume (CV-3C) and Third Stage Product Gas Generation System (3C) of a three-stage energy-integrated product gas generation system (1001) in accordance with FIG. 3 also showing a third reactor (300) equipped with a third interior (301), and also showing a combustion zone (CZ-A), reaction zone (CZ-B), cooling zone (CZ-C), quench zone (CZ-E), steam drum (350), and valves, sensors, and controllers. FIG. 23 displays a Third Stage Product Gas Generation System (3C) contained within a Third Stage Product Gas Generation Control Volume (CV-3C) and configured to accept product gas output (3B-OUT1) from a Second Stage Product Gas Generation System (3B). The third reactor (300) within the Third Stage Product Gas Generation System (3C) is shown to accept the product gas output (3B-OUT1) as a combined product gas input (3C-IN1).

In some embodiments, as shown in FIG. 23, the third reactor (300) may be a cylindrical, down-flow, non-catalytic, refractory-lined, steel pressure vessel. In embodiments, the third reactor (300) may be rectangular. Within the interior (301) of the third reactor (300) are several distinct zones that are disposed one after the other in the axial direction of the interior (301). Four zones exist within the interior (301) of the third reactor (300): (1) combustion zone (CZ-A), (2) reaction zone (CZ-B), (3) cooling zone (CZ-C), (4) quench zone (CZ-D).

Combustion Zone

The combustion zone (CZ-A) combusts a first hydrocarbon stream (322) with a third reactor oxygen-containing gas (318) to generate a combustion zone output (CZ-AP) or combustion stream. In embodiments, the oxygen-containing gas (318) is introduced to the combustion zone (CZ-A) in superstoichiometric amounts in proportion and relative to the first hydrocarbon stream (322) so as to substantially, completely combust the first hydrocarbon stream (322) to generate CO2 and heat along with an unreacted amount of oxygen-containing gas (318). In embodiments, a superstoichiometric amount of oxygen is provided to the combustion zone (CZ-A) so that when all of the hydrocarbon stream (322) is burned, there is still excess oxygen-containing gas (318) left over.

The combustion zone (CZ-A) accepts a third reactor oxygen-containing gas (318) through a third reactor oxygen-containing gas input (320) or an oxygen-containing gas input (3C-IN3). The combustion zone (CZ-A) also accepts a first hydrocarbon stream (322) through a first hydrocarbon stream input (324) or a first hydrocarbon input (3C-IN4). In embodiments, the first hydrocarbon input (3C-IN4) to the Third Stage Product Gas Generation System (3C) may be a first synthesis hydrocarbon output (7-OUT2) such as Fischer Tropsch tail gas transferred from a downstream Synthesis System (7000). In other embodiments, the first hydrocarbon stream (322) may be natural gas, or naphtha, or off-gas from a downstream Upgrading System (8000). The first hydrocarbon stream (322), in some instances, may be product gas, or even landfill gas including a complex mix of different gases created by the action of microorganisms within a landfill.

A first hydrocarbon valve (VC1) may be configured to regulate the flow of the first hydrocarbon stream (322) to the first hydrocarbon stream input (324). The first hydrocarbon valve (VC1) has a controller (CC1) configured to input or output a signal (XC1). A third reactor oxygen-containing gas valve (VC2) may be configured to regulate the flow of the third reactor oxygen-containing gas (318) through the third reactor oxygen-containing gas input (320). The third reactor oxygen-containing gas valve (VC2) has a controller (CC2) configured to input or output a signal (XC2).

A second hydrocarbon valve (VC3) may be configured to regulate the flow of the second hydrocarbon stream (326) to the second hydrocarbon stream input (328). The second hydrocarbon valve (VC3) has a controller (CC3) configured to input or output a signal (XC3). A third hydrocarbon valve (VC4) may be configured to regulate the flow of the third hydrocarbon stream (330) to the third hydrocarbon stream input (332). The third hydrocarbon valve (VC4) has a controller (CC4) configured to input or output a signal (XC4). A third reactor heat transfer medium valve (VC5) may be configured to regulate the flow of the third reactor heat transfer medium (310) to the steam drum (350). The third reactor heat transfer medium valve (VC5) has a controller (CC5) configured to input or output a signal (XC5).

An oxygen-containing gas (318) is provided to the third reactor (300) so that the hydrocarbon (322) is reacted at an elevated reaction temperature sufficient to convert the hydrocarbon (322) substantially completely into carbon dioxide. Therefore a combustion zone output (CZ-AP) includes carbon dioxide, heat, and left over oxygen-containing gas (318), and is discharged from the combustion zone (CZ-A) to the reaction zone (CZ-B) of the third reactor (300). A sufficient oxygen-containing gas (318) is provided to the third reactor (300) so that excess oxygen-containing gas (318) remains unreacted and exits the burner (346) and thus is also present in the combustion stream discharged from the combustion zone (CZ-A).

In embodiments, an annulus type burner may be employed to react the first hydrocarbon stream (322) with the third reactor oxygen-containing gas (318) through the thermochemical process of combustion. In embodiments, the burner (346) is a multi-orifice, co-annular, burner provided with an arrangement of several passages coaxial with the longitudinal axis of the burner. Multi-orifice burners comprising arrangements of annular concentric channels for reacting an oxygen-containing gas (318) with a stream of hydrocarbons (322) may, in some instances, have a reduced area to permit a high velocity stream to take place and result in very rapid and complete reaction of the combustion stream (CZ-A) with the product gas (302) introduced to the third reactor (300) to form a reaction stream. The design of the burner (346) is not particularly relevant. Various types of burners may be used. Preferably, a burner is selected that is configured to react a combustible hydrocarbon stream (322) with a stream of oxygen-containing gas (318). The burner may be equipped with an ignitor.

In embodiments, the burner (346) is that of an annulus type. In embodiments, the burner (346) may be of the type configured to accept a hydrocarbon stream (322) and oxygen-containing gas stream (318) through concentric ports, wherein the oxygen-containing gas (318) is injected into an annular port, and the hydrocarbon stream (322) is injected to the central port. The burner (346) ensures rapid and intimate mixing and combustion of the hydrocarbon (322) with the oxygen-containing gas (318). The hydrocarbon stream (322) and oxygen-containing gas (318) are introduced under pressure and combustion of the hydrocarbon (322) is completed in the burner (346) and terminates at the burner nozzle (347). In embodiments, the burner is constructed such that the reaction between the hydrocarbon (322) and the oxygen-containing gas (318) takes place entirely outside the burner (346) and only at the burner nozzle (347) so as to provide protection of the burner (346) from overheating and from direct oxidation. In embodiments, the burner (346) or the burner nozzle (347) is equipped with a cooling water circuit (not shown).

In embodiments, the burner nozzle (347) may be defined by a restriction constituting a reduction in area to provide an increase in velocity of the combustion stream (CZ-AP) exiting the burner nozzle (347). The restriction may even be in some instances a baffle or an impingement plate on which the flame of the combustion stream is stabilized. The burner nozzle (347) may have a restricting or constricting throat zone, or orifice to accelerate velocity of the combustion stream (CZ-AP) in the transition from the combustion zone (CZ-A) to the reaction zone (CZ-B). A restriction, orifice, baffle, or impingement surface is advantageous to shield the combustion zone (CZ-A) from pressure fluctuations of the reaction zone (CZ-B) to mediate operational difficulties such as burner oscillation, flash-back, detonation, and blow-out.

In some embodiments, combustion stream (CZ-AP) exiting the burner nozzle (347) may be transferred at velocities within the range of 200 feet per minute (ft/m) to the speed of sound under the existing conditions. But advantageously the combustion stream (CZ-AP) that is discharged from the combustion zone (CZ-A), via the burner nozzle (347), is at a velocity between 50 and 300 feet per second (ft/s) and typically less than 200 ft/s.

The product gas (302) must not be allowed to remain at high temperatures for more than a fraction of a second, or more than a few seconds, the critical reaction period limits being about 0.0001 second to about 5 seconds. Normally it is advantageous to maintain reaction time between the product gas (302) and combustion stream (CZ-AP) of 0.1 to 5.0 seconds to sufficiently completely partially oxidize SVOC, VOC, and char into additional hydrogen and carbon monoxide. Preferably the residence time of the product gas (302) and combustion stream (CZ-AP) in the reaction zone is about 3 seconds.

The combustion zone output (CZ-AP) is discharged from the combustion zone (CZ-A) to the reaction zone (CZ-B). The combustion stream is comprised of an intensely hot mixture of carbon dioxide and excess oxygen-containing gas. The heat generated between the combustion of the hydrocarbon (322) with the oxygen-containing gas (318) in turn elevates the temperature of the excess unreacted oxygen-containing gas (318) contained within the combustion zone output (CZ-AP) to a temperature up to 1,500° C. (2,732° F.). It is preferred to operate the combustion zone (CZ-A) at about 1,300° C. (2,372° F.). In embodiments, the combustion stream (CZ-AP) exiting the combustion zone (CZ-A) and entering the reaction zone (CZ-B) operates at about temperature can range from about 1,100° C. (2,0172° F.) to 1,600° C. (2,912° F.). In embodiments, a baffle or impingement plate might be installed to shield the combustion zone (CZ-A) from the reaction zone (CZ-B).

Combustion occurs in the combustion zone (CZ-A) to generate CO2, H2O, and heat. Heat generated in the combustion zone (CZ-A) elevates the temperature of the super-stoichiometric oxygen-containing gas (318) which is then transferred to the reaction zone (CZ-B) as an intensely hot combustion stream (CZ-AP).

In some embodiments, the burner (346) is a Helmholtz pulse combustion resonator. An oxygen-containing gas (318) may be introduced into the outer annular region of the burner (346) and a hydrocarbon (322) may be introduced into the central section of the burner (346). Thus, the burner (346) may serve to act as an aerodynamic valve, or diode, such that self-aspiration of the oxygen-containing gas (318) is effected in response to an oscillating pressure in the combustion zone (CZ-A). A burner (346) may operate as a pulse combustor, and typically operates in the following manner. A hydrocarbon (322) enters the combustion zone (CZ-A). An oxygen-containing gas (318) enters the combustion zone (CZ-A). An ignition or spark source (not shown) detonates the explosive mixture during start-up. A sudden increase in volume, triggered by the rapid increase in temperature and evolution of combustion stream (CZ-AP), pressurizes combustion zone (CZ-A). As the hot combustion stream (CZ-AP) expands, the burner (346) and nozzle (347) form of a fluidic diode, permit preferential flow in the direction of the reaction zone (CZ-B). The gaseous combustion stream (CZ-AP), exiting combustion zone (CZ-A), possesses significant momentum. A vacuum is created in combustion zone (CZ-A) due to the inertia of the combustion stream (CZ-A) passing through the burner nozzle (347), and permits only a small fraction of the combustion stream (CZ-AP) to return to combustion zone (CZ-A), with the balance of the combustion stream (CZ-AP) exiting through the nozzle (347). Because the combustion zone (CZ-A) pressure is then lower than the supply pressure of both the oxygen-containing gas (318) and the hydrocarbon (322), the oxygen-containing gas (318) and the hydrocarbon (322) mixtures are drawn into combustion zone (CZ-A) where auto-ignition takes place. Again, the burner (346) and nozzle (347) constrains reverse flow, and the cycle begins anew. Once the first cycle is initiated, operation is thereafter self-sustaining or self-aspirating.

A preferred pulse combustor burner (346) used herein, and as noted above, is based on a Helmholtz configuration with an aerodynamic valve. The pressure fluctuations, which are combustion-induced in the Helmholtz resonator-shaped combustion burner (346), coupled with the fluidic diodicity of the aerodynamic valve burner (346) and nozzle (347), cause a biased flow of the combustion stream (CZ-AP) from the combustion zone (CZ-A), through the nozzle (347) and into the reaction zone (CZ-B). This results in the oxygen-containing gas (318) being self-aspirated by the combustion zone (CZ-A) and for an average pressure boost to develop in the combustion zone (CZ-A) to expel the products of combustion at a high average flow velocity (typically over 300 ft/s) into and through the nozzle (347).

The production of an intense acoustic wave is an inherent characteristic of pulse combustion. Sound intensity adjacent to the wall of combustion zone (CZ-A) is normally in the range of 110-190 dB. The range may be altered depending on the desired acoustic field frequency to accommodate the specific application undertaken by the pulse combustor.

Reaction Zone

The reaction zone (CZ-B) is configured to react a product gas (302) generated in an upstream reactor (100, 200) with the hot excess oxygen-containing gas contained in the combustion stream (CZ-AP) to generate additional hydrogen and carbon monoxide. The reaction zone (CZ-B) of the third reactor (300) accepts a combined product gas (302) through a combined product gas input (304) or a combined product gas input (3C-IN1). The combined product gas (302) enters the reaction zone (CZ-B) and is introduced from the product gas output (3B-OUT1) of the Second Stage Product Gas Generation System (3B). The hot combustion stream (CZ-AP) is transferred from the combustion zone (CZ-A) to the reaction zone (CZ-B) through the burner nozzle (347) at preferably a high velocity to realize a stable flame and enhance mixing and reaction between the combustion stream (CZ-AP) and the product gas (302).

Mixing and reaction of the combustion stream (CZ-AP) with the product gas (302) entering the third reactor (300) must be thorough and nearly instantaneous. Sudden and furious mixing of at least a portion of the first reactor product gas (122), or the combined product gas (302), with the combustion stream (CZ-AP) takes place in the reaction zone (CZ-B) of the third reactor (300). As a result, a reaction zone output (CZ-BP) or a reaction stream, is discharged from the reaction zone (CZ-B) to the cooling zone (CZ-C).

The reaction zone (CZ-B) may also accept a second hydrocarbon stream (326) through a second hydrocarbon stream input (328) or a second hydrocarbon input (3C-IN5). The second hydrocarbon input (3C-IN5) to the Third Stage Product Gas Generation System (3C) may in some instances be naphtha transferred via a first hydrocarbon output (8-OUT2) from a downstream Upgrading System (8000). The reaction zone (CZ-B) may also accept a third hydrocarbon stream (330) through a third hydrocarbon stream input (332) or a third hydrocarbon input (3C-IN6). The third hydrocarbon input (3C-IN6) to the Third Stage Product Gas Generation System (3C) may in some instances be an off-gas transferred via a second hydrocarbon output (8-OUT3) from a downstream Upgrading System (8000). The second hydrocarbon stream input (328) and the third hydrocarbon stream input (332) may be fluidly in communication with the reaction zone (CZ-B) within the interior (301) of the third reactor (300) via a combined hydrocarbon connection (CZC0), combined hydrocarbon transfer line (CZC1) and a combined hydrocarbon input (CZC2).

The hot unreacted oxygen-containing gas contained within the combustion stream (CZ-AP) reacts with the product gas (302) from the first reactor (100) and second reactor (200). The hot unreacted oxygen-containing gas contained within the combustion stream (CZ-AP) optionally reacts with a second hydrocarbon stream (326) and/or the third hydrocarbon stream (330). Intense mixing and exothermic reaction occurs in the reaction zone (CZ-B) between the combustion stream (CZ-AP) and the product gas (302) and hydrocarbons (326, 330). In some instances, near instantaneous blending of the combustion stream (CZ-AP) with the product gas (302) and/or hydrocarbons (326,330) is effectuated. Thus, the reaction zone (CZ-B) also permits the mixing of the combined product gas (302) and hydrocarbons (326, 330) with the intensely hot combustion stream (CZ-AP) to take place.

The reaction zone (CZ-B) permits sufficient residence time for substantially complete reaction of the SVOC, VOC and char contained within at least a portion of the first reactor product gas (122) to take place with the unreacted hot oxygen-containing gas carried through from the combustion stream (CZ-AP). The reaction zone (CZ-B) permits sufficient residence time for substantially complete reaction of the SVOC, VOC and char contained within the combined product gas (302) to take place with the unreacted hot oxygen-containing gas carried through from the combustion stream (CZ-AP). The reaction zone (CZ-B) also permits sufficient residence time for substantially complete partial oxidation reaction of the carbon and hydrogen contained within the hydrocarbon stream (326, 330) for conversion into product gas.

In embodiments, additional hydrogen and carbon monoxide is generated from the exothermic partial oxidation reaction between the SVOC, VOC, and char contained within the product gas (302) and the hot excess oxygen-containing gas of the combustion stream (CZ-AP). In embodiments, additional hydrogen and carbon monoxide is also generated from exothermic partial oxidation reaction between hydrocarbon streams (326, 330) with the hot excess oxygen-containing gas of the combustion stream (CZ-AP). In embodiments, more hydrogen and carbon monoxide exits the reaction zone (CZ-B) than what enters the reaction zone (CZ-B). The reaction stream (CZ-BP) is transferred from the reaction zone (CZ-B) to the cooling zone (CZ-C). In embodiments, a baffle, or impingement plate, might be installed to shield the reaction zone (CZ-B) from the cooling zone (CZ-C).

Cooling Zone

The cooling zone (CZ-C) is configured to transfer heat from the reaction stream (CZ-BP) to a heat transfer medium (310) which can then in turn be used as a reactant (106, 206) in an upstream reactor (100, 200). The cooling zone (CZ-C) is configured to accept a reaction stream (CZ-BP) from the reaction zone (CZ-B) and remove heat therefrom to in turn generate a cooling zone output (CZ-CP) or cooled stream. The cooled stream (CZ-CP) leaving the cooling zone (CZ-C) has a lower, reduced temperature relative to that of the reaction stream (CZ-BP) that enters the cooling zone (CZ-C) from the reaction zone (CZ-C).

Removal of heat from the reaction stream (CZ-BP) may be accomplished by use of a third reactor heat exchanger (HX-C) in thermal contact with the interior (301) of the third reactor (300). More specifically, the third reactor heat exchanger (HX-C), in thermal contact with the cooling zone (CZ-C) of the interior (301) of the third reactor (300), indirectly transfers heat from the reaction stream (CZ-BP) to a third reactor heat transfer medium (310). The third reactor heat exchanger (HX-C) may be any type of heat transfer device known in the art, and is equipped with a heat transfer medium inlet (312) and a heat transfer medium outlet (316). FIG. 23 depicts a heat transfer medium (310) being made available and introduced to the heat transfer medium inlet (312) on the lower portion of the cooling zone (CZ-C). FIG. 23 also depicts a heat transfer medium (310) being discharged from the third reactor heat exchanger (HX-C) via an outlet (316) on the upper portion of the cooling zone (CZ-C).

A third reactor heat transfer medium (310) or a third reactor heat exchanger heat transfer medium input (3C-IN2) is made available to the Third Stage Product Gas Generation System (3C). Specifically, third reactor heat transfer medium (310) is made available to a steam drum (350) via a steam drum heat transfer medium supply inlet (352). A third reactor heat transfer medium valve (VC5), with a controller (CC5) and signal (XC5) is provided to regulate the flow of the heat transfer medium to the steam drum (350). The heat transfer medium depicted in FIG. 23 is water and liquid phase water is provided to the third reactor heat exchanger (HX-C) from the steam drum (350) at a third reactor heat transfer medium inlet temperature (T0). The steam drum (350) has third reactor steam drum pressure (P-C1). In embodiments, the steam drum (350) contains liquid and vapor phase water. A portion of the liquid phase water is transferred from the steam drum (350) via an outlet (356) and a heat transfer medium conduit (362) to the third reactor heat transfer medium inlet (312).

The steam drum heat transfer medium outlet (356) of the steam drum (350) are in fluid communication with the third reactor heat transfer medium inlet (312) via a heat transfer medium conduit (362). The steam drum heat transfer medium reactor inlet (354) of the steam drum (350) is in fluid communication with the third reactor heat transfer medium outlet (316) via a heat transfer medium conduit (364). The steam drum heat transfer medium outlet (358) of the steam drum (350) is in fluid communication with the second reactor heat exchanger (HX-B). More specifically, the steam drum heat transfer medium outlet (358) of the steam drum (350) is in fluid communication with the second reactor heat transfer medium inlet (212) via a heat transfer medium conduit (360). Thus, the third reactor heat transfer medium outlet (316) of the third reactor heat exchanger (HX-C) is in fluid communication with the second reactor heat transfer medium inlet (212) of the second reactor heat exchanger (HX-B) via a steam drum (350) and heat transfer conduits (360, 364).

FIG. 23 depicts a heat transfer medium (310) being introduced to the inlet (312) of the third reactor heat exchanger (HX-C) via a steam drum. A portion of the liquid phase heat transfer medium contained within the third reactor heat exchanger (HX-C) accepts heat from the reaction stream (CZ-BP) flowing down through cooling zone (CZ-C) within the interior (301) of the third reactor (300). At least a portion of the heat transferred from the reaction stream (CZ-BP) to the heat transfer medium (310) generates steam which is then transferred back to the steam drum (350). The vapor phase heat transfer medium (310) that exits the outlet (316) of the third reactor heat exchanger (HX-C), and transferred to the steam drum (350) is then routed to the inlet (212) of the second reactor heat exchanger via a heat transfer medium conduit (360) or a second reactor heat transfer medium input (3B-IN2) or a third reactor heat transfer medium output (3C-OUT2). Thus, a portion of the third reactor heat transfer medium (310) accepts heat from a portion of the heat generated in the third reactor (300) and is ultimately used as (i) heat transfer medium (210) in the second reactor heat exchanger, (ii) a reactant (106A, 106B, 106C) in the first reactor (100), and/or (iii) a reactant (206A, 206B, 206C) in the second reactor (200).

The Third Stage Product Gas Generation System (3C) outputs a third reactor heat transfer medium output (3C-OUT2) to the Second Stage Product Gas Generation System (3B) as a second reactor heat transfer medium input (3B-IN2). A cooling zone output (CZ-CP) or cooled stream is discharged from the cooling zone (CZ-C) and is introduced to the quench zone (CZ-D). The cooled stream (CZ-CP) leaving the cooling zone (CZ-C) is lesser in temperature than the reaction stream (CZ-BP) entering the cooling zone (CZ-C).

Quench Zone

The quench zone (CZ-D) is configured to accept a cooling zone output (CZ-CP) or cooled stream, along with a source of third reactor quench water (342), and output a quench zone output (CZ-DP) or quenched stream. A source of quench water (342) is introduced to the quench zone (CZ-D) within the interior (301) of the third reactor (300). The quench water (342) is made available to the Third Stage Product Gas Generation System (3C) via a quench water input (3C-IN7).

In embodiments, the quenched stream (CZ-DP) may be synonymous with the third reactor product gas (334) that is discharged from the third reactor (300) via a third reactor product gas output (336). The quenched third reactor product gas (334) is evacuated from the Third Stage Product Gas Generation System (3C) via third reactor product gas output (3C-OUT1) and is made available to a downstream Primary Gas Clean Up System (4000) via a product gas input (4-IN1). The quench zone (CZ-D) is also configured to output a third reactor slag (338) via a third reactor slag output (340). The slag (338) may be evacuated from the Third Stage Product Gas Generation System (3C) via a solids output (3C-OUT3).

The quench zone (CZ-D) is optional in the event of the need to maximize the heat recovery in a downstream Primary Gas Clean Up Heat Exchanger (HX-4) located in a downstream Primary Gas Clean Up Control Volume (CV-4000). In other embodiments, where the quench stream (CZ-DP) is optional and omitted, the cooled stream (CZ-CP) may be synonymous with the third reactor product gas (334) that is discharged from the third reactor (300) via a third reactor product gas output (336).

Thus, in turn, FIG. 23 depicts a system and process for the partial oxidation of SVOC and VOC contained within a product gas stream, comprising:
(a) combusting a hydrocarbon stream with oxygen to form a combustion stream comprised of CO2, H2O, and oxygen;
(b) reacting VOC and SVOC within the combustion stream to form a reaction stream;
(c) cooling the reaction stream with a heat transfer medium;
(d) superheating the heat transfer medium in a second reactor heat exchanger;
(e) introducing the superheated heat transfer medium to a first reactor as a reactant; and,
(f) introducing the superheated heat transfer medium to a second reactor as a reactant.

Further, FIG. 23 depicts a:
(a) third reactor (300) having a third interior (301) and comprising: a combustion zone (CZ-A) configured to accept both a third reactor oxygen-containing gas (318) through a third reactor oxygen-containing gas input (320) and a first hydrocarbon stream (322) through a first hydrocarbon stream input (324) and output a combustion zone output (CZ-AP) through a burner (346);
(b) a reaction zone (CZ-C) configured to accept both the product gas created by the first reactor (100) and product gas created by the second reactor (200) through a product gas input (304); and react with the combustion zone output (CZ-AP) to output a reaction zone output (CZ-BP);
(c) a cooling zone (CZ-C) configured to accept a third reactor heat transfer medium (310) through third reactor heat transfer medium inlet (312); and transfer thermal energy from the reaction zone output (CZ-BP) to the third reactor heat transfer medium (310) for output via a third reactor heat transfer medium outlet (316) while also outputting a cooling zone output (CZ-CP); and
(e) a quench zone (CZ-D) configured to accept a third reactor quench water (342) through a third reactor quench water input (344) and release third reactor product gas (334) through a third reactor product gas output (336).

wherein the combustion zone (CZ-A) is configured to combust at least a portion of the first hydrocarbon stream (322) to generate a combustion zone output (CZ-AP) comprised of a heated stream of oxygen-containing gas, CO2, and H2O; and, wherein the reaction zone (CZ-B) is configured to react the combustion zone output (CZ-AP) with CH4, unreacted carbon within elutriated char, or aromatic hydrocarbons contained within product gas created by both the first reactor (100) and the second reactor (200) to generate additional carbon monoxide (CO) and hydrogen (H2).

The first reactor product gas (122) has a first H2 to CO ratio and a first CO to CO2 ratio. The second reactor product gas (222) has a second H2 to CO ratio and a second CO to CO2 ratio. The third reactor product gas (334) has a third H2 to CO ratio and a third CO to CO2 ratio. In embodiments, the first H2 to CO ratio is greater than the second H2 to CO ratio. In embodiments, the second CO to CO2 ratio is greater than the first CO to CO2 ratio. In embodiments, the third H2 to CO ratio is lower than both the first H2 to CO ratio and the second H2 to CO ratio. In embodiments, the third CO to CO2 ratio is greater than both the first CO to CO2 ratio and the second CO to CO2 ratio.

FIG. 24:

FIG. 24 depicts one non-limiting embodiment of a three-stage energy-integrated product gas generation system (1001) comprised of four first reactors (100A, 100B, 100C, 100D), and four second reactors (200A, 200B, 200C, 200D), each with their own separate first solids separation device (150A, 150B, 150C, 150D), and second solids separation device (250A, 250B, 250C, 250D), and combined reactor product gas conduits (230A, 230B, 230C, 230D) for feeding into one common third reactor (300).

One common third reactor (300) is utilized to accommodate the flow of product gas from four separate product gas generation systems (1003A, 1003B, 1003C, 1003D). The first reactors (100A, 100B, 100C, 100D) within each product gas generation system (1003A, 1003B, 1003C, 1003D) are spaced apart from one another by a 90 degree angle. Further, six carbonaceous material inputs are positioned about the circumference of each first reactor (100A, 100B, 100C, 100D). Four of the six carbonaceous material inputs to each first reactor (100A, 100B, 100C, 100D) are positioned 90 degrees from one another. Two of the six carbonaceous material inputs to each first reactor (100A, 100B, 100C, 100D) are positioned 180 degrees from one another at angles of 45 degrees and 225 degrees leaving the angled positions of 135 degrees and 315 degrees vacant where the angle 0 degrees and 360 degrees are at the twelve-o-clock position also described in FIG. 9.

FIG. 24 depicts a typical 2,000 ton per day (tpd) three-stage energy-integrated product gas generation system (1001). The 2,000 tpd system is made up of four separate first reactors (100A, 100B, 100C, 100D) and four separate second reactors (200A, 200B, 200C, 200D). Each of the four separate first reactors (100A, 100B, 100C, 100D) are each capable of accepting 500 tpd of carbonaceous material. Each of the four separate second reactors (200A, 200B, 200C, 200D) are configured to accept and react a portion of the char contained within the first reactor product gas (122A, 122B, 122C, 122D) to generate four separate streams of second reactor product gas (222A, 222B, 222C, 222D). A portion of the four separate streams of second reactor product gas (222A, 222B, 222C, 222D) is then combined with the char depleted first reactor product gas (126A, 126B, 126C, 126D) evacuated from the first solids separation device (150A, 150B, 150C, 150D) to form four separate combined product gas streams routed to a common third reactor (300) via four separate combined reactor product gas conduits (230A, 230B, 230C, 230D). It is to be understood that any number of combinations and permutations of first reactors (100A, 100B, 100C, 100D) and separate second reactors (200A, 200B, 200C, 200D) and third reactors (300) may be selected to realize a three-stage energy-integrated product gas generation system (1001).

FIG. 25:

FIG. 25 shows Product Gas Generation System (3000) of FIG. 1 utilized in the framework of an entire Refinery Superstructure System (RSS). In embodiments, the RSS system as shown in FIG. 25 may be configured to employ the use of the three-stage energy integrated product gas generation method as elaborated upon in FIG. 1.

The Refinery Superstructure System (RSS) of FIG. 25 is comprised of a: Feedstock Preparation System (1000) contained within a Feedstock Preparation Control Volume (CV-1000); a Feedstock Delivery System (2000) contained within a Feedstock Delivery Control Volume (CV-2000); a First Stage Product Gas Generation System (3A) contained within a First Stage Product Gas Generation Control Volume (CV-3A); a Second Stage Product Gas Generation System (3B) contained within a Second Stage Product Gas Generation Control Volume (CV-3B); a Third Stage Product Gas Generation System (3C) contained within a Third Stage Product Gas Generation Control Volume (CV-3C); a Primary Gas Clean-Up System (4000) contained within a Primary Gas Clean-Up Control Volume (CV-4000); a Compression System (5000) contained within a Compression Control Volume (CV-5000); a Secondary Gas Clean-Up System (6000) contained within a Secondary Gas Clean-Up Control Volume (CV-6000); a Synthesis System (7000) contained within a Synthesis Control Volume (CV-7000); and, an Upgrading System (8000) contained within a Upgrading Control Volume (CV-8000).

The Feedstock Preparation System (1000) is configured to accept a carbonaceous material (500) via a carbonaceous material input (1-IN1) and discharge a carbonaceous material output (1-OUT1). Some typical sequence steps or systems that might be utilized in the Feedstock Preparation System (1000) include, Large Objects Removal, Recyclables Removal, Ferrous Metal Removal, Size Reduction, Water Removal, Non-Ferrous Metal Removal, Polyvinyl Chloride Removal, Glass Removal, Size Reduction, and Pathogen Removal.

The Feedstock Delivery System (2000) is configured to accept a carbonaceous material input (2-IN1) from the output (1-OUT1) of the Feedstock Preparation System (1000) and blend the carbonaceous material from the input (2-IN1) with the carbon dioxide input (2-IN2) to realize a carbonaceous material output (2-OUT1). The carbon dioxide input (2-IN2) to the Feedstock Delivery System (2000) is the carbon dioxide output (6-OUT2) from the downstream Secondary Gas Clean-Up System (6000). A Feedstock Delivery System CO2 Heat Exchanger (HX-2000) may be positioned upstream of the carbon dioxide input (2-IN2) to the Feedstock Delivery System (2000) to reduce the temperature of the carbon dioxide transferred from the downstream Secondary Gas Clean-Up System (6000). The Feedstock Delivery System CO2 Heat Exchanger (HX-2000) has a heat transfer medium (575), such as water, air, or any suitable liquid, vapor, or gas. The HX-2000 heat transfer medium (575) enters the HX-2000 via an inlet (525) at a first temperature, and exits HX-2000 via a HX-2000 heat transfer medium outlet (550) at a second, higher temperature. Water or moisture may be removed after HX-2000 cools the carbon dioxide stream prior to being introduced to the Feedstock Delivery System (2000).

The First Stage Product Gas Generation System (3A) contained within the First Stage Product Gas Generation Control Volume (CV-3A) is configured to accept the carbonaceous material output (2-OUT1) from the Feedstock Delivery System (2000) as a carbonaceous material input (3A-IN1) and react the carbonaceous material transported through the input (3A-IN1) with a reactant provided by the first reactor reactant input (3A-IN2) to generate a first reactor product gas output (3A-OUT1). The First Stage Product Gas Generation System (3A) is also equipped with a gas input (3A-IN5) coming from the carbon dioxide output (6-OUT2) of the downstream Secondary Gas Clean-Up System (6000). The First Stage Product Gas Generation System (3A) is configured to output a solids (3A-OUT3) in the form of Geldart Group D solids in the form of inert feedstock contaminants.

The Second Stage Product Gas Generation System (3B) contained within the Second Stage Product Gas Generation Control Volume (CV-3B) accepts the first reactor product gas output (3A-OUT1) as a first reactor product gas input (3B-IN1) and exothermically reacts a portion of the contents of the first reactor product gas input (3B-IN1) with oxygen-containing gas input (3B-IN3) to generate heat and product gas to be evacuated from the Second Stage Product Gas Generation System (3B) via a product gas output (3B-OUT1). The Second Stage Product Gas Generation System (3B) is also equipped with a gas input (3B-IN4) coming from the carbon dioxide output (6-OUT2) of the downstream Secondary Gas Clean-Up System (6000).

A second reactor heat exchanger (HX-B) is in thermal contact with the exothermic reaction taking place between at least a portion of the char contained within the product gas transferred through the first reactor product gas input (3B-IN1) with oxygen-containing gas input (3B-IN3) within the Second Stage Product Gas Generation System (3B). The second reactor heat exchanger (HX-B) is configured to accept a heat transfer medium, such as water, from a second reactor heat transfer medium input (3B-IN2) and transfer heat from the exothermic reaction taking place between the Second Stage Product Gas Generation System (3B) to the contents of the heat transfer medium input (3B-IN2) to result in a second reactor heat transfer medium output (3B-OUT2). The temperature (T2) of the second reactor heat transfer medium output (3B-OUT2) is greater than the temperature (T1) of the second reactor heat transfer medium input (3B-IN2). In embodiments, the first reactor reactant temperature (TR1) is about equal to the second reactor outlet temperature (T2). In embodiments, the first reactor reactant temperature (TR1) is less than the second reactor outlet temperature (T2) due to heat losses in piping while transferring the heat transfer medium from the outlet of the second reactor heat exchanger (HX-B) to the First Stage Product Gas Generation System (3A).

The first reactor reactant input (3A-IN2) is in fluid communication with the second reactor heat transfer medium output (3B-OUT2) and is configured to introduce at least a portion of the contents therein into the First Stage Product Gas Generation System (3A) to react with the carbonaceous material (500) to realize a first reactor product gas output (3A-OUT1).

The second reactor reactant input (208) is in fluid communication with the second reactor heat transfer medium output (3B-OUT2) and is configured to introduce at least a portion of the contents therein into the Second Stage Product Gas Generation System (3B) to exothermically react with a portion of the contents of the first reactor product gas input (3B-IN1) to realize a product gas output (3B-OUT1).

A first reactor heat exchanger (HX-A) is in thermal contact with the First Stage Product Gas Generation System (3A) to provide the energy to endothermically react the carbonaceous material (500) with the first reactor reactant input (3A-IN2) to realize a first reactor product gas output (3A-OUT1).

The first reactor heat exchanger (HX-A) is comprised of a fuel input (3A-IN4) and a combustion products output (3A-OUT2) and is configured to combust the contents of the fuel input (3A-IN4) to indirectly heat the contents within the First Stage Product Gas Generation System (3A) which in turn then promotes the endothermic reaction between a portion of the contents of the first reactor reactant input (3A-IN2) to react with the carbonaceous material (500) to realize a first reactor product gas output (3A-OUT1).

In embodiments, the fuel input (3A-IN4) to the first reactor heat exchanger (HX-A) may be a methane containing gas such as natural gas, as seen in FIG. 25. In embodiments, the fuel input (3A-IN4) to the first reactor heat exchanger (HX-A) may be provided by the downstream Synthesis System (7000) as a first synthesis hydrocarbon output (7-OUT2) and may be comprised of Fischer-Tropsch products such as tail gas. In embodiments, the fuel input (3A-IN4) to the first reactor heat exchanger (HX-A) may be provided by the downstream upgrading System (8000) as a first hydrocarbon output (8-OUT2) such as naphtha.

The Second Stage Product Gas Generation System (3B) is also configured to accept a fuel output (4-OUT2) such as char, SVOC, VOC, or solvent from a downstream Primary Gas Clean-Up System (4000) as a fuel input (3B-IN5).

The Third Stage Product Gas Generation System (3C) contained within the Third Stage Product Gas Generation Control Volume (CV-3C) accepts the product gas output (3B-OUT1) from the Second Stage Product Gas Generation System (3B) as a combined product gas input (3C-IN1) and exothermically reacts a portion thereof with an oxygen-containing gas input (3C-IN3) to generate heat and a third reactor product gas output (3C-OUT1).

A third reactor heat exchanger (HX-C) is in thermal contact with the Third Stage Product Gas Generation System (3C). The third reactor heat exchanger (HX-C) is in thermal contact with the exothermic reaction between the combined product gas input (3C-IN1) and the oxygen-containing gas input (3C-IN3). The third reactor heat exchanger (HX-C) is configured to accept a heat transfer medium, such as water or steam, at a third reactor heat transfer medium inlet temperature (T0), from a third reactor heat transfer medium input (3C-IN2) and transfer heat from the exothermic reaction taking place between the Third Stage Product Gas Generation System (3C) to the contents of the heat transfer medium input (3C-IN2) to result in a third reactor heat transfer medium output (3C-OUT2). The third reactor heat transfer medium output (3C-OUT2) is in fluid communication with the second reactor heat transfer medium input (3B-IN2) of the second reactor heat exchanger (HX-B).

The Third Stage Product Gas Generation System (3C) is also configured to accept a first hydrocarbon input (3C-IN4) from the first synthesis hydrocarbon output (7-OUT2) of a downstream Synthesis System (7000) contained within a Synthesis Control Volume (CV-7000). The Third Stage Product Gas Generation System (3C) is also configured to accept a second hydrocarbon input (3C-IN5) from the first hydrocarbon output (8-OUT2) of a downstream Upgrading System (8000) contained within an Upgrading Control Volume (CV-8000). The Third Stage Product Gas Generation System (3C) is also configured to accept a third hydrocarbon input (3C-IN6) from the second hydrocarbon output (8-OUT3) of a downstream Upgrading System (8000) contained within an Upgrading Control Volume (CV-8000). The first hydrocarbon input (3C-IN4), second hydrocarbon input (3C-IN5), or third hydrocarbon input (3C-IN6) may be reacted in a thermochemical process within the third reactor (300) to generate product gas. The Third Stage Product Gas Generation System (3C) may also be configured to generate power from a portion of the third reactor heat transfer medium output (3C-OUT2).

The Primary Gas Clean-Up System (4000) is equipped to accept a product gas input (4-IN1) from the third reactor product gas output (3C-OUT1) of the Third Stage Product Gas Generation System (3C). The Primary Gas Clean-Up System (4000) may also be configured to generate electricity from a portion of the product gas through any conventional well-known system such as a gas turbine, combined cycle, and/or steam turbine. The Primary Gas Clean-Up System (4000) is configured to reduce the temperature, remove solids, SVOC, VOC, and water from the product gas transported through the product gas input (4-IN1) to in turn discharge a product gas output (4-OUT1). A fuel output (4-OUT2) not only including VOC, SVOC, char, or solvent, may also be discharged from the Primary Gas Clean-Up System (4000) and introduced to the Second Stage Product Gas Generation System (3B) as a fuel input (3B-IN5).

The Compression System (5000) accepts the product gas output (4-OUT1) of the Primary Gas Clean-Up System (4000) as a product gas input (5-IN1). The Compression System (5000) is configured to accept a product gas input (5-IN1) and increase its pressure to form a product gas output (5-OUT1) at a greater pressure than the product gas input (5-IN1).

The Secondary Gas Clean-Up System (6000) accepts the product gas output (5-OUT1) from the Compression System (5000) as a product gas input (6-IN1). The Secondary Gas Clean-Up System (6000) is configured to accept a carbon dioxide laden product gas input (6-IN1) and remove carbon dioxide therefrom to generate both a carbon dioxide output (6-OUT2) and a carbon dioxide depleted product gas output (6-OUT1). The Secondary Gas Clean-Up System (6000) has a carbon dioxide laden product gas input (6-IN1) and a carbon dioxide depleted product gas output (6-OUT1). The carbon dioxide depleted product gas output (6-OUT1) has a lesser amount of carbon dioxide relative to the carbon dioxide laden product gas input (6-IN1). Membrane based carbon dioxide removal systems and processes are preferred to remove carbon dioxide from product gas, however other alternate systems and methods may be utilized to remove carbon dioxide, not limited to adsorption or absorption based carbon dioxide removal systems and processes.

The carbon dioxide depleted product gas output (6-OUT1) is routed to the downstream Synthesis System (7000) as a product gas input (7-IN1). The carbon dioxide output (6-OUT2) may be routed upstream to either to the: Second Stage Product Gas Generation System (3B) as gas input (3B-IN4); First Stage Product Gas Generation System (3A) as a gas input (3A-IN5); or, the Feedstock Delivery System (2000) as a carbon dioxide input (2-IN2). A heat exchanger (HX-2000) may be positioned in between the carbon dioxide input (2-IN2) of the Feedstock Delivery System (2000) and the Secondary Gas Clean-Up System (6000) of the carbon dioxide output (6-OUT2).

The Synthesis System (7000) is configured to accept the product gas output (6-OUT1) from the Secondary Gas Clean-Up System (6000) as a product gas input (7-IN1) and catalytically synthesize a synthesis product output (7-OUT1) therefrom. In embodiments, the synthesis system contains a catalyst and can produce ethanol, mixed alcohols, methanol, dimethyl ether, Fischer-Tropsch products, or the like.

A synthesis product output (7-OUT1) is discharged from the Synthesis System (7000) and is routed to the Upgrading System (8000) where it is accepted as a synthesis product input (8-IN1).

A first synthesis hydrocarbon output (7-OUT2), including Fischer-Tropsch products, may be discharged from the Synthesis System (7000) for use as a first hydrocarbon input (3C-IN4) to the third reactor (300) of the upstream Third Stage Product Gas Generation System (3C). In embodiments, a first synthesis hydrocarbon output (7-OUT2), including Fischer-Tropsch products, may be discharged from the Synthesis System (7000) for use as a fuel input (3A-IN4) in the first reactor first heat exchanger (HX-A) of the upstream First Stage Product Gas Generation System (3A).

The Upgrading System (8000) is configured to generate an upgraded product (1500) including renewable fuels and other useful chemical compounds, including alcohols, ethanol, gasoline, diesel and/or jet fuel, discharged via an upgraded product output (8-OUT1).

A first hydrocarbon output (8-OUT2), such as naphtha, may be discharged from the Upgrading System (8000) for use as a second hydrocarbon input (3C-IN5) in the third reactor (300) of the upstream Third Stage Product Gas Generation System (3C). A second hydrocarbon output (8-OUT3), such as off gases, may be discharged from the Upgrading System (8000) for use as a third hydrocarbon input (3C-IN6) in the third reactor (300) of the upstream Third Stage Product Gas Generation System (3C). In embodiments, a first hydrocarbon output (8-OUT2), such as naphtha, may also be discharged from the Upgrading System (8000) for use as a fuel input (3A-IN4) in the first reactor first heat exchanger (HX-A) of the upstream First Stage Product Gas Generation System (3A). In embodiments, a second hydrocarbon output (8-OUT3), such as off gases, may be discharged from the Upgrading System (8000) for use as a fuel input (3A-IN4) in the first reactor first heat exchanger (HX-A) of the upstream First Stage Product Gas Generation System (3A).

FIG. 25 discloses a method for converting carbonaceous material into at least one liquid fuel, the method comprising:
(i) combining the carbonaceous material and carbon dioxide in a feedstock delivery system;
(ii) producing a third reactor product gas in accordance with the method of FIG. 2;
(iii) compressing at least a portion of the third reactor product gas to thereby form a compressed product gas;
(iv) removing carbon dioxide from the compressed product gas, and supplying a first portion of the removed carbon dioxide to the feedstock delivery system for combining with the carbonaceous material in step (i);
(v) reacting the compressed product gas with a catalyst after removing carbon dioxide; and
(vi) synthesizing at least one liquid fuel from the compressed product gas, after reacting the compressed product gas with a catalyst.

FIG. 25 further discloses method for converting municipal solid waste (MSW) into at least one liquid fuel, the MSW containing Geldart Group D inert feedstock contaminants, the method comprising:
(a) combining the MSW and carbon dioxide in a feedstock delivery system;
(b) introducing, into a first interior of a first reactor containing bed material, steam and the combined MSW and carbon dioxide from the feedstock delivery system;
(c) reacting, in the first reactor, the MSW with steam and carbon dioxide, in an endothermic thermochemical reaction to generate a first reactor product gas containing char and leaving unreacted Geldart Group D inert feedstock contaminants in the bed material;
(d) cleaning the bed material with carbon dioxide to remove said unreacted Geldart Group D inert feedstock contaminants;
(e) introducing, into a second reactor containing a second particulate heat transfer material, an oxygen-containing gas and a portion of the char;
(f) reacting, in the second reactor, the char with the oxygen-containing gas, in an exothermic thermochemical reaction to generate a second reactor product gas;
(g) introducing, into a third reactor, an oxygen-containing gas and the first reactor product gas generated in step (c) and the second reactor product gas generated in step (f);
(h) reacting, in the third reactor; the product gas with the oxygen-containing gas, in an exothermic thermochemical reaction to generate a third reactor product gas;
(i) compressing the first and/or second reactor product gas to thereby form a compressed product gas;
(j) removing carbon dioxide from the compressed product gas, and supplying a first portion of the removed carbon dioxide to the feedstock delivery system for combining with the MSW in step (a); and supplying a second portion of the removed carbon dioxide to clean the bed material in step (d);
(k) reacting the compressed product gas with a catalyst after removing carbon dioxide; and
(l) synthesizing at least one liquid fuel from the compressed product gas, after reacting the compressed product gas with a catalyst;
wherein:
the Geldart Group D inert feedstock contaminants comprise whole units and/or fragments of one or more from the group consisting of allen wrenches, ball bearings, batteries, bolts, bottle caps, broaches, bushings, buttons, cable, cement, chains, clips, coins, computer hard drive shreds, door hinges, door knobs, drill bits, drill bushings, drywall anchors, electrical components, electrical plugs, eye bolts, fabric snaps, fasteners, fish hooks, flash drives, fuses, gears, glass, gravel, grommets, hose clamps, hose fittings, jewelry, key chains, key stock, lathe blades, light bulb bases, magnets, metal audio-visual components, metal brackets, metal shards, metal surgical supplies, mirror shreds, nails, needles, nuts, pins, pipe fittings, pushpins, razor blades, reamers, retaining rings, rivets, rocks, rods, router bits, saw blades, screws, sockets, springs, sprockets, staples, studs, syringes, USB connectors, washers, wire, wire connectors, and zippers.

FIG. 26:
FIG. 26 shows Product Gas Generation System (3000) of FIG. 1 utilized in an entire Refinery Superstructure (RSS) system further including a Primary Gas Clean-Up Heat Exchanger (HX-4) in fluid communication with the second reactor heat transfer medium inlet (212) and configured to remove heat from at least a portion of the product gas input (4-IN1).

FIG. 26 depicts a similar Refinery Superstructure (RSS) system of FIG. 25, however does not include a third reactor heat exchanger (HX-C). Instead, the Third Stage Product Gas Generation System (3C) operates in a catalytic mode and utilizes a portion of the third reactor steam input (308) and oxygen-containing gas input (3C-IN3) to regenerate a catalyst (CAT) contained therein.

Further, FIG. 26 indicates the first reactor heat exchanger (HX-A) configured to accept a first synthesis hydrocarbon output (7-OUT2) from a downstream Synthesis System (7000).

FIG. 26 shows Primary Gas Clean-Up Heat Exchanger (HX-4) in fluid communication with the second reactor heat transfer medium inlet (212) and is configured to remove heat from at least a portion of the product gas input (4-IN1) provided from the third reactor product gas output (3C-OUT1). The heat transfer medium (210) received by said second reactor heat transfer medium inlet (212) at the second reactor inlet temperature (T1), is provided by a downstream heat exchanger (HX-4) associated with a primary gas clean-up system configured to clean up the product gas.

The product gas input (4-IN1) to the Primary Gas Clean-Up System (4000) comes into thermal contact with the Primary Gas Clean-Up Heat Exchanger (HX-4) to thus effectuate a reduction in temperature to realize a product gas output (4-OUT1) from the System (4000) at a temperature lesser than that of the input (4-IN1).

The Primary Gas Clean-Up Heat Exchanger (HX-4) comprises: a primary gas clean-up heat transfer medium input (4-IN2) configured to receive a heat transfer medium (210) at a primary gas clean-up inlet temperature (T8); and a primary gas clean-up heat transfer medium output (4-OUT3) configured to output the heat transfer medium (210), at a higher, primary gas clean-up outlet temperature (T9), which corresponds to the second reactor inlet temperature (T1). The second reactor heat transfer medium inlet (212) is in fluid communication with the primary gas clean-up heat transfer medium output (4-OUT3) and is configured to accept at least a portion of said heat transfer medium (210) at a second reactor heat transfer medium input (3B-IN2), at said primary gas clean-up outlet temperature (T1).

A portion of the second reactor heat transfer medium output (3B-OUT2) discharged from the second reactor heat exchanger (HX-B) may in turn be transferred to the Third Stage Product Gas Generation System (3C) to regenerate a catalyst (CAT) contained therein.

FIG. 27:
FIG. 27 further depicts a first reactor (100), first solids separation device (150), dipleg (244), solids flow regulator (245), second reactor (200), particulate classification chamber (B1), second solids separation device (250), second reactor heat exchanger (HX-B), third reactor (300), third reactor heat exchanger (HX-C), steam drum (350), Primary Gas Clean Up Heat Exchanger (HX-4), venturi scrubber (380), scrubber (384), decanter separator (388), solids separator (398), and a scrubber recirculation heat exchanger (399). FIG. 27 depicts a three-stage product gas generation system (1001) of FIG. 3, further comprising a second reactor solids output (207) and a first reactor solids input (107) in fluid communication with the second reactor solids output (207), wherein the first reactor solids input (107) is configured to receive, into the first interior (101), second reactor particulate heat transfer material (205) present in the second interior (201).

The first reactor (100) accepts a carbonaceous material (102) through a first reactor carbonaceous material input (104). The first reactor reactant (106) is steam transferred from the outlet (216) of the second reactor heat exchanger (HX-B) at a first reactor reactant temperature (TR1). The first reactor (100) also accepts a first reactor solids input (107) from a second reactor solids output (207), wherein the first reactor solids input (107) is configured to receive, into the first interior (101), second reactor particulate heat transfer material (205) present in the second interior (201). Thus, the second reactor particulate heat transfer material (205) is used as the first reactor particulate heat transfer material (105) and the first reactor particulate heat transfer material (105) is used as the second reactor particulate heat transfer material (205). A first reactor product gas (122) is discharged from the interior (101) of the first reactor (100) via a first reactor product gas output (124).

FIG. 7 and FIG. 27 show a first reactor (100) configured to accept steam as a reactant (106) at a rate of about 0.125:1 to about 3:1 lb/lb dry carbonaceous material (102). The system of FIG. 7 and FIG. 27 shows a first reactor (100) configured to accept a carbonaceous material (102) and carbon dioxide mixture so that the carbon dioxide is fed to the first reactor (100) at a rate of about 0:1 to about 1:1 lb/lb dry carbonaceous material (102). The system of FIG. 7 and FIG. 8 shows a first reactor (100) configured to accept an oxygen-containing gas (118) at a rate of about 0:1 to about 0.5:1 lb/lb dry carbonaceous material (102).

Char-carbon refers to the mass fraction of carbon that is contained within the char (202) transferred from the first reactor (100) to the second reactor (200). In embodiments, the char-carbon contained within char (202) transferred from the first reactor (100) to the second reactor (200) ranges from about 90% carbon to about 10% carbon on a weight basis.

Char-ash refers to the mass fraction of ash that is contained within the char (202) transferred from the first reactor (100) to the second reactor (200). In embodiments, the char-ash contained within char (202) transferred from the first reactor (100) to the second reactor (200) ranges from 90% ash to about 10% ash on a weight basis.

The system of FIG. 13 and FIG. 27 shows a second reactor (200) configured to accept steam as a reactant (206) at a rate of about 0:1 to about 2.5:1 lb/lb char-carbon contained in char (202) fed to the second reactor (200). The system of FIG. 13 and FIG. 27 shows a second reactor (200) configured to accept an oxygen-containing gas (208) at a rate of about 0.5:1 to about 2:1 lb/lb char-carbon contained in char (202) fed to the second reactor (200). The system of FIG. 27 shows a second reactor (200) configured to accept carbon dioxide (406) at a rate of about 0:1 to about 2.5:1 lb/lb char-carbon contained in char (202) fed to the second reactor (200).

In the embodiment of FIG. 27, the first reactor product gas output (124) of the first reactor (100) is in fluid communication with the input (152) of the solids separation device (15) via a riser (130). The first reactor (100) reacts the carbonaceous material (102) with the reactant (106) in the presence of the bed material (105) to generate product gas (122). The riser (130) is configured to transport a mixture of char (202), bed material (105), and product gas (122) to the first solids separation device (150). The first solids separation device (150) separates out the bed material (105) and a portion of the char (202) contained in the first reactor product gas (122) for transfer to the second reactor (200).

Product gas, including char and bed material are evacuated from the interior (101) of the first reactor (100) en route to the input (152) of the first solids separation device (150). Solids including char and bed material are separated out in the first solids separation device (150) and are transferred via a dipleg (244) to the input (246) of a solids flow regulator (245). A char depleted first reactor product gas (126) is evacuated from the first separation gas output (156) of the first solids separation device (150) en route to a third reactor (300) via a char depleted first reactor product gas conduit (128).

In embodiments, the pressure drop across the restriction orifice (RO-B) is typically less than 2 PSIG. In embodiments, the first reactor pressure (P-A) is about 30 PSIG. In embodiments, the second reactor pressure (P-B) is about 28 PSIG. In embodiments, the third reactor pressure is about 26 PSIG. In other embodiments, the first reactor (100) operates at slightly below atmospheric pressure (0.65 to 1 bar or 9.5 to 14.5 psia).

FIG. 27 depicts the first reactor temperature (T-A) between about 320° C. and 569.99° C. (608° F. and 1,057.98° F.) and utilizes an endothermic hydrous devolatilization thermochemical process within the interior (101). In other embodiments, FIG. 27 may depict the first reactor temperature (T-A) operating between about 570° C. and 900° C. (1,058° F. and 1,652° F.) and utilizing an endothermic steam reforming thermochemical process within the interior (101). In other embodiments, FIG. 27 may depict the first reactor temperature (T-A) operating between about 570° C. and 900° C. (1,058° F. and 1,652° F.) and utilizing an endothermic water-gas shift thermochemical process within the interior (101).

The solids flow regulator (245) accepts a gas (249) through a gas input (248) which prevents backflow and also aides in the transfer of bed material and char from the solids flow regulator (245) to the interior (201) of the second reactor (200). Bed material and char (202) exit the solids flow regulator (245) through an output (247) and are transported to a char input (204) on the second reactor (200).

The second reactor (200) has a second interior (201). The second reactor reactant (206) is steam transferred from the outlet (216) of the second reactor heat exchanger (HX-B) to the reactant inlet (208) of the second reactor (200). The second reactor (200) accepts an oxygen-containing gas (218) through a second reactor oxygen-containing gas input (220). The second reactor (200) accepts a second reactor carbon dioxide (406) through a second reactor carbon dioxide input (407).

FIG. 27 also depicts the second reactor temperature (T-B) to be between 500° C. and 1,400° C. (932° F. and 2,552° F.). The second reactor (200) of FIG. 27 has partial oxidation, steam reforming, water gas shift, and dry reforming thermochemical processes taking place therein.

The second reactor also has a particulate classification chamber (B1) including a mixture transfer valve (V9B), classification gas transfer valve (V10B), bed material riser recycle transfer valve (V11B), depressurization vent valve (V12B), and an inert feedstock contaminant drain valve (V13B). The particulate classification chamber (B1), or classifier, has a bed material & inert feedstock contaminant mixture input (B5), classifier gas input (B6), classified recycled bed material output (B7), classifier depressurization gas output (B8), and a classifier inert feedstock contaminant output (B9). The terms classifier, classifier vessel, particulate classification chamber, and variations thereof are treated as synonymous throughout the specification. A table of reference numerals is provided below to avoid confusion.

The bed material & inert feedstock contaminant mixture input (B5) on the particulate classification chamber (B1) in fluid communication with the bed material & inert feedstock contaminant mixture output (B2) on the second reactor (200) via a mixture transfer conduit (B3). The bed material riser recycle transfer valve (V11B) is located on the classifier riser (B17) in between the classified recycled bed material output (B7) of the particulate classification chamber (B1) and the classified recycled bed material input (B27) on the second reactor (200). The depressurization vent valve (V12B) is located approximate to the classifier depressurization gas output (B8) to control or regulate classifier depressurization gas (B18) evacuated from the particulate classification chamber (B1). The inert feedstock contaminant drain valve (V13B) is located approximate to the classifier inert feedstock contaminant output (B9) to control or regulate classified inert feedstock contaminants (B19) evacuated from the classifier.

A bed material and inert feedstock contaminant mixture (B4) is transferred from the interior (201) of the second reactor (200) to the interior of the particulate classification chamber (B1) through the mixture transfer conduit (B3). A mixture transfer valve (V9B) is interposed in the conduit (B3) in between the bed material & inert feedstock contaminant mixture output (B2) of the second reactor (200) and the mixture input (B5) on the classifier. The bed material and inert feedstock contaminant mixture (B4) has a bed material portion and an inert feedstock contaminant portion.

The classifier gas input (B6) on the particulate classification chamber (B1) is configured to accept a classifier gas (B16), such as carbon dioxide recycled from a downstream Secondary Gas Clean Up System (6000). The classification gas transfer valve (V10B) is located upstream of the classifier gas input (B6) to start and stop the flow of classifier gas (B16) to the particulate classification chamber (B1). The drag of the classifier gas (B16) on the bed material portion supplies an upward force which counteracts the force of gravity and lifts the classified recycled bed material (B37) through the classified recycled bed material output (B7), classifier riser (B17), and into the second reactor (200) via a classified recycled bed material input (B27). Due to the dependence of gas drag on object size and shape, the bed material portion in the particulate classification chamber (B1) is sorted vertically and can be separated, recycled, and cleaned in this manner. The classified inert feedstock contaminants (B19) left within the particulate classification chamber (B1) may be drained via a classifier inert feedstock contaminant output (B9).

FIG. 27 is to be used in conjunction with FIG. 20 which depicts a listing of valve states that may be used in a variety of methods to operate valves associated with the particulate classification chamber (B1). FIG. 20 identifies five separate discrete valve states of which any number of states can be selected to result in a sequence of steps for the classification of bed material and recovery of inert feedstock contaminants to prevent defluidization within the second reactor (200).

The char (202) separated out from the first reactor product gas (122) is reacted in the second reactor (200) with the reactant (206), carbon dioxide (406), and an oxygen-containing gas (218) to generate a second reactor product gas (222) evacuated from the second reactor (200) via a second reactor product gas output (224). Exothermic reactions take place within the second reactor (200) between the char (202) and the oxygen-containing gas (218) in the presence of the second reactor particulate heat transfer material (205).

A second reactor heat exchanger (HX-B) is immersed beneath the fluid bed level (L-B) of the second reactor (200) to remove heat from the particulate heat transfer material (205) and in turn transfer heat to the second reactor heat transfer medium (210) contained within the second reactor heat exchanger (HX-B). A portion of the heated second reactor heat transfer medium (210) is used as a reactant (106, 206) in the first reactor (100) and second reactor (200).

The second reactor product gas (222) evacuated from the second reactor (200) through a second reactor product gas output (224) is routed to an input (252) of the second solids separation device (250). The second solids separation device (250) removes solids from the second reactor product gas (222) to produce a solids depleted second reactor product gas (226) that is evacuated from the second solids separation device (250) through an output (256) and a solids depleted second reactor product gas conduit (228). A solids output (254) on the second solids separation device (250) is configured to transfer separated solids (232) from the separation device (250) via a solids transfer conduit (234).

The char depleted first reactor product gas (126) is combined with the solids depleted second reactor product gas (226) to create a combined product gas (302) that is conveyed to the third reactor (300) through a combined product gas input (304). Generally, it is desirable to operate the first reactor and second reactor in a superficial fluidization velocity range between 0.5 ft/s to about 25.0 ft/s. FIG. 27 depicts the first reactor (100) operating in a superficial fluidization velocity range between 15 ft/s to about 25 ft/s. In embodiments, as in FIG. 3 and FIG. 7, it is preferable to operate the first reactor (100) in a superficial fluidization velocity range between 0.6 ft/s to about 1.2 ft/s. Specifically, in the embodiments of FIG. 3 and FIG. 7 it is preferable to operate the first reactor in a superficial fluidization velocity range between 0.8 ft/s to about 1 ft/s.

In embodiments, as in FIG. 3 and FIG. 13, it is preferable to operate the second reactor (200) in a superficial fluidization velocity range between 0.2 ft/s to about 0.8 ft/s. Specifically, in the embodiments of FIGS. 3, 13, and 27, it is preferable to operate the second reactor (200) in a superficial fluidization velocity range between 0.3 ft/s to about 0.5 ft/s. The second reactor (200) operates at a superficial fluidization velocity sufficient to drive the fine solids from the interior (201) towards the second solids separation device (250) for removal.

In embodiments, the carbon conversion rate in the first reactor is in the range from about 50% to about 100%. In embodiments, the carbon conversion rate in the first reactor (100) is from about 75% to about 95%. In embodiments, the when the carbon conversion rate in the first reactor (100) is from about 75% to about 95%, the second reactor (200) converts the 50% to 99% of the char-carbon transferred from the first reactor (200) and sent to the second reactor (200). In some embodiments, the second reactor separated solids (232) range from about 0% to about 90% carbon and from about 100% to about 10% ash on a weight basis. In some embodiments, the second reactor separated solids (232) range from about 5% to about 30% carbon and from about 95% to about 70% ash on a weight basis.

The embodiment of FIG. 27 depicts a second reactor (200) equipped with particulate classification chamber (B1). The particulate classification chamber (B1) may be configured to classify, clean, and recycle bed material back to the interior (201) of the second reactor (200) while removing larger objects, such as agglomerates from the system.

In embodiments, it is preferable to use Geldart A particles as bed material in second reactor (200). In other embodiments, it is preferable to use a mixture of Geldart B and Geldart A particles as bed material in second reactor (200).

Thus, the embodiment in FIG. 27 shows the second reactor particulate heat transfer material (205) being transferred to the first reactor (100) for use as the first reactor particulate heat transfer material (105).

Agglomeration can take place in the second reactor (200) when the char-ash introduced with the char (202) to the second reactor (200) is heated above its softening point temperature, and particles stick together to form larger or agglomerated particles. Agglomeration of char-ash particles together in the second reactor (200) may be compounded by binding or interlocking of two or more fluidized bed particulates together thus eventually increasing the mean particle size of the bed leading to defluidization. As a result growth and accumulation of agglomerates within the fluidized bed of the second reactor (200) transitions from proper fluidization to possible economically detrimental defluidization leading to unscheduled process termination and shut down. To mediate agglomeration in the second reactor (200), the second reactor (200) can be equipped with at least one particulate classification chamber (B1) to reliably and consistently remove from the system agglomerates from the second interior (201).

Further, since the embodiment shown in FIG. 27 has a first reactor (100) that is not equipped with a particulate classification chamber, all of the inert feedstock contaminants introduced to the first reactor (100) are conveyed to the second reactor (200) for removal. Thus, the embodiments shown in FIG. 19 and FIG. 21 may also be applicable to the second reactor (200) of FIG. 27.

The third reactor (300) has a third interior (301). The third reactor (300) is configured to accept a combined product gas (302), and partially oxidize SVOC, VOC, and char contained therein to generate a third reactor product gas (334) and heat. The third reactor has a burner (346) that is configured to accept a first hydrocarbon stream (322), such as a methane containing gas (e.g.—natural gas) via a first hydrocarbon stream input (324). The third reactor has a burner (346) that is also configured to accept a superstoichiometric third reactor oxygen-containing gas (318) to substantially completely combust the first hydrocarbon stream (322) to generate a combustion stream including CO2, H2O and heat. Left over, unreacted, oxygen-containing gas is present in the combustion stream. The combustion stream is passed from the burner (346) of the third reactor (300) and partially oxidizes the SVOC, VOC, and char contained within the combined product gas (302) to generate additional hydrocarbon, carbon monoxide and heat.

The third reactor (300) is also configured to accept second hydrocarbon stream (326) via a second hydrocarbon stream input (328) and a third hydrocarbon stream (330) via a third hydrocarbon stream input (332). The second hydrocarbon stream input (328) and third hydrocarbon stream input (332) are in fluid communication with a third reactor via a combined hydrocarbon connection (CZC0), combined hydrocarbon (CZC1), and a combined hydrocarbon input (CZC2). The second hydrocarbon stream (326), may be naphtha, and the third hydrocarbon stream (330), may be off-gas, both of which may be transferred to the third reactor (300) from a downstream Upgrading System (8000). The carbon and hydrogen contained within the second hydrocarbon stream (326) and the third hydrocarbon stream (330) may undergo a thermochemical reaction between the oxygen-containing gas present in the combustion stream transferred from the burner (346) to the interior (301) of the third reactor (300) to generate additional hydrogen, carbon monoxide and heat.

A third reactor heat exchanger (HX-C) is in thermal contact with the interior (301) of the third reactor (300). The third reactor (HX-C) is comprised of a third reactor heat transfer medium inlet (312) and a third reactor heat transfer medium outlet (316) through which a third reactor heat transfer medium (310) flows. The heat generated by the partial oxidation reaction between the SVOC, VOC, and char contained within the combined product gas (302) and the oxygen-containing gas present in the combustion stream leaving the burner (346) is transferred to the third reactor heat transfer medium (310).

A steam drum (350) is configured to accept the heat transfer medium (310) from the third reactor heat transfer medium outlet (316) via an inlet (354) and transfer conduit. FIG. 27 portrays the heat transfer medium (310) transferred to the steam drum (350) to be liquid phase water. The steam drum is also configured to provide a heat transfer medium (310) to the third reactor heat transfer medium inlet (312) via an outlet (356) and transfer conduit (362). In embodiments, a supply (353) of liquid phase water for use as the third reactor heat transfer medium (310) is made available to the steam drum (350) via a steam drum heat transfer medium supply inlet (352) and a third reactor heat transfer medium valve (VC5). The steam drum (350) is equipped with a pressure sensor (370) and a level sensor (372).

The pressure sensor (370) with an integrated steam pressure control valve (366) maintain the steam drum (350) at a user-defined pressure and steam is discharged through a steam outlet (358) and conduit (360) as necessary to maintain a desired steam drum (350) operating pressure. A portion of the steam evacuated form the steam drum (350) is used as the second reactor heat transfer medium (210) and is routed to the inlet (212) of the second reactor heat exchanger (HX-B). A portion of the steam evacuated from the steam drum (350) may be routed elsewhere than the inlet (212) of the second reactor heat exchanger (HX-B) via a conduit (365).

A portion of the third reactor heat transfer medium (310) is used as the second reactor heat transfer medium (210). The second reactor heat transfer medium enters the inlet (212) of the second reactor heat exchanger (HX-B) at a first temperature T1. Heat from the interior (201) of the second reactor (200) is transferred through the second reactor heat exchanger (HX-B) and into the second reactor heat transfer medium (210). The second reactor heat transfer medium (210) is discharged from the outlet (216) of the second reactor heat exchanger (HX-B) and enters the first reactor (100) for use as a reactant (106). The first reactor reactant (106) enters the interior (101) of the first reactor (100) at a first reactor reactant temperature (TR1), that is greater than the temperature of the heat transfer medium (210) entering the second reactor heat exchanger, at a first inlet temperature (T1). Thus, a portion of the third reactor heat transfer medium (310) is used as the reactant (206) in the second reactor (200). And a portion of the third reactor heat transfer medium (310) is used as the reactant (106) in the first reactor (200).

The third reactor (300) is configured to output a third reactor slag (338) via a third reactor slag output (340). The third reactor is configured to output a third reactor product gas (334) from a third reactor product gas output (336) to the inlet (373) of a Primary Gas Clean Up Heat Exchanger (HX-4). The Primary Gas Clean Up Heat Exchanger (HX-4) has a product gas inlet (373) for accepting a third reactor product gas (334) and a product gas outlet (375) for discharging the product gas at a reduced temperature. The Primary Gas Clean Up Heat Exchanger (HX-4) is configured to remove heat from the third reactor product gas (334) to a heat transfer medium flowing from the Heat Exchanger (HX-4) from the heat transfer medium inlet (376) to the heat transfer medium outlet (377).

A product gas outlet conduit (378) is positioned on the product gas outlet (375) of the Primary Gas Clean Up Heat Exchanger (HX-4) and is configured to transfer the third reactor product gas to the inlet (379) of a venturi scrubber (380). The Venturi Scrubber operates at a temperature below the SVOC condensation temperature and below the dewpoint of the excess steam contained within the product gas therefore condensing any SVOC and excess steam out into a liquid phase.

Solid char particulates entrained within the product gas come into contact with water provided by a venturi scrubber transfer conduit (404), and solvent provided by a venturi scrubber transfer conduit (393), at the divergent section of the venturi scrubber and said solid char particulates act as a nuclei for excess steam condensation and are displaced from the vapor phase and into the liquid phase. Connection X8 indicates water being transferred from water pump (394) pump discharge (395) to the venturi scrubber (380).

A mixture comprising product gas, SVOC, solids, solvent and water, is routed to the lower section of the scrubber (384) via a venturi scrubber product gas outlet conduit (382). The venturi scrubber product gas outlet (381) of the venturi scrubber (380) and the product gas inlet (383) of the scrubber (384) are in fluid communication via a venturi scrubber product gas outlet conduit (382).

The scrubber (384) serves as an entrainment separator for the venturi scrubber and is configured to receive the product gas, SVOC, solids, solvent and water and separately output a water and solids depleted product gas stream and a second mixture comprising SVOC, solids, solvent and water. The scrubber (384) also serves to capture one or more of other contaminants present including but not limited to HCl, HCN, $NH_3$, $H_2S$, and COS. A water and solids depleted product gas stream is evacuated from the scrubber (384) via a product gas outlet (385) and outlet conduit (386). Thus, the product gas emanating from the scrubber (384) has a depleted amount of solids and water relative to the product gas that is discharged from the third rector (300).

The scrubber (384), is preferably a vertically oriented cylindrical, or rectangular, pressure vessel having a lower section, and an upper section, along with a central section that contains a quantity of packed media either comprising raschig rings, pall rings, berl saddles, intalox packing, metal structured grid packing, hollow spherical packing, high performance thermoplastic packing, structured packing, synthetic woven fabric, or ceramic packing, or the like, wherein media is supported upon a suitable support grid system commonplace to industrial chemical equipment systems. The upper section of the scrubber (384) preferably contains a demister to enhance the removal of liquid droplets entrained in a vapor stream and to minimize carry-over losses of the sorption liquid. This demister is also positioned above the scrubber spray nozzle system, comprised of a plurality of spray nozzles, or spray balls, that introduce and substantially equally distribute the scrubbing absorption liquid to the scrubber onto the scrubber's central packing section so it may gravity-flow down through the scrubber central section.

As the product gas passes up through the internal packing of the scrubber (384), excess steam within the product gas comes into intimate contact with water provided by conduit (405) and solvent provided by conduit (392). The water provided by conduit (405) is cooled prior to being introduced to the upper section of the scrubber (384) through the scrubber spray nozzle system. Steam is condensed into a liquid phase before being discharged from the scrubber (384) via the underflow downcomer (387). A separator (388), such as a decanter, is positioned to accept the flow of SVOC, solids, solvent and water from the downcomer (387). In embodiments, a separator (388) is configured to receive the mixture from downcomer (387) and separate the water within the mixture based upon immiscibility so that the SVOC, solids and solvent collect together to form a mixture above the water within the separator (388). The decanter separator (388) is further configured to separately output the water and the SVOC, solids and solvent mixture. The separator (388) may be equipped with a level sensor (389).

In embodiments, a process fluid (403), such as water, sodium hydroxide, or a dispersant, such as Nalco 3D TRASAR® 3DT120, may be added to the scrubber. The Nalco Dispersant (3DT120) is used as a declogger to prevent calcium-rich particles from depositing on the pipe wall and plugging the venturi-gas cooler piping.

Through a pump discharge (391), the solvent pump (390) is configured to transfer SVOC, solids and solvent to the second reactor (200) as fuel (262) via a fuel input (264). The solvent pump is also configured to transfer the SVOC, solids and solvent to the venturi scrubber (380) via a venturi scrubber transfer conduit (393). The solvent pump is also configured to transfer the SVOC, solids and solvent to the scrubber (384) via a scrubber transfer conduit (392).

Intimate gas to liquid contact within the scrubber (384) allows for the solvent to both, absorb SVOC from the syngas (if any), and enable solid carbon (if any), and solid ash, to become oleophilic and hydrophobic permitting said solids to become suspended within the solvent or water before both the solvent and carbon are discharged from the scrubber (384).

A heat exchanger (399) is installed in the water pump discharge (395) line after the solids separator (398). The heat exchanger (399) is preferably of the shell and tube type heat exchanger, wherein syngas steam condensate transferred to scrubbing operations resides on the tube-side, and a cooling water supply (401), and a cooling water return (402), communicate with the shell-side of the heat exchanger to fulfill the heat transfer requirements necessary to indirectly remove heat from the tube-side steam condensate recirculation scrubbing liquid.

It will be appreciated that the foregoing examples, given for purposes of illustration, are not to be construed as limiting the scope of this disclosure. Although only a few exemplary embodiments of this disclosure have been described in detail above, those skilled in the art will readily appreciate that many variation of the theme are possible in the exemplary embodiments without materially departing from the novel teachings and advantages of this disclosure. Accordingly, all such modifications are intended to be included within the scope of this disclosure that is defined in the following claims and all equivalents thereto. Further, it is recognized that many embodiments may be conceived in the design of a given system that do not achieve all of the advantages of some embodiments, yet the absence of a particular advantage shall not be construed to necessarily mean that such an embodiment is outside the scope of the present disclosure.

Thus, specific compositions and methods of a three-stage energy-integrated product gas generation system have been disclosed. It should be apparent, however, to those skilled in the art that many more modifications besides those already described are possible without departing from the inventive concepts herein. The inventive subject matter, therefore, is not to be restricted except in the spirit of the disclosure.

Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Although the foregoing text sets forth a detailed description of numerous different embodiments of the disclosure, it should be understood that the scope of the disclosure is defined by the words of the claims set forth at the end of this patent. The detailed description is to be construed as exemplary only and does not describe every possible embodiment of the disclosure because describing every possible embodiment would be impractical, if not impossible. Numerous alternative embodiments could be implemented, using either current technology or technology developed after the filing date of this patent, which would still fall within the scope of the claims defining the disclosure.

Thus, many modifications and variations may be made in the techniques and structures described and illustrated herein without departing from the spirit and scope of the present disclosure. Accordingly, it should be understood that the methods and apparatus described herein are illustrative only and are not limiting upon the scope of the disclosure.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the disclosure and does not pose a limitation on the scope of the disclosure otherwise claimed. No language in the specification should be construed as indicating any non-claimed element essential to the practice of the disclosure.

Groupings of alternative elements or embodiments of the disclosure disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

LISTING OF REFERENCE NUMERALS first reactor (100)
first reactor (100A)
first reactor (100B)
first reactor (100C)
first reactor (100D)
first interior (101)
carbonaceous material (102)
carbonaceous material (102A)
carbonaceous material (102B)
carbonaceous material (102C)
carbonaceous material (102D)
carbonaceous material (102E)
carbonaceous material (102F)
first reactor carbonaceous material input (104)
first reactor first carbonaceous material input (104A)
first reactor second carbonaceous material input (104B)
first reactor third carbonaceous material input (104C)
first reactor fourth carbonaceous material input (104D)
first reactor fifth carbonaceous material input (104E)
first reactor sixth carbonaceous material input (104F)
first reactor particulate heat transfer material (105)
first reactor reactant (106)
first reactor dense bed zone reactant (106A)
first reactor feed zone reactant (106B)
first reactor splash zone reactant (106C)
first reactor reactant input (108)
first reactor dense bed zone reactant input (108A)
first reactor feed zone reactant input (108B)
first reactor splash zone reactant input (108C)
first reactor solids input (107)
first reactor reactant input (108)
first reactor first heat exchanger fuel (110A)
first reactor second heat exchanger fuel (110B)
first reactor third heat exchanger fuel (110C)
first reactor fourth heat exchanger fuel (110D)
first reactor heat exchanger fuel (110)
first reactor heat exchanger fuel inlet (112)
first reactor first heat exchanger fuel inlet (112A)
first reactor second heat exchanger fuel inlet (112B)
first reactor third heat exchanger fuel inlet (112C)
combined combustion stream (114)
first reactor first heat exchanger combustion stream (114A)
first reactor second heat exchanger combustion stream (114B)
first reactor third heat exchanger combustion stream (114C)

first reactor fourth heat exchanger combustion stream (114D)
heat exchanger combustion stream outlet (116)
first reactor first heat exchanger combustion stream outlet (116A)
first reactor second heat exchanger combustion stream outlet (116B)
first reactor third heat exchanger combustion stream outlet (116C)
first reactor fourth heat exchanger combustion stream outlet (116D)
first reactor oxygen-containing gas (118)
first reactor dense bed zone oxygen-containing gas (118A)
first reactor feed zone oxygen-containing gas (118B)
first reactor splash zone oxygen-containing gas (118C)
first reactor oxygen-containing gas input (120)
first reactor dense bed zone oxygen-containing gas input (120A)
first reactor feed zone oxygen-containing gas input (120B)
first reactor splash zone oxygen-containing gas input (120C)
first reactor product gas (122)
first reactor product gas (122A)
first reactor product gas (122A1)
first reactor product gas (122A2)
first reactor product gas (122B)
first reactor product gas (122C)
first reactor product gas (122D)
first reactor product gas output (124)
internal cyclone (125)
char depleted first reactor product gas (126)
char depleted first reactor product gas (126A)
char depleted first reactor product gas (126A1)
char depleted first reactor product gas (126A2)
char depleted first reactor product gas (126B)
char depleted first reactor product gas (126C)
char depleted first reactor product gas (126D)
char depleted first reactor product gas conduit (128)
char depleted first reactor product gas conduit (128A1)
char depleted first reactor product gas conduit (128A2)
riser (130)
distributor (145)
first solids separation device (150)
first solids separation device (150A)
first solids separation device (150A1)
first solids separation device (150A2)
first solids separation device (150B)
first solids separation device (150C)
first solids separation device (150D)
first separation input (152)
first separation input (152A1)
first separation input (152A2)
first separation char output (154)
first separation char output (154A1)
first separation char output (154A2)
first separation gas output (156)
first separation gas output (156A1)
first separation gas output (156A2)
auxiliary heat exchanger combustion stream inlet (160)
auxiliary heat exchanger heat transfer medium (164)
auxiliary heat exchanger heat transfer medium inlet (166)
auxiliary heat exchanger combustion stream outlet (167)
auxiliary heat exchanger heat transfer medium outlet (168)
auxiliary heat exchanger heat transfer medium outlet conduit (170)
third reactor heat transfer medium auxiliary conduit (171)
steam turbine (172)
generator (173)
combined heat transfer medium conduit (174)
power (175)
second reactor (200)
second reactor (200A)
second reactor (200B)
second reactor (200C)
second reactor (200D)
second interior (201)
char (202)
char (202A)
char (202B)
char (202C)
char (202D)
second reactor char input (204)
second reactor first char input (204A)
second reactor second char input (204B)
second reactor third char input (204C)
second reactor fourth char input (204D)
second reactor particulate heat transfer material (205)
second reactor reactant (206)
second reactor dense bed zone reactant (206A)
second reactor feed zone reactant (206B)
second reactor splash zone reactant (206C)
second reactor solids output (207)
second reactor reactant input (208)
second reactor dense bed zone reactant input (208A)
second reactor feed zone reactant input (208B)
second reactor splash zone reactant input (208C)
second reactor heat transfer medium (210)
second reactor heat transfer medium inlet (212)
second reactor heat transfer medium outlet (216)
second reactor oxygen-containing gas (218)
second reactor dense bed zone oxygen-containing gas (218A)
second reactor feed zone oxygen-containing gas (218B)
second reactor splash zone oxygen-containing gas (218C)
second reactor oxygen-containing gas input (220)
second reactor dense bed zone oxygen-containing gas input (220A)
second reactor feed zone oxygen-containing gas input (220B)
second reactor splash zone oxygen-containing gas input (220C)
second reactor product gas (222)
second reactor product gas (222A)
second reactor product gas (222B)
second reactor product gas (222C)
second reactor product gas (222D)
second reactor product gas output (224)
second internal cyclone (225)
solids depleted second reactor product gas (226)
solids depleted second reactor product gas conduit (228)
combined reactor product gas conduit (230)
combined reactor product gas conduit (230A)
combined reactor product gas conduit (230B)
combined reactor product gas conduit (230C)
combined reactor product gas conduit (230D)
second reactor separated solids (232)
solids transfer conduit (234)
riser (236)
riser connection (238)
riser conveying fluid (240)
terminal portion (242)
dipleg (244)
dipleg (244A)
dipleg (244B)
solids flow regulator (245)

first solids flow regulator (245A)
second solids flow regulator (245B)
solids flow regulator solids input (246)
first solids flow regulator solids input (246A)
second solids flow regulator solids input (246B)
solids flow regulator solids output (247)
first solids flow regulator solids output (247A)
second solids flow regulator solids output (247B)
third solids flow regulator solids output (247C)
fourth solids flow regulator solids output (247D)
solids flow regulator gas input (248)
solids flow regulator gas (249)
second solids separation device (250)
second solids separation device (250A)
second solids separation device (250B)
second solids separation device (250C)
second solids separation device (250D)
second separation input (252)
second separation solids output (254)
second separation gas output (256)
fuel (262)
fuel input (264)
third reactor (300)
third interior (301)
combined product gas (302)
first reactor product gas input (303)
combined product gas input (304)
second reactor product gas input (305)
third reactor steam input (308)
third reactor heat transfer medium (310)
third reactor heat transfer medium inlet (312)
third reactor heat transfer medium outlet (316)
third reactor oxygen-containing gas (318)
third reactor oxygen-containing gas input (320)
first hydrocarbon stream (322)
first hydrocarbon stream input (324)
second hydrocarbon stream (326)
second hydrocarbon stream input (328)
third hydrocarbon stream (330)
third hydrocarbon stream input (332)
third reactor product gas (334)
third reactor product gas output (336)
third reactor slag (338)
third reactor slag output (340)
third reactor quench water (342)
third reactor quench water input (344)
impingement surface (345)
burner (346)
burner nozzle (347)
in-flow header (348)
out-flow header (349)
steam drum (350)
tubes (351)
steam drum heat transfer medium supply inlet (352)
supply (353)
steam drum heat transfer medium reactor inlet (354)
steam drum heat transfer medium outlet (356)
steam outlet (358)
heat transfer medium conduit (360)
heat transfer medium conduit (362)
heat transfer medium conduit (364)
steam outlet conduit (365)
steam pressure control valve (366)
pressure sensor (370)
level sensor (372)
product gas inlet (373)
product gas outlet (375)
heat transfer medium inlet (376)
heat transfer medium outlet (377)
product gas outlet conduit (378)
venturi scrubber product gas inlet (379)
venturi scrubber (380)
venturi scrubber product gas outlet (381)
venturi scrubber product gas outlet conduit (382)
scrubber product gas inlet (383)
scrubber (384)
scrubber product gas outlet (385)
scrubber product gas outlet conduit (386)
downcomer (387)
separator (388)
level sensor (389)
solvent pump (390)
pump discharge (391)
scrubber transfer conduit (392)
venturi scrubber transfer conduit (393)
water pump (394)
pump discharge (395)
valve (396)
condensate discharge conduit (397)
separator (398)
heat exchanger (399)
cooling water supply (401)
cooling water return (402)
process fluid (403)
venturi scrubber transfer conduit (404)
scrubber transfer conduit (405)
second reactor carbon dioxide (406)
second reactor carbon dioxide input (407)
carbonaceous material (500)
classifier gas distributor valve cross-sectional view (X500)
blade (502)
valve body (504)
actuator (506)
clevis (508A, 508B)
rod (510A, 510B)
packing (512A, 512B)
perforations (514)
hole (516)
HX-2000 heat transfer medium inlet (525)
HX-2000 heat transfer medium outlet (550)
HX-2000 heat transfer medium (575)
Feedstock Preparation System (1000)
three-stage energy-integrated product gas generation system (1001)
product gas generation and particulate classification system (1002)
product gas generation system (1003)
product gas generation system (1003A)
product gas generation system (1003B)
product gas generation system (1003C)
product gas generation system (1003D)
upgraded product (1500)
Feedstock Delivery System (2000)
Product Gas Generation System (3000)
Primary Gas Clean Up System (4000)
Compression System (5000)
Secondary Gas Clean Up System (6000)
Synthesis System (7000)
Upgrading System (8000)
carbonaceous material input (1-IN1)
carbonaceous material output (1-OUT1)
carbonaceous material input (2-IN1)
carbon dioxide input (2-IN2)
carbonaceous material output (2-OUT1)

First Stage Product Gas Generation System (3A)
carbonaceous material input (3A-IN1)
first reactor reactant input (3A-IN2)
oxygen-containing gas input (3A-IN3)
fuel input (3A-IN4)
gas input (3A-IN5)
first reactor product gas output (3A-OUT1)
combustion products output (3A-OUT2)
solids (3A-OUT3)
vent (3A-OUT4)
Second Stage Product Gas Generation System (3B)
first reactor product gas input (3B-IN1)
second reactor heat transfer medium input (3B-IN2)
oxygen-containing gas input (3B-IN3)
gas input (3B-IN4)
fuel input (3B-IN5)
combustion products input (3B-IN6)
product gas output (3B-OUT1)
second reactor heat transfer medium output (3B-OUT2)
solids output (3B-OUT3)
Third Stage Product Gas Generation System (3C)
combined product gas input (3C-IN1)
third reactor heat exchanger heat transfer medium input (3C-IN2)
oxygen-containing gas input (3C-IN3)
first hydrocarbon input (3C-IN4)
second hydrocarbon input (3C-IN5)
third hydrocarbon input (3C-IN6)
quench water input (3C-IN7)
steam input (3C-IN8)
third reactor product gas output (3C-OUT1)
third reactor heat transfer medium output (3C-OUT2)
solids output (3C-OUT3)
carbonaceous material input (3-IN1)
product gas output (3-OUT1)
product gas input (4-IN1)
primary gas clean up heat transfer medium input (4-IN2)
product gas output (4-OUT1)
fuel output (4-OUT2)
primary gas clean up heat transfer medium output (4-OUT3)
product gas input (5-IN1)
product gas output (5-OUT1)
product gas input (6-IN1)
product gas output (6-OUT1)
carbon dioxide output (6-OUT2)
product gas input (7-IN1)
synthesis product output (7-OUT1)
first synthesis hydrocarbon output (7-OUT2)
synthesis product input (8-IN1)
upgraded product output (8-OUT1)
first hydrocarbon output (8-OUT2)
second hydrocarbon output (8-OUT3)
dense bed zone (AZ-A)
dense bed zone steam/oxygen connection (AZA0)
dense bed zone steam/oxygen (AZA1)
dense bed zone steam/oxygen input (AZA2)
feed zone (AZ-B)
feed zone steam/oxygen connection (AZB0)
feed zone steam/oxygen (AZB1)
first feed zone steam/oxygen input (AZB2)
second feed zone steam/oxygen input (AZB3)
third feed zone steam/oxygen input (AZB4)
fourth feed zone steam/oxygen input (AZB5)
fifth feed zone steam/oxygen input (AZB6)
sixth feed zone steam/oxygen input (AZB7)
splash zone (AZ-C)
splash zone steam/oxygen connection (AZC0)
splash zone steam/oxygen (AZC1)
first splash zone steam/oxygen input (AZC2)
second splash zone steam/oxygen input (AZC3)
third splash zone steam/oxygen input (AZC4)
fourth splash zone steam/oxygen input (AZC5)
fifth splash zone steam/oxygen input (AZC6)
sixth splash zone steam/oxygen input (AZC7)
seventh splash zone steam/oxygen input (AZC8)
eighth splash zone steam/oxygen input (AZC9)
dense bed zone (BZ-A)
dense bed zone steam/oxygen connection (BZA0)
dense bed zone steam/oxygen (BZA1)
dense bed zone steam/oxygen (BZA2)
feed zone (BZ-B)
feed zone steam/oxygen connection (BZB0)
feed zone steam/oxygen (BZB1)
feed zone steam/oxygen input (BZB2)
feed zone steam/oxygen input (BZB3)
feed zone steam/oxygen input (BZB4)
feed zone steam/oxygen input (BZB5)
splash zone (BZ-C)
splash zone steam/oxygen connection (BZC0)
splash zone steam/oxygen (BZC1)
splash zone steam/oxygen input (BZC2)
splash zone steam/oxygen input (BZC3)
splash zone steam/oxygen input (BZC4)
splash zone steam/oxygen input (BZC5)
Feedstock Preparation Control Volume (CV-1000)
Feedstock Delivery Control Volume (CV-2000)
Product Gas Generation Control Volume (CV-3000)
First Stage Product Gas Generation Control Volume (CV-3A)
Second Stage Product Gas Generation Control Volume (CV-3B)
Third Stage Product Gas Generation Control Volume (CV-3C)
Primary Gas Clean Up Control Volume (CV-4000)
Compression Control Volume (CV-5000)
Secondary Gas Clean Up Control Volume (CV-6000)
Synthesis Control Volume (CV-7000)
Upgrading Control Volume (CV-8000)
combustion zone (CZ-A)
combustion zone output (CZ-AP)
reaction zone (CZ-B)
reaction zone output (CZ-BP)
cooling zone (CZ-C)
cooling zone output (CZ-CP)
quench zone (CZ-D)
quench zone output (CZ-DP)
restriction orifice differential pressure sensor (DP-AB)
combined hydrocarbon connection (CZC0)
combined hydrocarbon (CZC1)
combined hydrocarbon input (CZC2)
freeboard zone (FB-A)
freeboard zone (FB-B)
auxiliary heat exchanger (HX-2)
Primary Gas Clean Up Heat Exchanger (HX-4)
first reactor heat exchanger (HX-A)
first reactor first heat exchanger (HX-A1)
first reactor second heat exchanger (HX-A2)
first reactor third heat exchanger (HX-A3)
first reactor fourth heat exchanger (HX-A4)
second reactor heat exchanger (HX-B)
third reactor heat exchanger (HX-C)
Feedstock Delivery System CO2 Heat Exchanger (HX-2000)
classifier interior (INA,INB)

fluid bed level (L-A)
fluid bed level (L-B)
first reactor pressure (P-A)
second reactor pressure (P-B)
third reactor pressure (P-C)
third reactor steam drum pressure (P-C1)
first quadrant (Q1)
second quadrant (Q2)
third quadrant (Q3)
fourth quadrant (Q4)
restriction orifice (RO-B)
Refinery Superstructure System (RSS)
third reactor heat transfer medium inlet temperature (T0)
second reactor heat transfer medium inlet temperature (T1)
second reactor heat transfer medium outlet temperature (T2)
first reactor reactant temperature (TR1)
first reactor heat exchanger fuel inlet temperature (T3)
first reactor first heat exchanger fuel inlet temperature (T3A)
first reactor second heat exchanger fuel inlet temperature (T3B)
first reactor third heat exchanger fuel inlet temperature (T3C)
first reactor fourth heat exchanger fuel inlet temperature (T3D)
first reactor heat exchanger combined combustion stream outlet temperature (T4)
first reactor first heat exchanger combustion stream outlet temperature (T4A)
first reactor second heat exchanger combustion stream outlet temperature (T4B)
first reactor third heat exchanger combustion stream outlet temperature (T4C)
first reactor fourth heat exchanger combustion stream outlet temperature (T4D)
first reactor auxiliary heat exchanger combustion stream outlet temperature (T5)
first reactor auxiliary heat exchanger heat transfer medium inlet temperature (T6)
first reactor auxiliary heat exchanger heat transfer medium outlet temperature (T7)
HX-4 heat transfer medium inlet temperature (T8)
HX-4 heat transfer medium outlet temperature (T9)
first reactor temperature (T-A)
second reactor temperature (T-B)
third reactor temperature (T-C)
first reactor dense bed zone reactant valve (VA1)
first reactor dense bed zone reactant valve controller (CA1)
first reactor dense bed zone reactant valve signal (XA1)
first reactor dense bed zone oxygen-containing gas valve (VA2)
first reactor dense bed zone oxygen-containing gas valve controller (CA2)
first reactor dense bed zone oxygen-containing gas valve signal (XA2)
first reactor feed zone reactant valve (VA3)
first reactor feed zone reactant valve controller (CA3)
first reactor feed zone reactant valve signal (XA3)
first reactor feed zone oxygen-containing gas valve (VA4)
first reactor feed zone oxygen-containing gas valve controller (CA4)
first reactor feed zone oxygen-containing gas valve signal (XA4)
first reactor splash zone reactant valve (VA5)
first reactor splash zone reactant valve controller (CA5)
first reactor splash zone reactant valve signal (XA5)
first reactor splash zone oxygen-containing gas valve (VA6)
first reactor splash zone oxygen-containing gas valve controller (CA6)
first reactor splash zone oxygen-containing gas valve signal (XA6)
second reactor heat transfer medium supply valve (VB0)
second reactor heat transfer medium supply valve controller (CB0)
second reactor heat transfer medium supply valve signal (XB0)
second reactor dense bed zone reactant valve (VB1)
second reactor dense bed zone reactant valve controller (CB1)
second reactor dense bed zone reactant valve signal (XB1)
second reactor dense bed zone oxygen-containing gas valve (VB2)
second reactor dense bed zone oxygen-containing gas valve controller (CB2)
second reactor dense bed zone oxygen-containing gas valve signal (XB2)
second reactor feed zone reactant valve (VB3)
second reactor feed zone reactant valve controller (CB3)
second reactor feed zone reactant valve signal (XB3)
second reactor feed zone oxygen-containing gas valve (VB4)
second reactor feed zone oxygen-containing gas valve controller (CB4)
second reactor feed zone oxygen-containing gas valve signal (XB4)
second reactor splash zone reactant valve (VB5)
second reactor splash zone reactant valve controller (CB5)
second reactor splash zone reactant valve signal (XB5)
second reactor splash zone oxygen-containing gas valve (VB6)
second reactor splash zone oxygen-containing gas valve controller (CB6)
second reactor splash zone oxygen-containing gas valve signal (XB6)
second reactor hydrocarbon valve (VB7)
second reactor hydrocarbon valve controller (CB7)
second reactor hydrocarbon valve signal (XB7)
first hydrocarbon valve (VC1)
first hydrocarbon valve controller (CC1)
first hydrocarbon valve signal (XC1)
third reactor oxygen-containing gas valve (VC2)
third reactor oxygen-containing gas valve controller (CC2)
third reactor oxygen-containing gas valve signal (XC2)
second hydrocarbon valve (VC3)
second hydrocarbon valve controller (CC3)
second hydrocarbon valve signal (XC3)
third hydrocarbon valve (VC4)
third hydrocarbon valve controller (CC4)
third hydrocarbon valve signal (XC4)
third reactor heat transfer medium valve (VC5)
third reactor heat transfer medium valve controller (CC5)
third reactor heat transfer medium valve signal (XC5)
mass sensor (WT1)
mass sensor signal (XWT1)
connection (X1)
connection (X2)
connection (X3)
connection (X4)
connection (X5)
connection (X6)
connection (X7)
connection (X8)
connection (X0)
connection (Y0)

first reactor feed zone cross-sectional view (XAZ-B)
first reactor splash zone cross-sectional view (XAZ-C)
second reactor feed zone cross-sectional view (XBZ-B)
second reactor splash zone cross-sectional view (XBZ-C)
particulate classification chamber (A1A,A1B)
particulate classification chamber (B1)
bed material & inert feedstock contaminant mixture output (A2A,A2AA)
bed material & inert feedstock contaminant mixture output (B2)
bed material & inert feedstock contaminant mixture transfer conduit (A3A,A3AA)
bed material & inert feedstock contaminant mixture transfer conduit (B3)
bed material & inert feedstock contaminant mixture (A4A,A4AA)
bed material & inert feedstock contaminant mixture (B4)
bed material & inert feedstock contaminant mixture input (A5A,A5AA)
bed material & inert feedstock contaminant mixture input (B5)
classifier gas input (A6A,A6AA)
classifier gas input (B6)
classified recycled bed material output (A7A,A7AA)
classified recycled bed material output (B7)
classifier depressurization gas output (A8A,A8AA)
classifier depressurization gas output (B8)
classifier gas (A16,A16A)
classifier gas (B16)
classifier riser (A17,A17A)
classifier riser (B17)
classifier depressurization gas (A18,A18A)
classifier depressurization gas (B18)
classified inert feedstock contaminants (A19,A19A)
classified inert feedstock contaminants (B19)
classified recycled bed material input (A27,A27A)
classified recycled bed material input (B27)
classified recycled bed material (A37,A37A)
classified recycled bed material (B37)
classifier inert feedstock contaminant output (A9A,A9AA)
classifier inert feedstock contaminant output (B9)
mixture transfer valve (V9,V9A,V9AA)
mixture transfer valve controller (C9A,C9AA)
mixture transfer valve (V9B)
classification gas transfer valve (V10,V10A,V10AA)
classification gas transfer valve controller (C10A,C10AA)
classification gas transfer valve (V10B)
bed material riser recycle transfer valve (V11,V11A,V11AA)
bed material riser recycle transfer valve controller (C11A,C11AA)
bed material riser recycle transfer valve (V11B)
depressurization vent valve (V12,V12A,V12AA)
depressurization vent valve controller (C12A,C12AA)
depressurization vent valve (V12B)
inert feedstock contaminant drain valve (V13,V13A,V13AA)
inert feedstock contaminant drain valve controller (C13A,C13AA)
inert feedstock contaminant drain valve (V13B)
classifier zone (INA1)
gas distribution zone (INA2)
gas distributor valve (V91)
gas distributor valve controller (C91)
large objects drain valve (V92)
processor (PROC)
memory (MEM)
input/output interface (I/O)
code (CODE)
catalyst (CAT)

What is claimed is:

1. A method for producing a H2, CO, and CO2 from a carbonaceous material using a first reactor, a second reactor, and a third reactor, the method comprising:
   (a) reacting carbonaceous material with a steam reactant in the first reactor and producing a first reactor product gas containing char;
   (b) introducing at least a portion of the char generated in step (a) into the second reactor;
   (c) reacting the char of step (b) with an oxygen-containing gas in the second reactor and producing a second reactor product gas;
   (d) transferring the first reactor product gas generated in step (a) and the second reactor product gas generated in step (c) to the third reactor, to form a combined product gas;
   (e) reacting the combined product gas with an oxygen-containing gas in the third reactor to generate a third reactor product gas and heat;
   (f) transferring heat generated in step (e) to a heat transfer medium contained within a third reactor heat exchanger in thermal contact with the interior of the third reactor;
   (g) transferring at least some of the heat transfer medium which has passed through the third reactor heat exchanger, to a second reactor heat exchanger in thermal contact with the interior of the second reactor; and
   (h) introducing a first portion of the heat transfer medium which has passed through the second reactor heat exchanger, into the first reactor as the steam reactant of step (a).

2. The method of claim 1, further comprising transferring a second portion of the heat transfer medium which has passed through the second reactor heat exchanger, into the second reactor as a reactant.

3. The method of claim 1, further comprising transferring an oxygen-containing gas to the first reactor, said oxygen-containing gas reacting with the carbonaceous material and the steam.

4. The method of claim 1, further comprising separating char from the first reactor product gas prior to step (b).

5. The method of claim 1, wherein the first reactor product gas of step (a) further comprises H2, CO, CO2, semi-volatile organic compounds (SVOC) and volatile organic compounds (VOC).

6. The method of claim 1, wherein the char in the first reactor product gas has a carbon content of about 10% carbon to about 90% carbon on a weight basis.

7. The method of claim 1, wherein the char in the first reactor product gas has an ash content range from about 90% ash to about 10% ash on a weight basis.

8. The method of claim 1, wherein:
   the second reactor product gas of step (c) further comprises solids.

9. The method of claim 8, wherein the solids contained within second reactor product gas comprises about 0% to about 90% carbon on a weight basis.

10. The method of claim 9, wherein the solids contained within second reactor product gas comprises about 5% to about 30% carbon on a weight basis.

11. The method of claim 8, wherein the solids contained within second reactor product gas comprises about 10% to about 100% ash on a weight basis.

12. The method of claim 11, wherein the solids contained within second reactor product gas comprises about 70% to about 95% ash on a weight basis.

13. The method of claim 1, wherein the carbon conversion rate in the first reactor is in the range from about 50% to about 99%.

14. The method of claim 13, wherein the carbon conversion rate in the first reactor is in the range from about 75% to about 95%.

15. The method of claim 1, wherein the second reactor converts into said second reactor product gas, 50% to 99% of the carbon contained within char transferred from the first reactor to the second reactor.

16. The method of claim 1, wherein the first reactor product gas generated in step (a) and the second reactor product gas generated in step (c) are combined, prior to being transferred into the third reactor.

17. The method of claim 1 wherein, in step (e):
the combined product gas includes SVOC, VOC and char from the first reactor product gas, and
said SVOC, VOC and char reacts with said oxygen-containing gas to generate said third reactor product gas and heat.

18. The method of claim 1 wherein, in step (e), the third reactor product gas comprises $H_2$, CO, and $CO_2$.

19. The method of claim 18 wherein, in step (e), the oxygen-containing gas is superstoichiometric.

20. The method of claim 19, comprising combusting the superstoichiometric oxygen-containing gas with a first hydrocarbon stream to produce a first portion of the $CO_2$ in the third reactor product gas.

21. The method of claim 20, wherein the first hydrocarbon stream is natural gas.

22. The method of claim 19, comprising combusting the superstoichiometric oxygen-containing gas with a second hydrocarbon stream to produce a second portion of the $CO_2$ in the third reactor product gas.

23. The method of claim 22, wherein the second hydrocarbon stream comprises naphtha transferred from a downstream Upgrading System.

24. The method of claim 19, comprising combusting the superstoichiometric oxygen-containing gas with a third hydrocarbon stream to produce a third portion of the $CO_2$ in the third reactor product gas.

25. The method of claim 24, wherein the third hydrocarbon stream is an off-gas transferred from a downstream Upgrading System.

26. The method of claim 1, comprising:
combining and combusting together a hydrocarbon stream and an oxygen-containing gas stream in an annulus type burner connected to the third reactor and expelling a combustion stream into the third reactor, the combustion stream including uncombusted oxygen-containing gas; wherein
all the oxygen-containing gas used in the reaction of step (e) with the combined product gas comprises uncombusted oxygen-containing gas from the combustion stream.

27. The method of claim 26 where the burner accepts a hydrocarbon stream and oxygen-containing gas stream through concentric ports, wherein the oxygen-containing gas is injected into an annular port, and the hydrocarbon stream is injected to the central port.

28. The method of claim 27, wherein the combustion stream exits the nozzle of the burner within the range of 200 feet per minute (ft/m) to the speed of sound.

29. The method of claim 28, wherein the combustion stream exits the nozzle of the burner within the range of about 50 feet per second (ft/s) to about 300 feet per second (ft/s).

30. The method of claim 26, wherein the burner operates as a Helmholtz pulse combustion resonator.

31. The method of claim 30, wherein the combustion stream exits the nozzle of the burner at an average flow velocity greater than 300 ft/s.

32. The method of claim 30, wherein the sound intensity in the burner is within the range of about 110 dB to about 190 dB.

33. The method of claim 26, wherein a portion of the combustion stream exits the burner to contact a portion of the combined product gas.

34. The method of claim 33, wherein the combustion stream reacts with the combined product gas at an average reaction time ranging from about 0.0001 seconds to about 5.0 seconds.

35. The method of claim 1, comprising superheating the heat transfer medium, when it is in the second reactor heat exchanger.

36. The method of claim 35, comprising introducing superheated heat transfer medium into the second reactor to help generate the second reactor product gas.

37. The method of claim 1, wherein:
(i) the first reactor product gas (122) has a first $H_2$ to CO ratio;
(ii) the second reactor product gas (222) has a second $H_2$ to CO ratio;
(iii) the third reactor product gas (322) has a third $H_2$ to CO ratio;
(iv) the first $H_2$ to CO ratio is greater than the second $H_2$ to CO ratio; and
(v) the second $H_2$ to CO ratio is greater than the third $H_2$ to CO ratio.

38. The method of claim 1, wherein:
(i) the first reactor product gas (122) has a first CO to $CO_2$ ratio;
(ii) the second reactor product gas (222) has a second CO to $CO_2$ ratio;
(iii) the third reactor product gas (322) has a third CO to $CO_2$ ratio;
(iv) the third CO to $CO_2$ ratio is greater than the second CO to $CO_2$ ratio; and
(v) the second CO to $CO_2$ ratio is greater than the first CO to $CO_2$ ratio.

39. The method of claim 1, further comprising:
combusting a fuel source in a first reactor heat exchanger to form a combustion stream, said combustion stream indirectly heating particulate heat transfer material present in the first reactor.

40. The method of claim 39, further comprising superheating the heat transfer medium which has passed through the third reactor heat exchanger, with heat from the combustion stream.

41. The method of step 67, comprising introducing the superheated heat transfer medium to a steam turbine having an integrated generator to produce power.

42. The method according to claim 1, comprising:
operating the first reactor at a first pressure;
operating the second reactor at a second pressure which is lower than the first pressure; and,
operating the third reactor at a third pressure which is lower than the second pressure.

43. The method of claim 1, comprising providing particulate heat transfer material in the first reactor to promote the reaction between the carbonaceous material and steam.

44. The method according to claim 43, comprising transferring particulate heat transfer material from the second reactor to the first reactor.

45. The method according to claim 43, wherein:
the particulate heat transfer material (105) is comprised of Geldart Group A solids; and
the Geldart Group A solids comprise one or more from the group consisting of inert material, catalyst, sorbent, and engineered particles.

46. The method according to claim 45, wherein the engineered particles comprise one or more from the group consisting of alumina, zirconia, sand, olivine sand, limestone, dolomite, catalytic materials, microballoons, and microspheres.

47. The method according to claim 43, wherein:
the particulate heat transfer material (105) is comprised of Geldart Group B solids;
the Geldart Group B solids comprise one or more from the group consisting of inert material, catalyst, sorbent, and engineered particles.

48. The method according to claim 47, wherein the engineered particles comprise one or more from the group consisting of alumina, zirconia, sand, olivine sand, limestone, dolomite, catalytic materials, microballoons, microspheres, and combinations thereof.

49. The method according to claim 43, wherein:
the particulate heat transfer material (105) is comprised of both Geldart Group A and B solids; and
the Geldart Group A and B solids together comprise one or more from the group consisting of inert material, catalyst, sorbent, and engineered particles.

50. The method according to claim 49, wherein the engineered particles comprise one or more from the group consisting of alumina, zirconia, sand, olivine sand, limestone, dolomite, catalytic materials, microballoons, and microspheres.

51. The method of claim 1, comprising operating the first reactor at a temperature between 320° C. and 569.99° C. to endothermically react the carbonaceous material in the presence of steam to produce the first reactor product gas.

52. The method of claim 1, comprising operating the first reactor at a temperature between 570° C. and 900° C. to endothermically react the carbonaceous material in the presence of steam to produce the first reactor product gas.

53. The method of claim 1, comprising operating the second reactor at a temperature between 500° C. and 1,400° C. to exothermically react the char in the presence of an oxygen-containing gas to produce the second reactor product gas.

54. The method of claim 1, comprising operating the third reactor at a temperature between 1,100° C. and 1,600° C. to exothermically react a portion of the first reactor product gas in the presence of an oxygen-containing gas to produce the third reactor product gas.

55. The method of claim 1, wherein the first reactor (100) has a steam to carbonaceous material weight ratio in the range of about 0.125:1 to about 3:1.

56. The method of claim 1, wherein the first reactor (100) has a carbon dioxide to carbonaceous material weight ratio in the range of about 0:1 to about 1:1.

57. The method of claim 1, wherein the first reactor (100) has an oxygen-containing gas to carbonaceous material weight ratio in the range of about 0:1 to about 0.5:1.

58. The method of claim 1, wherein the second reactor (200) has a steam to char-carbon weight ratio in the range of about 0:1 to about 2.5:1.

59. The method of claim 1, wherein the second reactor (200) has an oxygen-containing gas to char-carbon weight ratio in the range of about 0:1 to about 2:1.

60. The method of claim 1, wherein the second reactor (200) has a carbon dioxide to char-carbon weight ratio in the range of about 0:1 to about 2.5:1.

61. The method of claim 1, wherein the first reactor (100) and second reactor (200) operate at a superficial fluidization velocity range between 0.5 ft/s to about 25.0 ft/s.

62. The method of claim 1, wherein the first reactor (100) operates at a superficial fluidization velocity range between 0.6 ft/s to about 1.2 ft/s.

63. The method of claim 62, wherein the first reactor (100) operates at a superficial fluidization velocity range between 0.8 ft/s to about 1 ft/s.

64. The method of claim 1, wherein the second reactor (200) operates at a superficial fluidization velocity range between 0.2 ft/s to about 0.8 ft/s.

65. The method of claim 64, wherein the second reactor (200) operates at a superficial fluidization velocity range between 0.3 ft/s to about 0.5 ft/s.

66. The method of claim 1, comprising providing at least two first reactors in fluid communication with one common third reactor, each first reactor producing first reactor product gas.

67. The method of claim 1, comprising feeding the first reactor with about 500 tons carbonaceous material, per day.

68. The method of claim 1, comprising providing at least two second reactors in fluid communication with one common third reactor, each second reactor producing second reactor product gas.

69. The method of claim 1, further comprising:
equipping at least one of the second reactors with a particulate classification chamber; and
removing agglomerates or inert feedstock contaminants via the particulate classification chamber.

70. A method for converting carbonaceous material into at least one liquid fuel, the method comprising:
(i) combining the carbonaceous material and carbon dioxide in a feedstock delivery system;
(ii) producing a third reactor product gas in accordance with the method of claim 1;
(iii) compressing at least a portion of the third reactor product gas to thereby form a compressed product gas;
(iv) removing carbon dioxide from the compressed product gas, and supplying a first portion of the removed carbon dioxide to the feedstock delivery system for combining with the carbonaceous material in step (i);
(v) reacting the compressed product gas with a catalyst after removing carbon dioxide; and
(vi) synthesizing at least one liquid fuel from the compressed product gas, after reacting the compressed product gas with a catalyst.

71. The method of claim 70 wherein the liquid fuel comprises Fischer-Tropsch Products.

72. The method of claim 70 further comprising, upgrading the liquid fuel into chemical compounds selected from the group consisting of diesel, jet fuel, and naphtha and combinations thereof.

73. The method of claim 72 further comprising, transferring a portion of the naphtha to the third reactor.

* * * * *